United States Patent
Kodama et al.

(10) Patent No.: US 11,287,555 B2
(45) Date of Patent: Mar. 29, 2022

(54) METHOD FOR PRODUCING REFLECTIVE LAYER, AND REFLECTIVE LAYER

(71) Applicant: FUJIFILM Corporation, Tokyo (JP)

(72) Inventors: Keisuke Kodama, Kanagawa (JP); Shunya Katoh, Kanagawa (JP); Hiroshi Inada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 159 days.

(21) Appl. No.: 16/709,860

(22) Filed: Dec. 10, 2019

(65) Prior Publication Data

US 2020/0110202 A1 Apr. 9, 2020

Related U.S. Application Data

(63) Continuation of application No. PCT/JP2018/026360, filed on Jul. 12, 2018.

(30) Foreign Application Priority Data

Jul. 12, 2017 (JP) .............................. JP2017-136154

(51) Int. Cl.
*C09K 19/56* (2006.01)
*G02B 5/08* (2006.01)
*G02B 5/02* (2006.01)
*G02B 5/26* (2006.01)

(52) U.S. Cl.
CPC ......... *G02B 5/0808* (2013.01); *G02B 5/0284* (2013.01); *G02B 5/26* (2013.01)

(58) Field of Classification Search
CPC .. G02B 5/0808; G02B 5/0841; G02B 5/0284; G02B 5/26; G02B 5/3016; C09K 19/2014; C09K 19/588; C09K 19/3444; C09K 19/3405; C09K 19/3068; C09K 2019/2078; C09K 2019/3433; C09K 2019/3408; C09K 2019/0448; C09K 2019/0485; C09K 2019/044; G02F 1/0063
See application file for complete search history.

(56) References Cited

U.S. PATENT DOCUMENTS

| | | | |
|---|---|---|---|
| 2002/0150698 A1 | 10/2002 | Kawabata | |
| 2017/0343830 A1 | 11/2017 | Nagai et al. | |
| 2020/0110202 A1* | 4/2020 | Kodama | C09K 19/2007 |

FOREIGN PATENT DOCUMENTS

| | | |
|---|---|---|
| JP | 2002309103 | 10/2002 |
| JP | 2005049866 | 2/2005 |
| WO | 2016133223 | 8/2016 |
| WO | 2017030176 | 2/2017 |

OTHER PUBLICATIONS

"International Search Report (Form PCT/ISA/210) of PCT/JP2018/026360", dated Oct. 9, 2018, with English translation thereof, pp. 1-3.
"Written Opinion of the International Searching Authority (Form PCT/ISA/237) of PCT/JP2018/026360", dated Oct. 9, 2018, with English translation thereof, pp. 1-7.

* cited by examiner

*Primary Examiner* — Geraldina Visconti
(74) *Attorney, Agent, or Firm* — JCIPRNET

(57) ABSTRACT

An object of the present invention is to provide a method for producing a reflective layer having an excellent diffuse reflectivity and a wide reflection wavelength range. Another object of the present invention is to provide a reflective layer having an excellent diffuse reflectivity and a wide reflection wavelength range.
The method for producing a reflective layer of the present invention includes:
  a step 1 of applying a composition selected from the group consisting of the following composition X and the following composition Y onto a substrate to form a composition layer;
  a step 2 of heating the composition layer to align a liquid crystal compound in the composition layer into a cholesteric liquid crystalline phase state;
  a step 3 of cooling or heating the composition layer in a cholesteric liquid crystalline phase state to reduce a helical pitch; and
  a step 4 of irradiating at least a partial region of the composition layer with light, between the step 1 and the step 2, between the step 2 and the step 3, or after the step 3, to photosensitize a chiral agent A or a chiral agent C in the composition layer.
Composition X: a composition including a liquid crystal compound, a chiral agent A whose helical twisting power is changed upon light irradiation, and a chiral agent B whose helical twisting power is increased upon cooling or heating.
Composition Y: a composition including a liquid crystal compound and a chiral agent C whose helical twisting power is changed upon light irradiation and whose helical twisting power is increased upon cooling or heating.

11 Claims, 2 Drawing Sheets

METHOD FOR PRODUCING REFLECTIVE LAYER, AND REFLECTIVE LAYER

CROSS-REFERENCE TO RELATED APPLICATIONS

This application is a Continuation of PCT International Application No. PCT/JP2018/026360 filed on Jul. 12, 2018, which claims priority under 35 U.S.C. § 119(a) to Japanese Patent Application No. 2017-136154 filed on Jul. 12, 2017. The above application is hereby expressly incorporated by reference, in its entirety, into the present application.

BACKGROUND OF THE INVENTION

1. Field of the Invention

The present invention relates to a method for producing a reflective layer, and a reflective layer.

2. Description of the Related Art

A layer obtained by immobilizing a cholesteric liquid crystalline phase is known as a layer having properties of selectively reflecting either dextrorotatory circularly polarized light or levorotatory circularly polarized light in a specific wavelength range. For this reason, it has been developed for various purposes; for example, it is used as a phase difference layer (JP2005-049866A). In JP2005-049866A, the direction of an alignment regulating force of an alignment film is set in a random state, and therefore the direction of a director of a liquid crystal compound in contact with the alignment film is made random.

SUMMARY OF THE INVENTION

On the other hand, expansion of the viewing angle is required from the viewpoint of applying a layer obtained by immobilizing a cholesteric liquid crystalline phase to a projected image display member such as a projection screen. More specifically, in a case where light is incident from the normal direction of the surface of the layer obtained by immobilizing a cholesteric liquid crystalline phase, either dextrorotatory circularly polarized light or levorotatory circularly polarized light is selectively reflected. At that time, in a case where the reflection is made not only in the normal direction but also in the oblique direction, it leads to an improvement in visibility from the oblique direction. In other words, the reflective layer is required to have excellent properties in which incident light is reflected in various directions (so-called diffuse reflectivity).

The present inventors have prepared a reflective layer using the alignment film described in JP2005-049866A without subjecting the reflective layer to a rubbing treatment and studied diffuse reflectivity of the thus-prepared reflective layer. As a result, the diffuse reflectivity did not satisfy the recently required level and therefore a further improvement was necessary.

In addition, in terms of application of the layer obtained by immobilizing a cholesteric liquid crystalline phase, it is desired that the layer obtained by immobilizing a cholesteric liquid crystalline phase has a plurality of regions having selective reflection wavelengths different from each other (in other words, a wide reflection wavelength range) in order to be applicable to various uses.

In view of the above circumstances, an object of the present invention is to provide a method for producing a reflective layer having an excellent diffuse reflectivity and a wide reflection wavelength range, and a reflective layer having an excellent diffuse reflectivity and a wide reflection wavelength range.

As a result of extensive studies to achieve the foregoing object, the present inventors have found that a reflective layer having desired properties can be produced by carrying out a predetermined treatment using a composition (composition X) including a liquid crystal compound, a chiral agent (chiral agent A) whose helical twisting power is changed upon light irradiation, and a chiral agent (chiral agent B) whose helical twisting power is increased upon cooling or heating; or a composition (composition Y) including a liquid crystal compound and a chiral agent (chiral agent C) whose helical twisting power is changed upon light irradiation and whose helical twisting power is increased upon cooling or heating.

That is, it has been found that the foregoing object can be achieved by the following configuration.

[1] A method for producing a reflective layer, comprising:
a step 1 of applying a composition selected from the group consisting of the following composition X and the following composition Y onto a substrate to form a composition layer;
a step 2 of heating the composition layer to align a liquid crystal compound in the composition layer into a cholesteric liquid crystalline phase state;
a step 3 of cooling or heating the composition layer in a cholesteric liquid crystalline phase state to reduce a helical pitch; and
a step 4 of irradiating at least a partial region of the composition layer with light, between the step 1 and the step 2, between the step 2 and the step 3, or after the step 3, to photosensitize a chiral agent A or a chiral agent C in the composition layer,
Composition X: a composition including a liquid crystal compound, a chiral agent A whose helical twisting power is changed upon light irradiation, and a chiral agent B whose helical twisting power is increased upon cooling or heating,
Composition Y: a composition including a liquid crystal compound and a chiral agent C whose helical twisting power is changed upon light irradiation and whose helical twisting power is increased upon cooling or heating.

[2] The method for producing a reflective layer according to [1], in which a percentage change of the helical pitch before and after the light irradiation obtained by the following measurement method A is 5% or more in a case where the step 2 is carried out following the step 1, or
a percentage change of the helical pitch before and after the light irradiation obtained by the following measurement method B is 5% or more in a case where the step 2 is carried out following the step 1 and the step 4,
Measurement method A:
Each central reflection wavelength (nm) before and after irradiation of the composition layer formed by carrying out the step 2 following the step 1 with light having a wavelength of 365 nm at an irradiation intensity of 10 mW/cm$^2$ for 1 minute is measured and the percentage change of the helical pitch before and after the light irradiation is obtained in accordance with Expression (1);

$$\text{Percentage change of helical pitch before and after light irradiation} = [\{|\text{central reflection wavelength before light irradiation} - \text{central reflection wavelength after light irradiation}|\}/(\text{central reflection wavelength before light irradiation})] \times 100(\%) \quad \text{Expression (1)}$$

Measurement method B:
Each central reflection wavelength (nm) of a composition layer A formed by carrying out the step 2 following the step 1 and a composition layer B formed by irradiation with light having a wavelength of 365 nm at an irradiation intensity of 10 mW/cm$^2$ for 1 minute following the step 1, and further carrying out the step 2 is measured, and the percentage change of the helical pitch before and after the light irradiation is obtained in accordance with Expression (2);

Percentage change of helical pitch before and after light irradiation=[{|central reflection wavelength of composition layer $A$−central reflection wavelength of composition layer $B$|}/(central reflection wavelength of composition layer $A$)]×100 (%)   Expression (2)

[3] The method for producing a reflective layer according to [1] or [2], in which the composition layer is cooled or heated in the step 3 such that bright portions and dark portions derived from the cholesteric liquid crystalline phase are changed to a state not parallel to the substrate, in a cross section of the composition layer formed in the step 3.

[4] The method for producing a reflective layer according to [3], in which the composition layer is cooled or heated in the step 3 such that the bright portions and the dark portions derived from the cholesteric liquid crystalline phase are wave-like, in the cross section of the composition layer formed in the step 3.

[5] The method for producing a reflective layer according to any one of [1] to [4], in which the composition layer is cooled or heated in the step 3 such that the helical pitch is reduced by 20% or more.

[6] The method for producing a reflective layer according to any one of [1] to [5], in which the composition layer is cooled in the step 3 such that a temperature of the composition layer is lowered by 30° C. or more.

[7] The method for producing a reflective layer according to any one of [1] to [6], in which the liquid crystal compound is a liquid crystal compound having a polymerizable group; and in a case where the step 4 is carried out before the step 2 or between the step 2 and the step 3, the method further comprises a step 5 of subjecting:

during the step 3, the composition layer to a curing treatment and immobilizing the cholesteric liquid crystalline phase to faun a reflective layer, or after the step 3, the composition layer to a curing treatment and immobilizing the cholesteric liquid crystalline phase to form a reflective layer; or in a case where the step 4 is carried out after the step 3, the method further comprises a step 5 of subjecting:

after the step 4, the composition layer to a curing treatment and immobilizing the cholesteric liquid crystalline phase to form a reflective layer.

[8] The method for producing a reflective layer according to [7], in which the curing treatment is carried out by a polymerization reaction with light irradiation.

[9] The method for producing a reflective layer according to [8], in which the polymerization reaction with light irradiation is a radical polymerization reaction.

[10] The method for producing a reflective layer according to any one of [1] to [9], in which the step 4 is carried out between the step 2 and the step 3.

[11] The method for producing a reflective layer according to any one of [1] to [10], in which the light irradiation in the step 4 is a step of exposing the composition layer in a pattern-wise manner.

[12] A reflective layer obtained by immobilizing a cholesteric liquid crystalline phase, in which the reflective layer has a wave-like structure in which bright portions and dark portions derived from the cholesteric liquid crystalline phase observed in the cross-section by a scanning electron microscope are wave-like, and the reflective layer includes a plurality of regions having helical pitches different from each other in a plane, with a period of the wave-like structure in each region being the same.

[13] The reflective layer according to [12], in which at least two of the regions have helical pitches different from each other by 10% or more.

[14] The reflective layer according to [12] or [13], in which regions having helical pitches different from each other by 10% or more are present within a radius of 1 mm at any position in the plane of the reflective layer.

According to the present invention, it is possible to provide a method for producing a reflective layer having an excellent diffuse reflectivity and a wide reflection wavelength range.

Further, according to the present invention, it is possible to provide a reflective layer having an excellent diffuse reflectivity and a wide reflection wavelength range.

DESCRIPTION OF THE PREFERRED EMBODIMENTS

Hereinafter, the present invention will be described in detail. In the present specification, the numerical range expressed by using "to" means a range including numerical values described before and after "to" as a lower limit value and an upper limit value, respectively.

Further, in the present specification, the term "(meth)acrylate" is a notation expressing both acrylate and methacrylate, the term "(meth)acryloyl group" is a notation expressing both acryloyl group and methacryloyl group, and the term "(meth)acrylic" is a notation expressing both acrylic and methacrylic.

[Method for Producing Reflective Layer]

The method for producing a reflective layer according to the embodiment of the present invention includes:

a step 1 of applying a composition selected from the group consisting of the following composition X and the following composition Y onto a substrate to form a composition layer;

a step 2 of heating the composition layer to align a liquid crystal compound in the composition layer into a cholesteric liquid crystalline phase state;

a step 3 of cooling or heating the composition layer in a cholesteric liquid crystalline phase state to reduce a helical pitch; and a step 4 of irradiating at least a partial region of the composition layer with light, between the step 1 and the step 2, between the step 2 and the step 3, or after the step 3, to photosensitize a chiral agent A or a chiral agent C in the composition layer.

Composition X: a composition including a liquid crystal compound, a chiral agent A whose helical twisting power is changed upon light irradiation, and a chiral agent B whose helical twisting power is increased upon cooling or heating.

Composition Y: a composition including a liquid crystal compound and a chiral agent C whose helical twisting power is changed upon light irradiation and whose helical twisting power is increased upon cooling or heating.

According to the method for producing a reflective layer according to the embodiment of the present invention, a reflective layer having an excellent diffuse reflectivity and a wide reflection wavelength range can be formed.

Although the reason that such a reflective layer having an excellent diffuse reflectivity and a wide reflection wavelength range is obtained is not clear in detail, the present inventors speculate as follows. Hereinafter, the method for producing a reflective layer according to the embodiment of the present invention will be described with reference to an embodiment in which the reflective layer is formed by the procedure of the step 1, the step 2, the step 4, and the step 3 (that is, an embodiment in which the step 4 is carried out between the step 2 and the step 3) as a specific example.

(Action Mechanism of Step 2)

Figure 1:
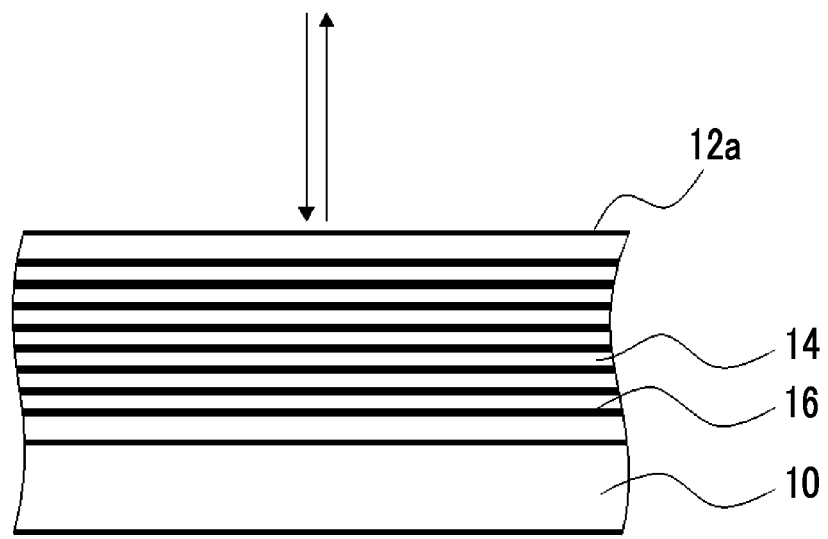
FIG. 1 is a schematic diagram in a case where a cross section of a composition layer in a general cholesteric liquid crystalline phase state is observed by a scanning electron microscope (SEM).

FIG. 1 shows a schematic cross-sectional view in a case where a layer of a composition in a general cholesteric liquid crystalline phase state is disposed on a substrate. As shown in FIG. 1, in a case where a cross section of a composition layer 12a in a cholesteric liquid crystalline phase state disposed on a substrate 10 is observed by a scanning electron microscope (SEM), a stripe pattern of bright portions 14 and dark portions 16 are usually observed. That is, a layered structure in which the bright portions 14 and the dark portions 16 are alternately laminated is observed in the cross section of the composition layer in a cholesteric liquid crystalline phase state.

Two repetitions of the bright portions 14 and the dark portions 16 (two bright portions and two dark portions) in FIG. 1 correspond to one helical pitch (one helical winding).

Generally, as shown in FIG. 1, the stripe pattern (layered structure) of the bright portions 14 and the dark portions 16 is formed to be parallel to the surface of the substrate 10 (hereinafter, also referred to as "planar alignment".). In such an aspect, in a case where light is incident from the normal direction of the composition layer 12a in a cholesteric liquid crystalline phase state, the light is reflected in the normal direction, but the light is hardly reflected in the oblique direction, which results in poor diffuse reflectivity (see arrows in FIG. 1).

(Action Mechanism of Step 4)

The composition X and the composition Y used in the method for producing a reflective layer according to the embodiment of the present invention (hereinafter, the composition X and the composition Y may be collectively referred to as "composition") include a photosensitive chiral agent whose helical twisting power is changed upon light irradiation. Specifically, the photosensitive chiral agent corresponds to the chiral agent A in the composition X and the chiral agent C in the composition Y. For this reason, in a case where the composition layer 12a in a cholesteric liquid crystalline phase state shown in FIG. 1 is irradiated with light (step 4), the helical twisting power of the chiral agent A or the chiral agent C contained in the composition layer 12a in a cholesteric liquid crystalline phase state is changed in the exposed region, and the helical pitch is changed accordingly. That is, in the step 4, a partial or entire region in the plane of the composition layer can be adjusted to have a desired helical pitch.

Figure 2:
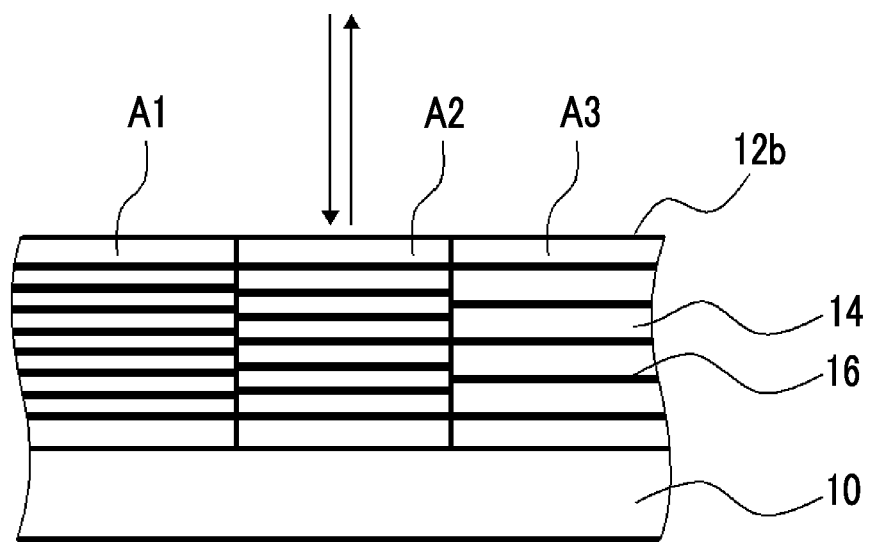
FIG. 2 is a schematic diagram in a case where a cross section of the composition layer obtained by carrying out step 1, step 2, and step 4 is observed by SEM.

FIG. 2 shows an example of a SEM image of a cross section of a composition layer 12b in a cholesteric liquid crystalline phase state (a composition layer 12b in a cholesteric liquid crystalline phase state after exposure), which is obtained by exposing a partial region in the plane of the composition layer 12a in a cholesteric liquid crystalline phase state.

The composition layer 12b in a cholesteric liquid crystalline phase state after exposure has a region A1 (unexposed region), a region A2 (exposed region), and a region A3 (exposed region) having different helical pitches in the plane. The number of bright portions 14 and dark portions 16 which are observed is reduced, that is, the helical pitch is increased in the regions A2 and A3 which are exposed regions, upon comparing with the region A1 which is an unexposed region. The region A2 and the region A3 are different in the irradiation light quantity at the time of exposure and as a result, the sizes of the helical pitches of the region A2 and the region A3 are different therebetween.

Since the center wavelength λ of selective reflection of the reflective layer depends on the pitch P of the helical structure (=the period of the helix) in the cholesteric liquid crystalline phase, the center wavelength of selective reflection can be adjusted by adjusting the pitch of the helical structure. That is, as a result of carrying out the step 4, a reflective layer having a plurality of regions having selective reflection wavelengths different from each other (in other words, a reflective layer having a wide reflection wavelength range) can be formed.

In FIG. 2, the composition layer 12b in a cholesteric liquid crystalline phase state after exposure exhibits an increased helical pitch in the exposed region, which is because an aspect in a case where the chiral agent A contained in the composition X and the chiral agent C contained in the composition Y are each a photosensitive chiral agent whose helical twisting power (HTP) is reduced upon light exposure is shown as an example. Therefore, in a case where the chiral agent A contained in the composition X and the chiral agent C contained in the composition Y are each a photosensitive chiral agent whose helical twisting power (HTP) is increased upon light exposure, the helical pitch in the exposed region of the composition layer 12b in a cholesteric liquid crystalline phase state after exposure is decreased.

The helical twisting power (HTP) of the chiral agent is a factor indicating the helical alignment ability expressed by Expression (3).

$$\text{HTP}=1/(\text{length of helical pitch (unit: μm)}\times\text{content of chiral agent with respect to liquid crystal compound (\% by mass))}[\mu m^{-1}] \quad \text{Expression (3)}$$

The length of the helical pitch refers to the length of the pitch P (=period of the helix) of the helical structure of the cholesteric liquid crystalline phase and can be measured by the method described on page 196 of the Liquid Crystal Handbook (published by Maruzen Co., Ltd.).

In addition, the value of HTP is influenced not only by the type of chiral agent but also by the type of liquid crystal compound contained in the composition. Therefore, for example, in a case where a composition containing a predetermined chiral agent X and a liquid crystal compound A and a composition containing a predetermined chiral agent X and a liquid crystal compound B different from the liquid crystal compound A are prepared, and the HTPs of both compositions are measured at the same temperature, the values of HTPs may be different therebetween.

In addition, the helical twisting power (HTP) of the chiral agent is also expressed as Expression (4).

HTP=(average refractive index of liquid crystal compound)/{(content of chiral agent with respect to liquid crystal compound (% by mass))×(central reflection wavelength (nm))}[μm$^{-1}$]   Expression (4)

(Action Mechanism of Step 3)

As shown in FIG. 1, in a case of an aspect in which the stripe pattern (layered structure) of the bright portions 14 and the dark portions 16 is parallel to the surface of the substrate 10 and then in a case where light is incident from the normal direction of the composition layer 12a in a cholesteric liquid crystalline phase state, the light is reflected in the normal direction, but the light is hardly reflected in the oblique direction, which results in poor diffuse reflectivity (see arrows in FIG. 1). Also in the composition layer 12b in a cholesteric liquid crystalline phase state after the step 4, the stripe pattern (layered structure) of the bright portions 14 and the dark portions 16 is parallel to the surface of the substrate 10 and therefore, in a case where light is incident from the normal direction of the composition layer 12b in a cholesteric liquid crystalline phase state, the light is reflected in the normal direction, but the light is hardly reflected in the oblique direction, which results in poor diffuse reflectivity (see arrows in FIG. 2).

Figure 3:
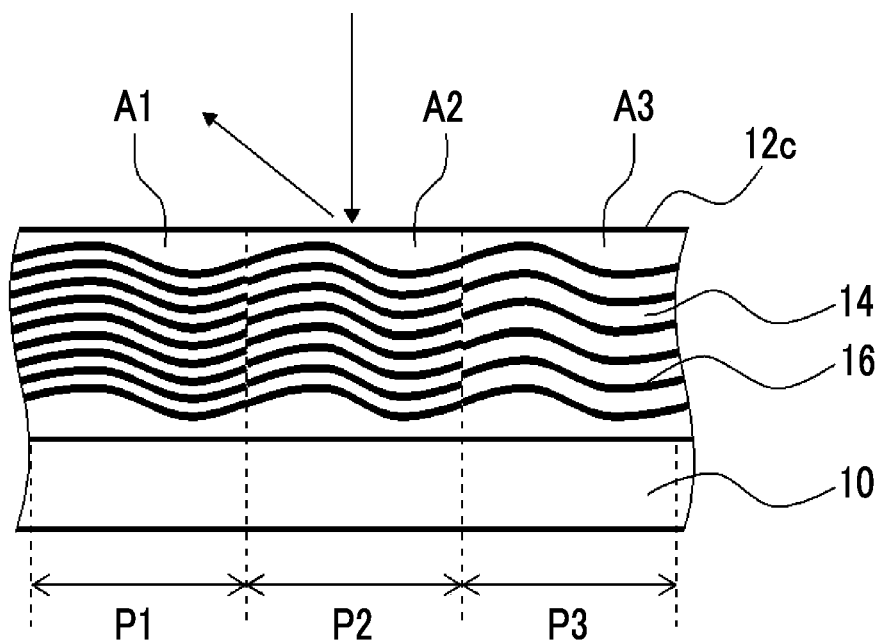
FIG. 3 is a schematic diagram in a case where a cross section of the composition layer obtained by carrying out step 1, step 2, step 3, and step 4 is observed by SEM.

On the other hand, according to the production method of the present invention, in a case where the composition layer 12b in a cholesteric liquid crystalline phase state after exposure is cooled or heated such that the helical pitch is reduced (step 3), the twist of the liquid crystal compound becomes stronger, and therefore the layer in the cholesteric liquid crystalline phase changes so as to be inclined. More specifically, in a case where the composition layer 12b in a cholesteric liquid crystalline phase state after exposure shown in FIG. 2 is subjected to a predetermined treatment, a composition layer 12c in which the bright portions 14 and the dark portions 16 have a wave-like structure (undulating structure) is obtained as shown in FIG. 3. In a case where light is incident on the composition layer 12c having such a wave-like structure (uneven structure) from the normal direction of the composition layer 12c having a wave-like structure, as shown in FIG. 3, a part of the incident light is reflected in an oblique direction since there is a region where the helical axis of the liquid crystal compound is inclined (see arrows in FIG. 3). That is, a reflective layer having an excellent diffuse reflectivity can be obtained according to the step 3.

The above action mechanism is caused by the chiral agent whose helical twisting power is increased upon cooling or heating, which is contained in the composition X and the composition Y used in the method for producing a reflective layer according to the embodiment of the present invention. Specifically, the chiral agent whose helical twisting power is increased upon cooling or heating corresponds to the chiral agent B in the composition X and the chiral agent C in the composition Y.

The composition layer 12c having a wave-like structure obtained by the procedure of the step 1, the step 2, the step 4, and the step 3 has a wave-like structure (uneven structure) of the bright portions 14 and the dark portions 16 as described above and has the region A1, the region A2, and the region A3 having helical pitches different from each other (in other words, selective reflection wavelengths different from each other) as described above (see FIG. 3). In addition, the region A1, the region A2, and the region A3 all have the same period of the wave-like structure (uneven structure) in the region. That is, a period P1 of the wave-like structure in the region A1, a period P2 of the wave-like structure in the region A2, and a period P3 of the wave-like structure in the region A3 are the same. In a case where the period P1, the period P2, and the period P3 are the same, there is an advantage that the viewing angle dependency of the tint of the reflective layer is reduced.

In addition, for example, in a case where the selective reflection wavelengths of the region A1, the region A2, and the region A3 are made into a region having an apparent center wavelength of selective reflection in the red light wavelength range, a region having an apparent center wavelength of selective reflection in the green light wavelength range, and a region having an apparent center wavelength of selective reflection in the blue light wavelength range, a reflective layer having a wide reflection wavelength range can be formed as a single layer without laminating a plurality of layers having selective reflection wavelengths different from each other. That is, the resulting reflective layer has a wide reflection wavelength range, and has excellent transparency because it is not necessary to laminate a plurality of layers having selective reflection wavelengths different from each other. The apparent center wavelength of selective reflection refers to a wavelength at the center of gravity of the reflection peak of the circularly polarized reflection spectrum of the cholesteric liquid crystal layer measured from the observation direction in practical use (for example, in a case of being used as a projected image display member).

Figure 4:
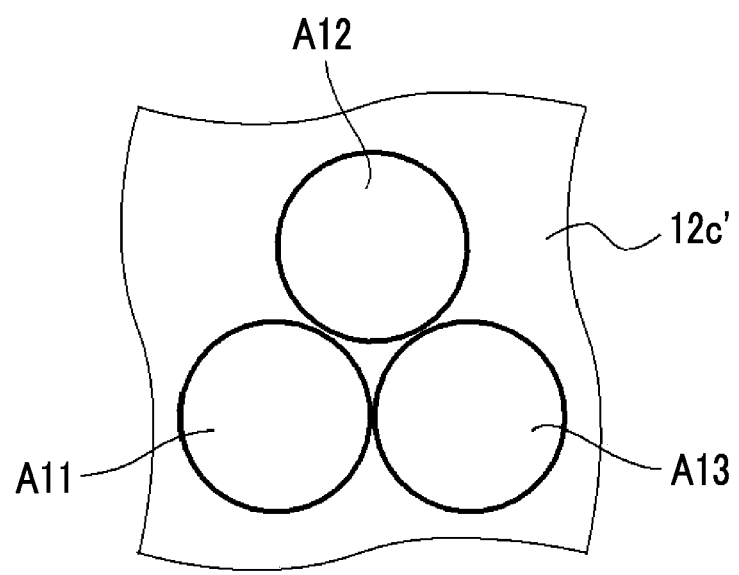
FIG. 4 is a schematic top view in a case where a shape of regions having helical pitches different from each other (regions having selective reflection wavelengths different from each other) formed in a plane of the composition layer is made into a dot shape by carrying out step 4 as pattern-wise exposure.

It is also preferable that each of the regions A1, A2, and A3 is made into a dot shape by pattern-wise exposure, for example, as shown in FIG. 4. A composition layer 12c' having a wave-like structure shown in FIG. 3 includes dot-shaped regions A11, A12, and A13 (the regions A11, A12, and A13 corresponds to the regions A1, A2, and A3, respectively). In addition, in a case where each region is made into a dot shape, there is an advantage that the tint can be easily adjusted by adjusting the size of the dots.

The method for producing a reflective layer according to the embodiment of the present invention includes at least the following steps 1 to 4.

Step 1: a step of applying a composition selected from the group consisting of a composition X which will be described later and a composition Y which will be described later onto a substrate to form a composition layer Step 2: a step of heating the composition layer to align a liquid crystal compound in the composition layer into a cholesteric liquid crystalline phase state Step 3: a step of cooling or heating the composition layer in a cholesteric liquid crystalline phase state to reduce a helical pitch Step 4: a step of irradiating at least a partial region of the composition layer with light, between the step 1 and the step 2, between the step 2 and the step 3, or after the step 3, to photosensitize a chiral agent A or a chiral agent C in the composition layer Composition X: a composition including a liquid crystal compound, a chiral agent A whose helical twisting power is changed upon light irradiation, and a chiral agent B whose helical twisting power is increased upon cooling or heating.

Composition Y: a composition including a liquid crystal compound and a chiral agent C whose helical twisting power is changed upon light irradiation and whose helical twisting power is increased upon cooling or heating.

As described above, the step 4 can be carried out between the step 1 and the step 2, between the step 2 and the step 3, or after the step 3. In particular, the step 4 is preferably carried out between the step 1 and the step 2 or between the step 2 and the step 3, and more preferably between the step 2 and the step 3. By carrying out the step 4 before the step 3 is carried out, it is easy to obtain a reflective layer in which the period of the wave-like structure in each of the regions having helical pitches different from each other is the same, as shown in FIG. 3.

Hereinafter, the materials used in each step and the procedure of each step will be described in detail. In addition, the method for producing a reflective layer according to the embodiment of the present invention will be described hereinafter with reference to an aspect in which step 1→step 2→step 4→step 3 are carried out in this order as an example.

In addition, the method for producing a reflective layer according to the embodiment of the present invention may be carried out in the order of step 1→step 4→step 2→step 3 or may be carried out in the order of step 1→step 2→step 3→step 4.

<Step 1>

The step 1 is a step of applying a composition selected from the group consisting of the composition X or the composition Y onto a substrate to form a composition layer.

Hereinafter, first, the substrate, the composition X, and the composition Y used in the present step will be described in detail, and then the procedure of the step will be described in detail.

(Substrate)

The substrate is a plate that supports a layer of the composition described below. Among others, a transparent substrate is preferable. The transparent substrate is intended to refer to a substrate having a transmittance of visible light of 60% or more, and the transmittance thereof is preferably 80% or more and more preferably 90% or more.

The material constituting the substrate is not particularly limited, and examples thereof include a cellulose-based polymer, a polycarbonate-based polymer, a polyester-based polymer, a (meth)acrylic polymer, a styrene-based polymer, a polyolefin-based polymer, a vinyl chloride-based polymer, an amide-based polymer, an imide-based polymer, a sulfone-based polymer, a polyether sulfone-based polymer, and a polyether ether ketone-based polymer.

The substrate may contain various additives such as an ultraviolet (UV) absorber, a matting agent fine particle, a plasticizer, a deterioration inhibitor, and a release agent.

In addition, the substrate preferably has low birefringence in the visible light region. For example, the phase difference at a wavelength of 550 nm of the substrate is preferably 50 nm or less and more preferably 20 nm or less.

The thickness of the substrate is not particularly limited, but it is preferably 10 to 200 μm and more preferably 20 to 100 μm from the viewpoint of thinning and handleability.

The thickness is intended to refer to an average thickness, and is obtained by measuring thicknesses at any five places of the substrate and arithmetically averaging the measured values. Regarding the method of measuring the thickness, the same applies to the thickness of a reflective layer (layer 12a of the composition in the cholesteric liquid crystalline phase state) to be described later.

(Composition X)

The composition X contains a liquid crystal compound, a chiral agent A whose helical twisting power is changed upon light irradiation, and a chiral agent B whose helical twisting power is increased upon cooling or heating. Hereinafter, each component will be described.

<<Liquid Crystal Compound>>

The type of the liquid crystal compound is not particularly limited.

Generally, liquid crystal compounds can be classified into a rod type (rod-like liquid crystal compound) and a disc type (discotic liquid crystal compound, disk-like liquid crystal compound) depending on the shape thereof. Further, the rod type and the disk type each have a low molecular weight type and a high molecular weight type. The high molecular weight generally refers to having a degree of polymerization of 100 or more (Polymer Physics-Phase Transition Dynamics, Masao Doi, page 2, Iwanami Shoten, 1992). Any liquid crystal compound can be used in the present invention. Two or more liquid crystal compounds may be used in combination.

The liquid crystal compound may have a polymerizable group. The type of the polymerizable group is not particularly limited, and a functional group capable of addition polymerization reaction is preferable, and a polymerizable ethylenically unsaturated group or a cyclic polymerizable group is more preferable. More specifically, the polymerizable group is preferably a (meth)acryloyl group, a vinyl group, a styryl group, an allyl group, an epoxy group, or an oxetane group, and more preferably a (meth)acryloyl group.

The liquid crystal compound is preferably a liquid crystal compound represented by Formula (I) from the viewpoint that the reflective layer has superior diffuse reflectivity.

Among these, from the viewpoint of superior diffuse reflectivity of the reflective layer, in a case where the number obtained by dividing the number of trans-1,4-cyclohexylene groups which may have a substituent represented by A by m is defined as mc, a liquid crystal compound satisfying mc>0.1 is preferable, and a liquid crystal compound satisfying 0.4≤mc≤0.8 is more preferable.

Note that mc is a number represented by the following calculating expression.

$Mc=$(the number of trans-1,4-cyclohexylene groups which may have a substituent represented by A)/m

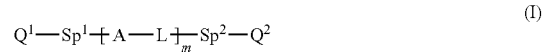

(I)

In the formula,

A represents a phenylene group which may have a substituent or a trans-1,4-cyclohexylene group which may have a substituent, at least one of A's represents a trans-1,4-cyclohexylene group which may have a substituent, L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=N—N=CH—, —CH=CH—, —C≡C—, —NHC(=O)—, —C(=O)NH—, —CH=N—, —N=CH—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—, and $Q^1$ and $Q^2$ each independently represent a hydrogen atom or a polymerizable group selected from the group consisting of groups represented by Formulae (Q-1) to (Q-5), provided that one of $Q^1$ and $Q^2$ represents a polymerizable group.

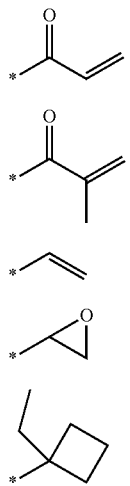

(Q-1)
(Q-2)
(Q-3)
(Q-4)
(Q-5)

A is a phenylene group which may have a substituent or a trans-1,4-cyclohexylene group which may have a substituent. In the present specification, the phenylene group is preferably a 1,4-phenylene group.

At least one of A's is a trans-1,4-cyclohexylene group which may have a substituent.

m pieces of A's may be the same as or different from each other.

m represents an integer of 3 to 12, preferably an integer of 3 to 9, more preferably an integer of 3 to 7, and still more preferably an integer of 3 to 5.

The substituent which the phenylene group and the trans-1,4-cyclohexylene group in Formula (I) may have is not particularly limited, and examples thereof include substituents selected from the group consisting of an alkyl group, a cycloalkyl group, an alkoxy group, an alkyl ether group, an amide group, an amino group, a halogen atom, and a group formed by combining two or more of these substituents. Examples of the substituent include substituents represented by —C(=O)—$X^3$—$Sp^3$—$Q^3$ which will be described later. The phenylene group and the trans-1,4-cyclohexylene group may have 1 to 4 substituents. In a case of having two or more substituents, the two or more substituents may be the same as or different from each other.

In the present specification, the alkyl group may be either linear or branched. The number of carbon atoms in the alkyl group is preferably 1 to 30, more preferably 1 to 10, and still more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a heptyl group, an octyl group, a nonyl group, a decyl group, an undecyl group, and a dodecyl group. The explanation of the alkyl group in the alkoxy group is also the same as the explanation on the foregoing alkyl group. Further, in the present specification, specific examples of the alkyl group in a case of being referred to as an alkylene group include divalent groups obtained by removing one hydrogen atom from each of the foregoing examples of the alkyl group. Examples of the halogen atom include a fluorine atom, a chlorine atom, a bromine atom, and an iodine atom.

In the present specification, the number of carbon atoms in the cycloalkyl group is preferably 3 or more and more preferably 5 or more and is preferably 20 or less, more preferably 10 or less, still more preferably 8 or less, and particularly preferably 6 or less. Examples of the cycloalkyl group include a cyclopropyl group, a cyclobutyl group, a cyclopentyl group, a cyclohexyl group, a cycloheptyl group, and a cyclooctyl group.

The substituent which the phenylene group and the trans-1,4-cyclohexylene group may have is preferably a substituent selected from the group consisting of an alkyl group, an alkoxy group, and —C(=O)—$X^3$—$Sp^3$—$Q^3$. Here, $X^3$ represents a single bond, —O—, —S—, or —N($Sp^4$—$Q^4$)— or represents a nitrogen atom forming a ring structure together with $Q^3$ and $Sp^3$. $Sp^3$ and $Sp^4$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(=O)—, —OC(=O)—, or —C(=O)O—.

$Q^3$ and $Q^4$ each independently represent a hydrogen atom, a cycloalkyl group, a group where one or two or more —$CH_2$— in a cycloalkyl group is substituted with —O—, —S—, —NH—, —N($CH_3$)—, —C(=O)—, —OC(=O)—, or —C(=O)O—, or any polymerizable group selected from the group consisting of groups represented by Formulae (Q-1) to (Q-5).

Specific examples of the group where one or two or more —$CH_2$— in a cycloalkyl group is substituted with —O—, —S—, —NH—, —N($CH_3$)—, —C(=O)—, —OC(=O)—, or —C(=O)O— include a tetrahydrofuranyl group, a pyrrolidinyl group, an imidazolidinyl group, a pyrazolidinyl group, a piperidyl group, a piperazinyl group, and a morpholinyl group. Among them, a tetrahydrofuranyl group is preferable, and a 2-tetrahydrofuranyl group is more preferable.

In Formula (I), L represents a single bond or a linking group selected from the group consisting of —$CH_2$O—, —$OCH_2$—, —$(CH_2)_2$OC(=O)—, —C(=O)O$(CH_2)_2$—, —C(=O)O—, —OC(=O)—, —OC(=O)O—, —CH=CH—C(=O)O—, and —OC(=O)—CH=CH—. L is preferably —C(=O)O— or —OC(=O)—. m pieces of L's may be the same as or different from each other.

$Sp^1$ and $Sp^2$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(=O)—, —OC(=O)—, or —C(=O)O—. $Sp^1$ and $Sp^2$ are each independently preferably a linking group formed by combining one or two or more groups selected from the group consisting of a linear alkylene group having 1 to 10 carbon atoms to which a linking group selected from the group consisting of —O—, —OC(=O)—, and —C(=O)O— is bonded to both terminals thereof, —OC(=O)—, —C(=O)O—, —O—, and a linear alkylene group having 1 to 10 carbon atoms, and more preferably a linear alkylene group having 1 to 10 carbon atoms to which —O— is bonded to both terminals thereof.

$Q^1$ and $Q^2$ each independently represent a hydrogen atom or a polymerizable group selected from the group consisting of groups represented by Formulae (Q-1) to (Q-5), provided that either one of $Q^1$ and $Q^2$ represents a polymerizable group.

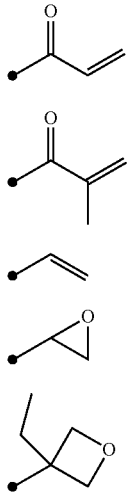

(Q-1)

(Q-2)

(Q-3)

(Q-4)

(Q-5)

The polymerizable group is preferably an acryloyl group (Formula (Q-1)) or a methacryloyl group (Formula (Q-2)).

Specific examples of the liquid crystal compound include a liquid crystal compound represented by Formula (I-11), a liquid crystal compound represented by Formula (I-21), and a liquid crystal compound represented by Formula (I-31). In addition to the foregoing compounds, known compounds such as a compound represented by Formula (I) in JP2013-112631A, a compound represented by Formula (I) in JP2010-070543A, a compound represented by Formula (I) in JP2008-291218A, a compound represented by Formula (I) in JP4725516B, a compound represented by Formula (II) in JP2013-087109A, a compound described in paragraph [0043] of JP2007-176927A, a compound represented by Formula (1-1) in JP2009-286885A, a compound represented by Formula (I) in WO2014/010325A, a compound represented by Formula (1) in JP2016-081035A, and a compound represented by Formulae (2-1) and (2-2) in JP2016-121339A can be mentioned.

A liquid crystal compound represented by Formula (I-11)

$Z^{11}$ and $Z^{12}$ each independently represent a single bond, —O—, —NH—, —N(CH$_3$)—, —S—, —C(=O)O—, —OC(=O)—, —OC(=O)O—, or —C(=O)NR$^{12}$—, $R^{12}$ represents a hydrogen atom or $Sp^{12}$—$Q^{12}$, $Sp^{11}$ and $Sp^{12}$ each independently represent a single bond, a linear or branched alkylene group having 1 to 12 carbon atoms which may be substituted with $Q^{11}$, or a linking group obtained by substituting one or more —CH$_2$— in a linear or branched alkylene group having 1 to 12 carbon atoms which may be substituted with $Q^{11}$ with —O—, —S—, —NH—, —N($Q^{11}$)—, or —C(=O)—, $Q^{11}$ represents a hydrogen atom, a cycloalkyl group, a group where one or more —CH$_2$— in a cycloalkyl group is substituted with —O—, —S—, —NH—, —N(CH$_3$)—, —C(=O)—, —OC(=O)—, or —C(=O)O—, or a polymerizable group selected from the group consisting of groups represented by Formulae (Q-1) to (Q-5), $Q^{12}$ represents a hydrogen atom or a polymerizable group selected from the group consisting of groups represented by Formulae (Q-1) to (Q-5), $l^{11}$ represents an integer of 0 to 2, $m^{11}$ represents an integer of 1 or 2, $n^{11}$ represents an integer of 1 to 3, and a plurality of $R^{11}$'s, a plurality of $L^{11}$'s, a plurality of $L^{12}$'s, a plurality of $l^{11}$'s, a plurality of $Z^{11}$'s, a plurality of $Sp^{11}$'s, and a plurality of $Q^{11}$'s may be respectively the same as or different from each other.

The liquid crystal compound represented by Formula (I-11) contains at least one —$Z^{12}$—$Sp^{12}$—$Q^{12}$ in which $Q^{12}$ is a polymerizable group selected from the group consisting of groups represented by Formulae (Q-1) to (Q-5), as $R^{11}$.

In addition, in the liquid crystal compound represented by Formula (I-11), preferred is —$Z^{11}$—$Sp^{11}$—$Q^{11}$ in which $Z^{11}$ is —C(=O)O— or C(=O)NR$^{12}$— and $Q^{11}$ is a polymerizable group selected from the group consisting of groups represented by Formulae (Q-1) to (Q-5). In addition, in the liquid crystal compound represented by Formula (I-11), $R^{11}$ is preferably —$Z^{12}$—$Sp^{12}$—$Q^{12}$ in which $Z^{12}$ is —C(=O)O— or C(=O)NR$^{12}$—, and $Q^{12}$ is a polymerizable group selected from the group consisting of groups represented by Formulae (Q-1) to (Q-5).

Any 1,4-cyclohexylene group contained in the liquid crystal compound represented by Formula (I-11) is a trans-1,4-cyclohexylene group.

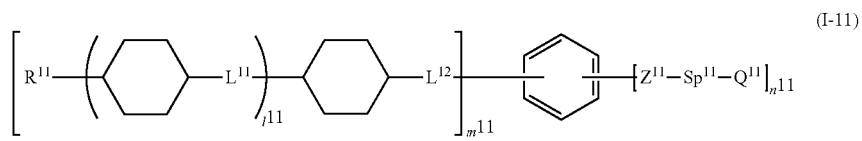

(I-11)

In the formula, $R^{11}$ represents a hydrogen atom, a linear or branched alkyl group having 1 to 12 carbon atoms, or —$Z^{12}$—$Sp^{12}$—$Q^{12}$, $L^{11}$ represents a single bond, —C(=O)O—, or —O(C=O)—, $L^{12}$ represents —C(=O)O—, —OC(=O)—, or —CONR$^2$—

$R^2$ represents a hydrogen atom or an alkyl group having 1 to 3 carbon atoms,

A suitable aspect of the liquid crystal compound represented by Formula (I-11) may be, for example, a compound in which $L^{11}$ is a single bond, $l^{11}$ is 1-(a dicyclohexyl group), and $Q^{11}$ is a polymerizable group selected from the group consisting of groups represented by Formulae (Q-1) to (Q-5).

Another suitable aspect of the liquid crystal compound represented by Formula (I-11) may be, for example, a compound in which $m^{11}$ is 2, $l^{11}$ is 0, and two $R^{11}$'s each represent —$Z^{12}$—$Sp^{12}$—$Q^{12}$, and $Q^{12}$ is a polymerizable group selected from the group consisting of groups represented by Formulae (Q-1) to (Q-5).

The liquid crystal compound represented by Formula (I-21)

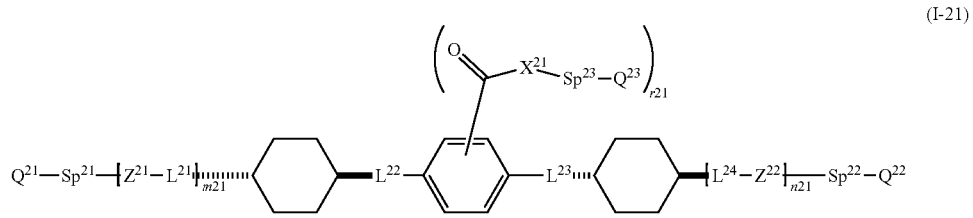

(I-21)

In the formula, $Z^{21}$ and $Z^{22}$ each independently represent a trans-1,4-cyclohexylene group which may have a substituent or a phenylene group which may have a substituent, the above substituents are each independently 1 to 4 substituents selected from the group consisting of —CO—$X^{21}$—$Sp^{23}$—$Q^{23}$, an alkyl group, and an alkoxy group, m21 represents an integer of 1 or 2, and n21 represents an integer of 0 or 1, in a case where m21 represents 2, n21 represents 0, in a case where m21 represents 2, two $Z^{21}$'s may be the same or different, at least one of $Z^{21}$ or $Z^{22}$ is a phenylene group which may have a substituent, $L^{21}$, $L^{22}$, $L^{23}$, and $L^{24}$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $X^{21}$ represents —O—, —S—, or —N(Sp$^{25}$—Q$^{25}$)— or represents a nitrogen atom forming a ring structure together with $Q^{23}$ and $Sp^{23}$, $r^{21}$ represents an integer of 1 to 4, $Sp^{21}$, $Sp^{22}$, $Sp^{23}$, and $Sp^{25}$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or C(=O)O—, $Q^{21}$ and $Q^{22}$ each independently represent a polymerizable group selected from the group consisting of groups represented by Formulae (Q-1) to (Q-5), $Q^{23}$ represents a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, any one polymerizable group selected from the group consisting of groups represented by Formulae (Q-1) to (Q-5), or a single bond in a case where $X^{21}$ is a nitrogen atom forming a ring structure together with $Q^{23}$ and $Sp^{23}$, and $Q^{25}$ represents a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any one polymerizable group selected from the group consisting of groups represented by Formulae (Q-1) to (Q-5), provided that in a case where $Sp^{25}$ is a single bond, $Q^{25}$ is not a hydrogen atom.

It is also preferred that the liquid crystal compound represented by Formula (I-21) has a structure in which a 1,4-phenylene group and a trans-1,4-cyclohexylene group are alternately present. For example, preferred is a structure in which m21 is 2, n21 is 0, and $Z^{21}$ is a trans-1,4-cyclohexylene group which may have a substituent or an arylene group which may have a substituent, each of which from the $Q^{21}$ side, or a structure in which m21 is 1, n21 is 1, $Z^{21}$ is an arylene group which may have a substituent, and $Z^{22}$ is an arylene group which may have a substituent.

A liquid crystal compound represented by Formula (I-31);

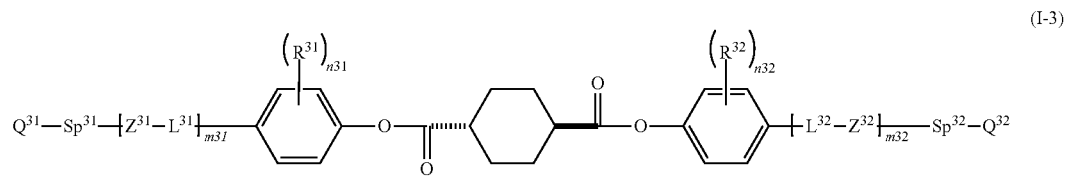

(I-3)

In the formula, $R^{31}$ and $R^{32}$ each independently represent an alkyl group, an alkoxy group, and a group selected from the group consisting of —C(=O)—$X^{31}$—$Sp^{33}$—$Q^{33}$, n31 and n32 each independently represent an integer of 0 to 4, $X^{31}$ represents a single bond, —O—, —S—, or —N($Sp^{34}$—$Q^{34}$)— or represents a nitrogen atom forming a ring structure together with $Q^{33}$ and $Sp^{33}$, $Z^{31}$ represents a phenylene group which may have a substituent, $Z^{32}$ represents a trans-1,4-cyclohexylene group which may have a substituent or a phenylene group which may have a substituent, the above substituents are each independently 1 to 4 substituents selected from the group consisting of an alkyl group, an alkoxy group, and —C(=O)—$X^{31}$—$Sp^{33}$—$Q^{33}$, m31 represents an integer of 1 or 2, and m32 represents an integer of 0 to 2, in a case where m31 and m32 represent 2, two $Z^{31}$'s and $Z^{32}$'s may be the same or different, $L^{31}$ and $L^{32}$ each independently represent a single bond or a linking group selected from the group consisting of —CH$_2$O—, —OCH$_2$—, —(CH$_2$)$_2$OC(=O)—, —C(=O)O (CH$_2$)$_2$—, —C(=O)O—, —OC(=O)—, —OC(=O)O—, —CH=CH—C(=O)O—, and —OC(=O)—CH=CH—, $Sp^{31}$, $Sp^{32}$, $Sp^{33}$, and $Sp^{34}$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—, $Q^{31}$ and $Q^{32}$ each independently represent a polymerizable group selected from the group consisting of groups represented by Formulae (Q-1) to (Q-5), and $Q^{33}$ and $Q^{34}$ each independently represent a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any one polymerizable group selected from the group consisting of groups represented by Formulae (Q-1) to (Q-5), provided that $Q^{33}$ may represent a single bond in a case of forming a ring structure together with $X^{31}$ and $Sp^{33}$, and $Q^{34}$ is not a hydrogen atom in a case where $Sp^{34}$ is a single bond.

As the liquid crystal compound represented by Formula (I-31), particularly preferable compounds include a compound in which $Z^{32}$ is a phenylene group and a compound in which m32 is 0.

It is also preferred that the compound represented by Formula (I) has a partial structure represented by Formula (II).

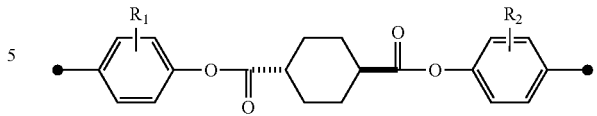

In Formula (II), black circles indicate the bonding positions with other moieties of Formula (I). It is sufficient that the partial structure represented by Formula (II) is included as a part of the partial structure represented by Formula (III) in Formula (I).

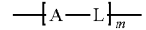

In the formula, $R^1$ and $R^2$ are each independently a group selected from the group consisting of a hydrogen atom, an alkyl group, an alkoxy group, and a group represented by —C(=O)—$X^3$—$Sp^3$—$Q^3$. Here, $X^3$ represents a single bond, —O—, —S—, or —N($Sp^4$—$Q^4$)— or represents a nitrogen atom forming a ring structure together with $Q^3$ and $Sp^3$. $X^3$ is preferably a single bond or —O—. $R^1$ and $R^2$ are preferably —C(=O)—$X^3$—$Sp^3$—$Q^3$. It is also preferred that $R^1$ and $R^2$ are the same. The bonding position of each of $R^1$ and $R^2$ to the phenylene group is not particularly limited.

$Sp^3$ and $Sp^4$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or C(=O)O—. $Sp^3$ and $Sp^4$ are each independently preferably a linear or branched alkylene group having 1 to 10 carbon atoms, more preferably a linear alkylene group having 1 to 5 carbon atoms, and still more preferably a linear chain alkylene group having 1 to 3 carbon atoms.

$Q^3$ and $Q^4$ each independently represent a hydrogen atom, a cycloalkyl group, a group where one or two or more —CH$_2$— in a cycloalkyl group is substituted with —O—, —S—, —NH—, —N(CH$_3$)—, —C(=O)—, —OC (=O)—, or —C(=O)O—, or any one polymerizable group selected from the group consisting of groups represented by Formulae (Q-1) to (Q-5).

It is also preferred that the compound represented by Formula (I) has, for example, a structure represented by Formula (II-2).

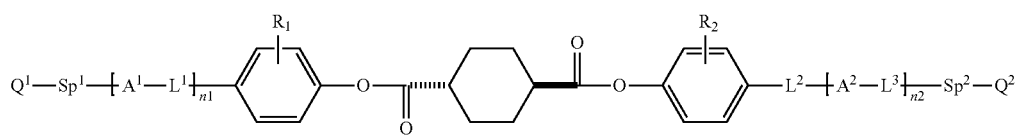

In the formula, $A^1$ and $A^2$ each independently represent a phenylene group which may have a substituent or a trans-1,4-cyclohexylene group which may have a substituent, and the above substituents are each independently 1 to 4 substituents selected from the group consisting of an alkyl group, an alkoxy group, and —C(=O)—X³—Sp³—Q³, $L^1$, $L^2$, and $L^3$ each represent a single bond or a linking group selected from the group consisting of —CH₂O—, —OCH₂—, —(CH₂)₂OC(=O)—, —C(=O)O(CH₂)₂—, —C(=O)O—, —OC(=O)—, —OC(=O)O—, —CH=CH—C(=O)O—, and —OC(=O)—CH=CH—, and n1 and n2 each independently represent an integer of 0 to 9, and n1+n2 is 9 or less.

Each of $Q^1$, $Q^2$, $Sp^1$, and $Sp^2$ has the same definition as that of each group in Formula (I). Each of $X^3$, $Sp^3$, $Q^3$, $R^1$, and $R^2$ has the same definition as that of each group in Formula (II).

The following compounds are exemplified as the liquid crystal compound which is a liquid crystal compound represented by Formula (I) and satisfies 0.4≤mc≤0.8.

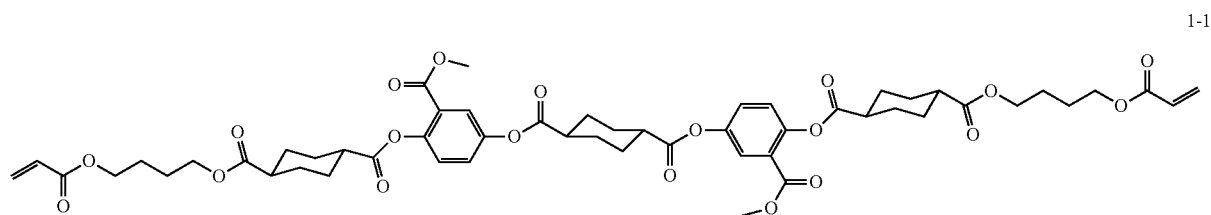

1-1

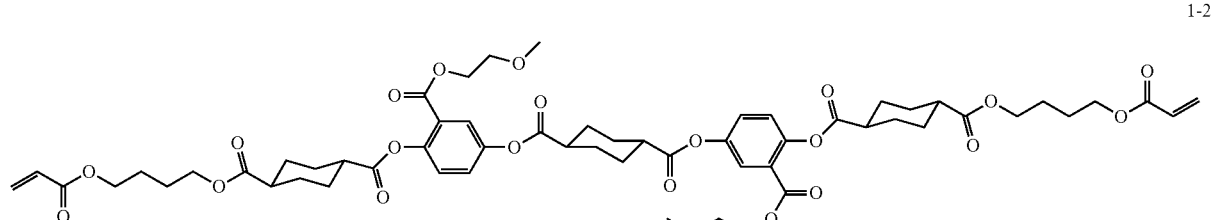

1-2

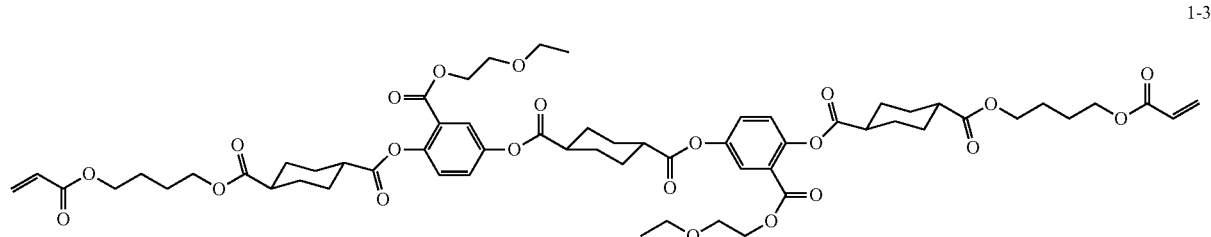

1-3

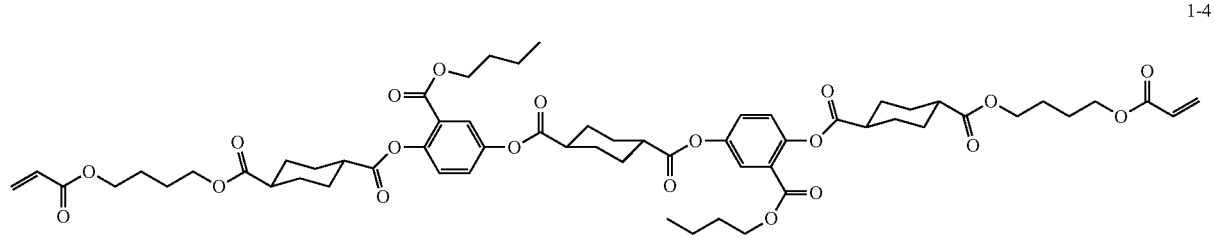

1-4

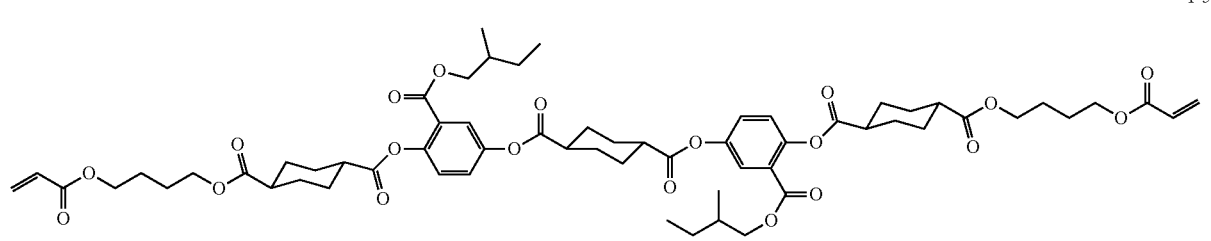

1-5

1-6
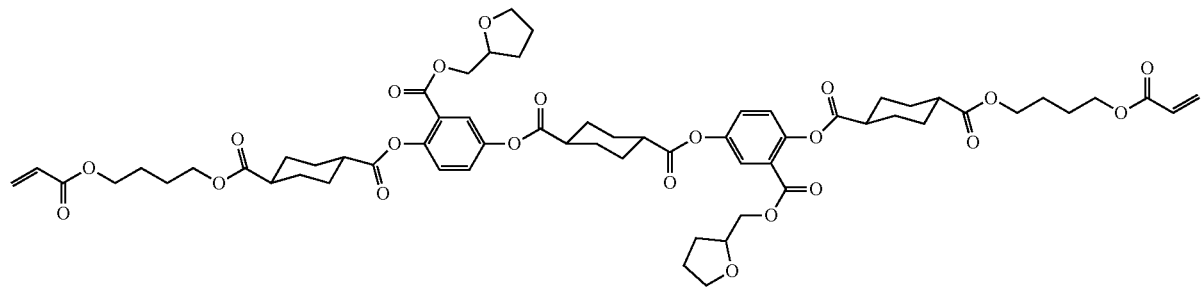
1-7
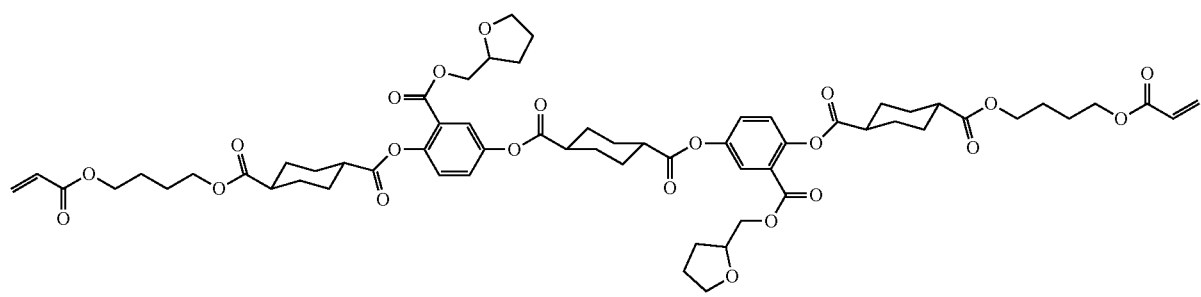
1-8
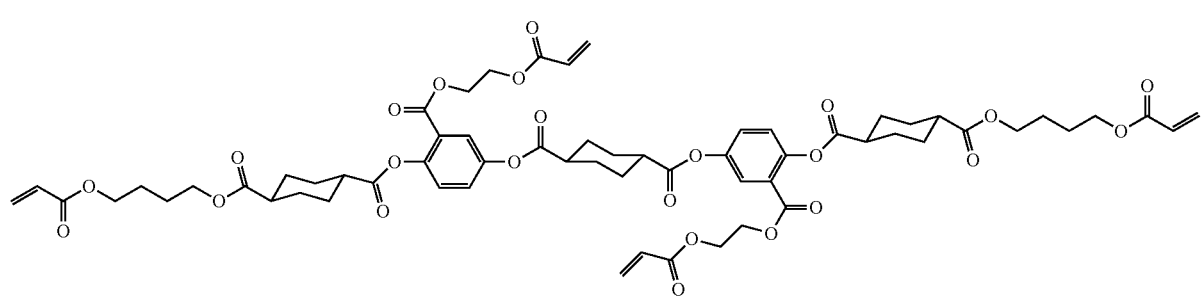
1-9
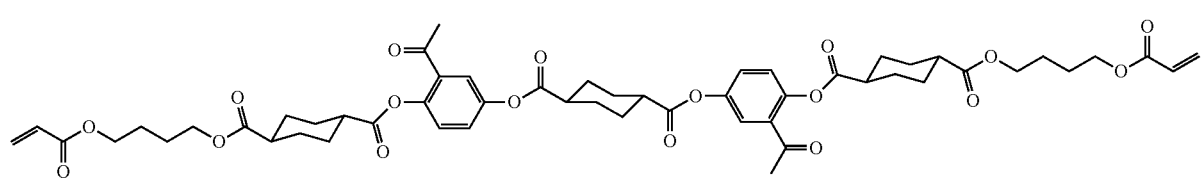
1-10
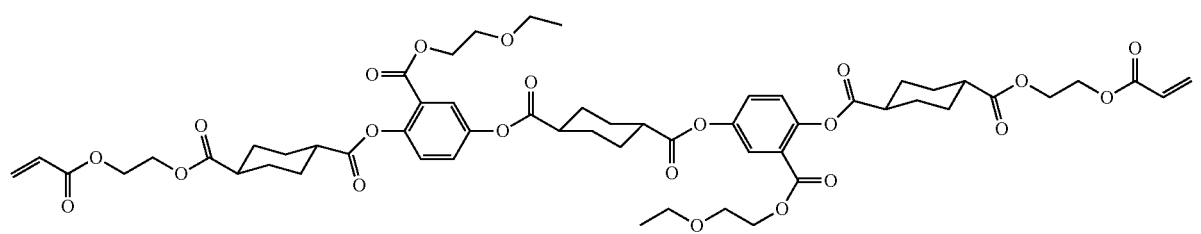
1-11
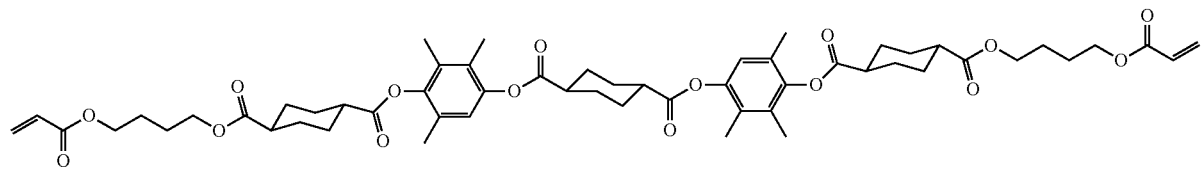

1-12
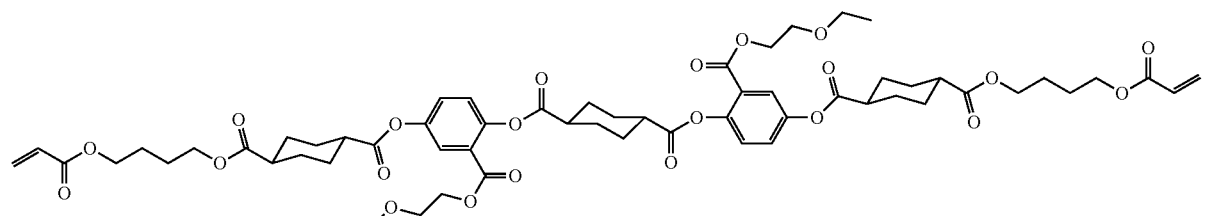
1-13
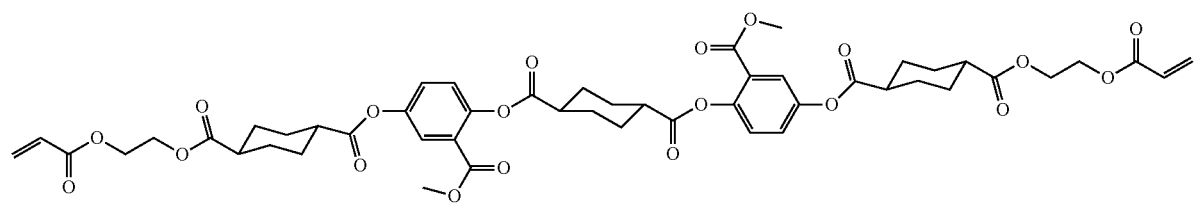
1-14
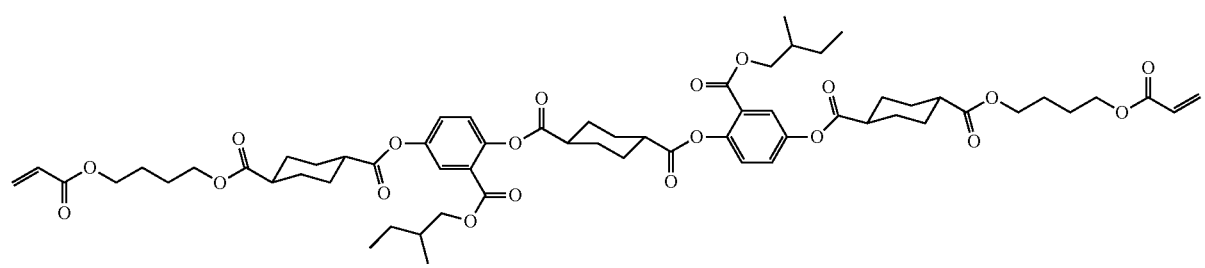
1-15
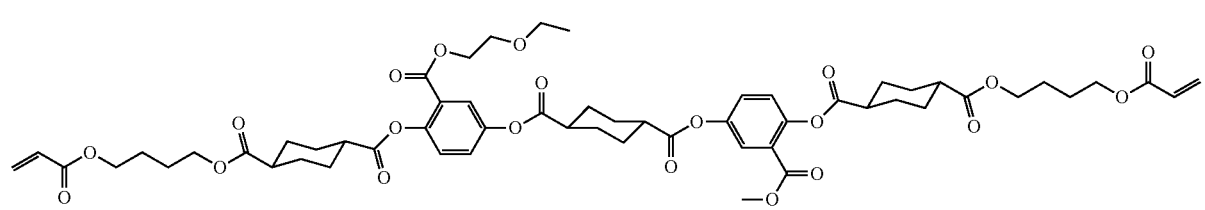
1-16
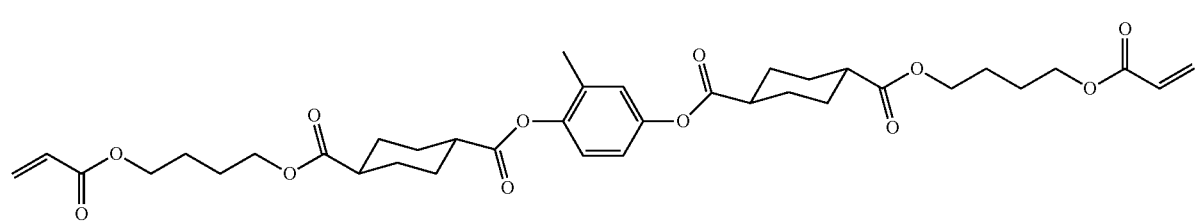
1-17
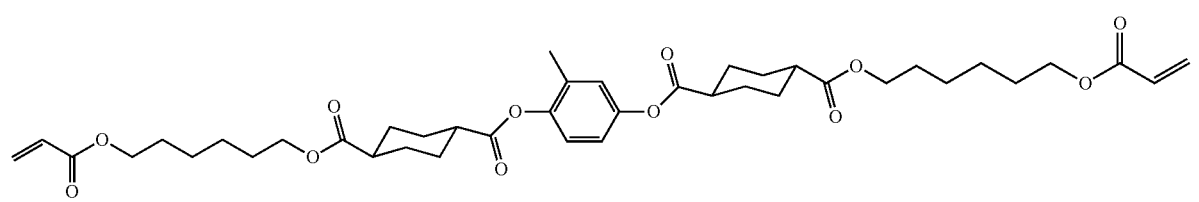
1-18
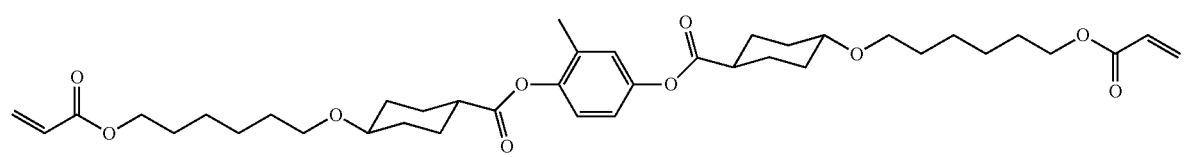

-continued
1-19
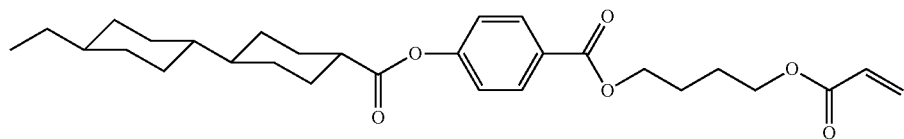
1-20
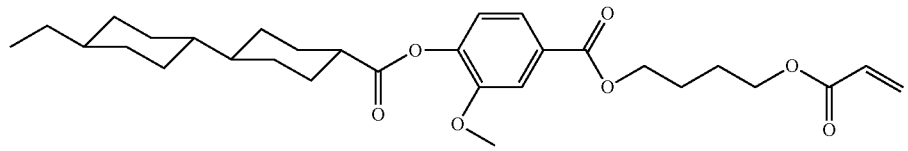
1-21
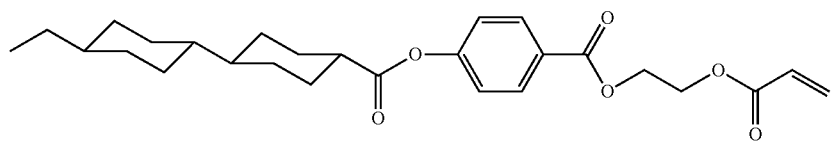
1-22
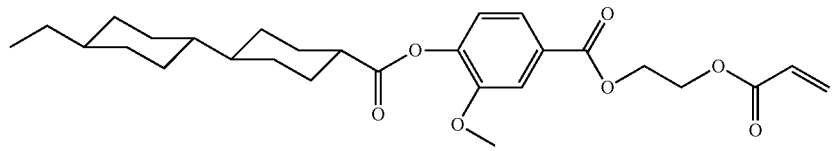
1-23
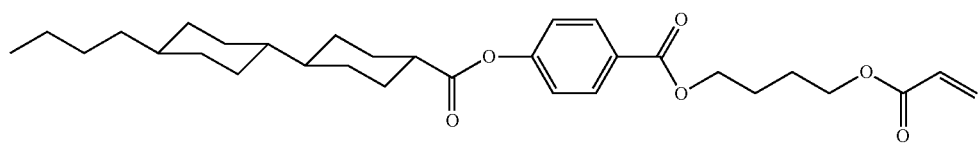
1-24
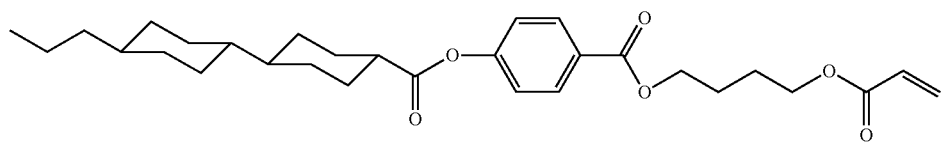
1-25
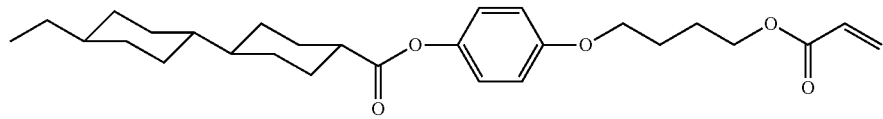
1-26
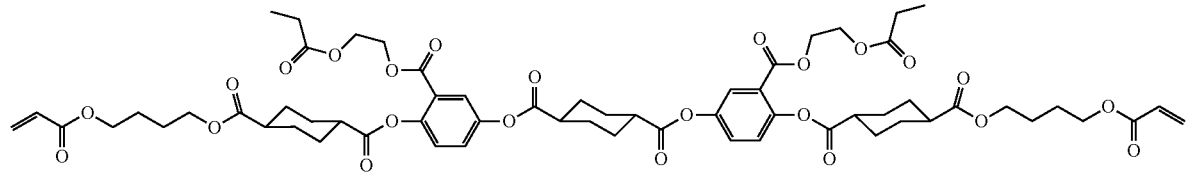
1-27
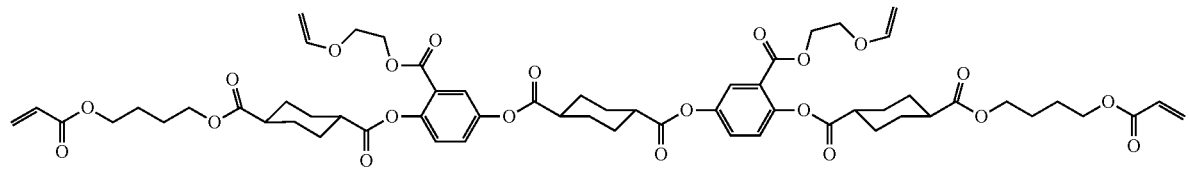

-continued
1-28
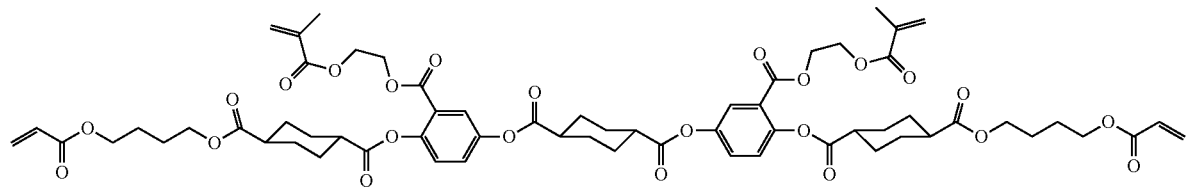
1-29
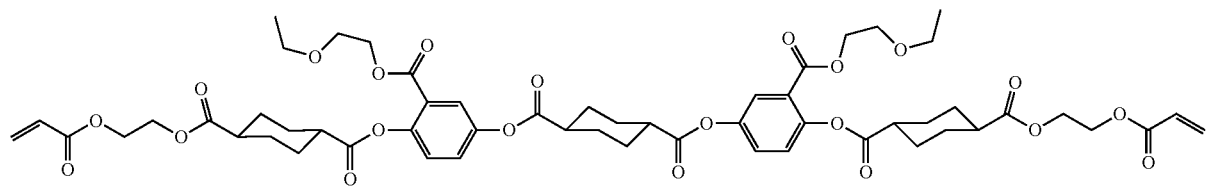
1-30
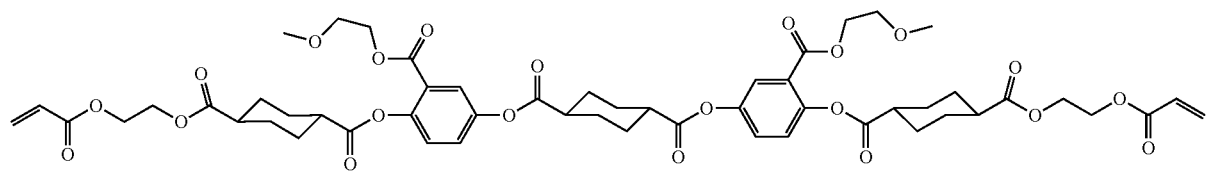
1-31
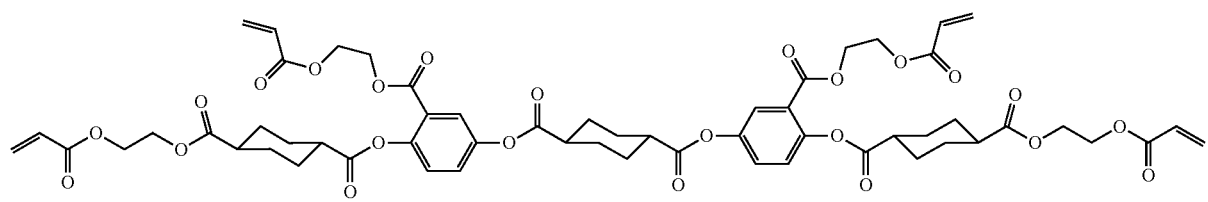
1-32
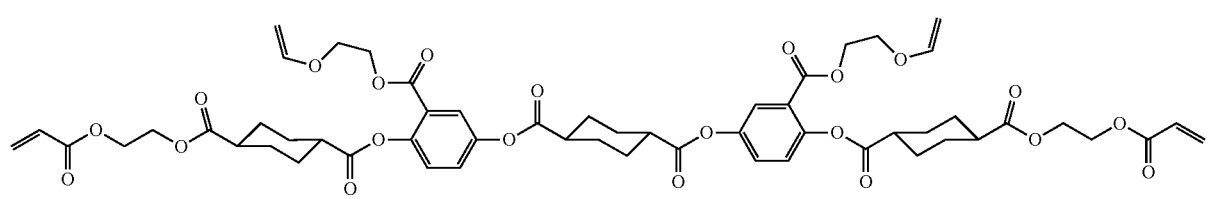
1-33
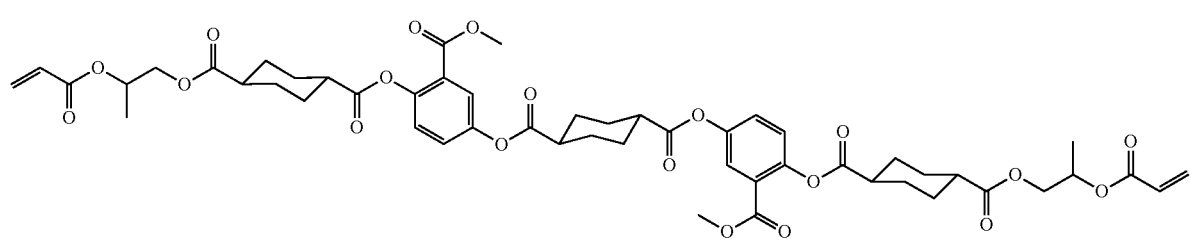
1-34
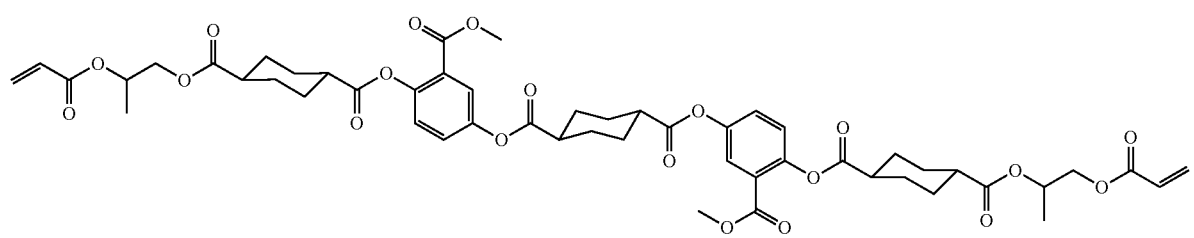

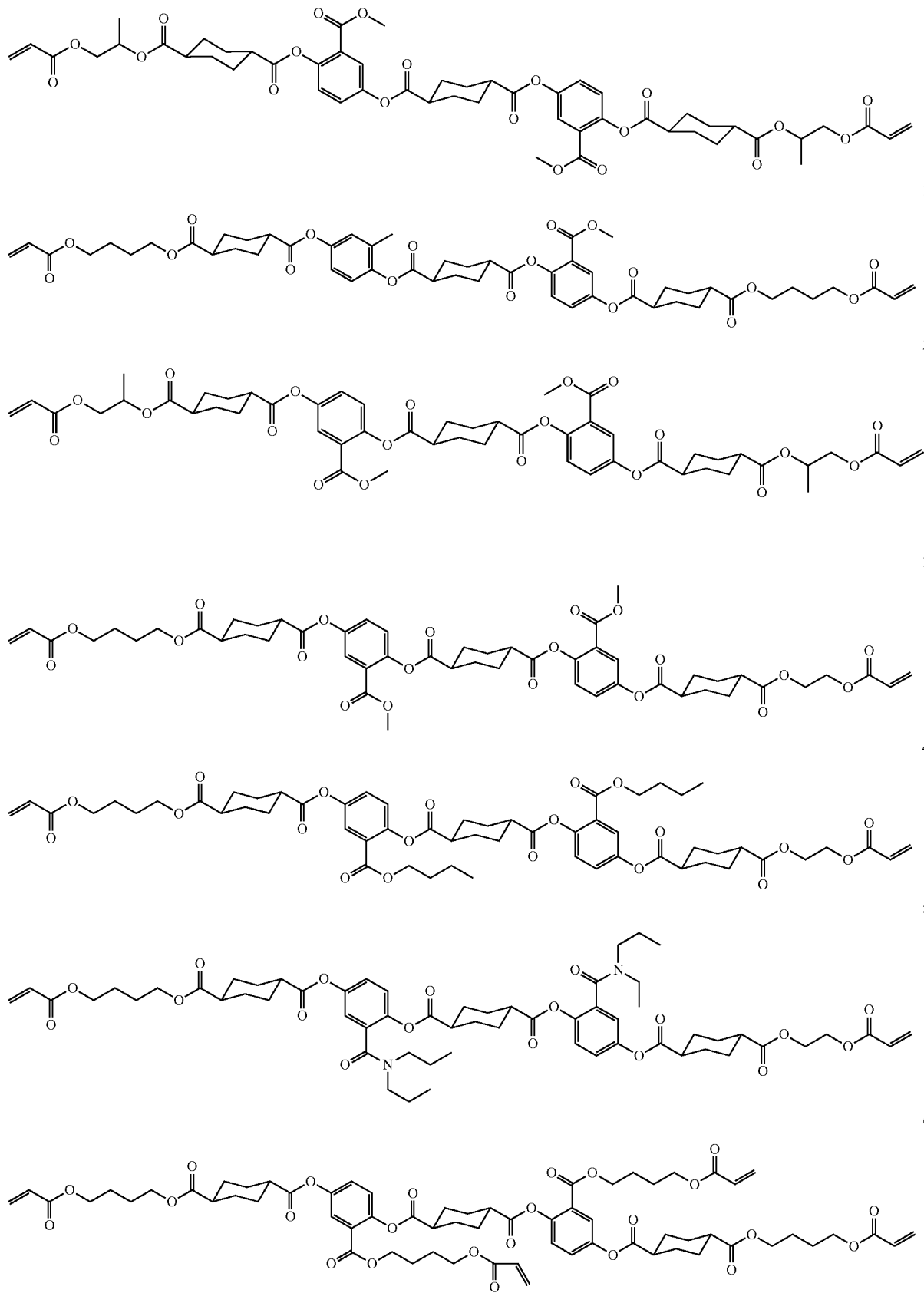

-continued
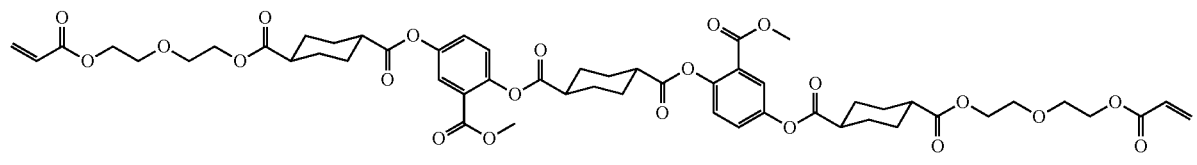
7
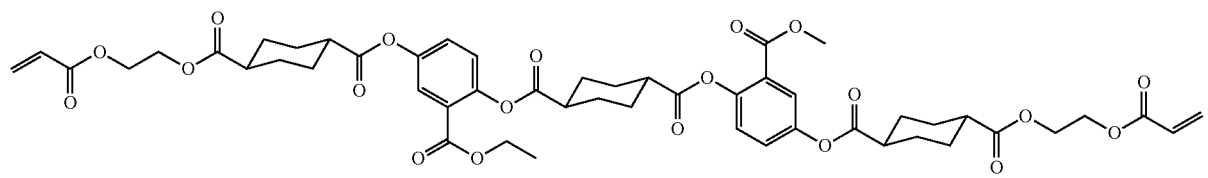
8
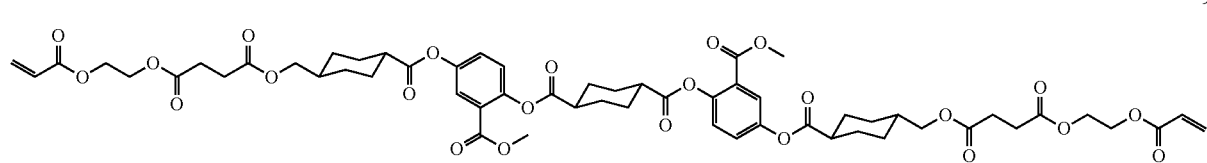
9
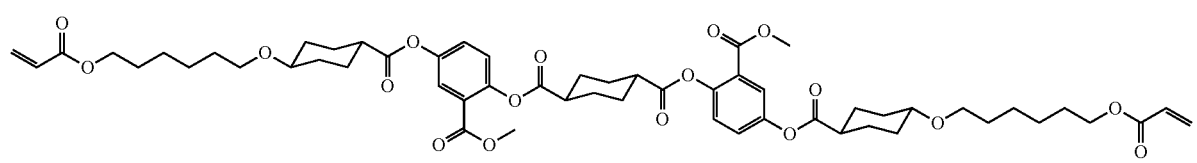
10
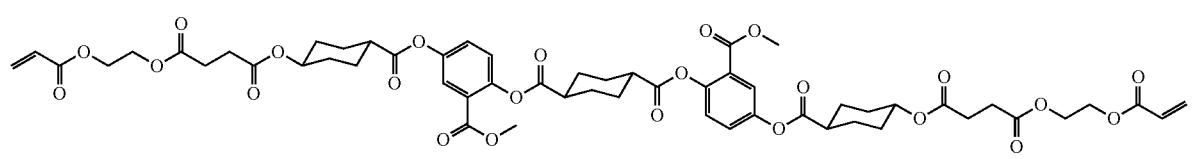
11
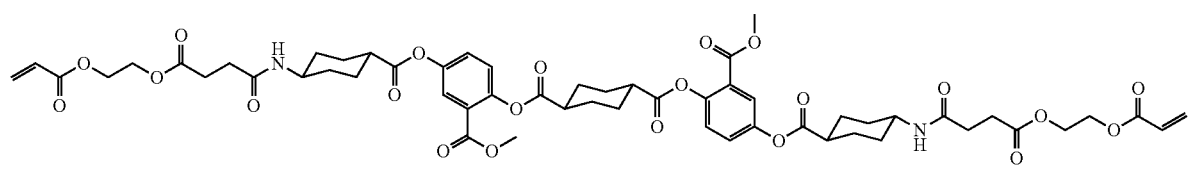
12
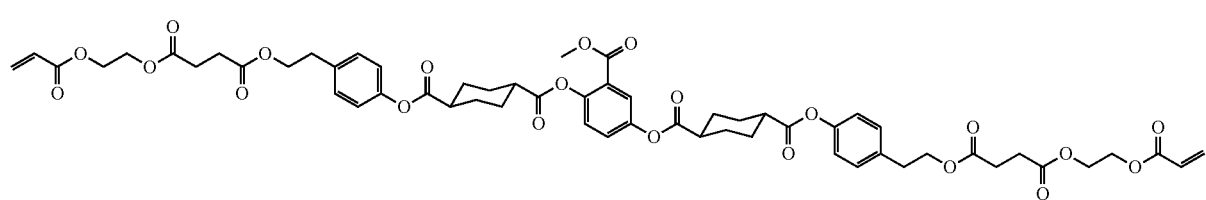
13
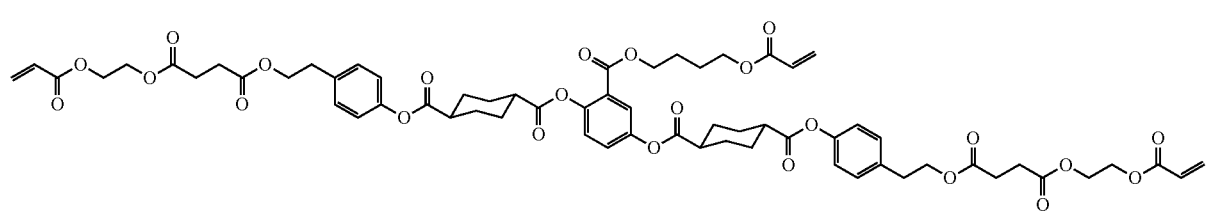
14

15
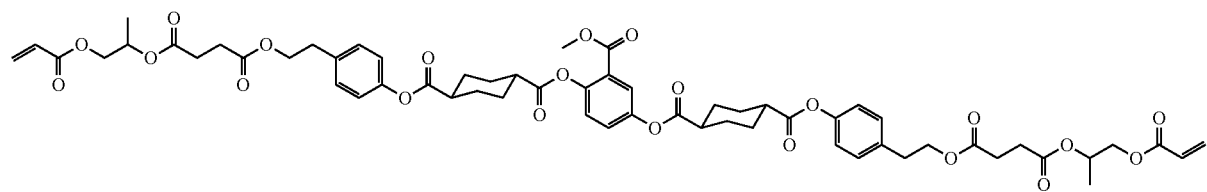
16
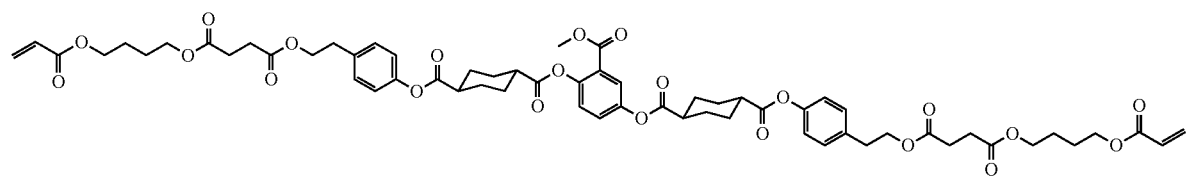
17
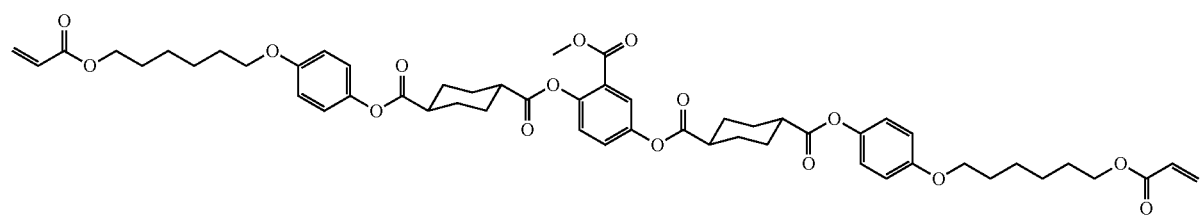
18
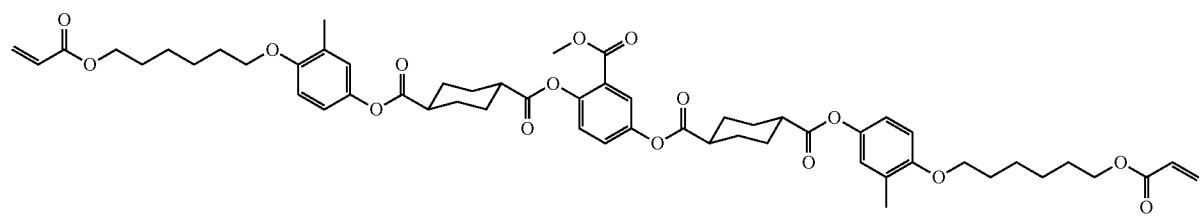
19
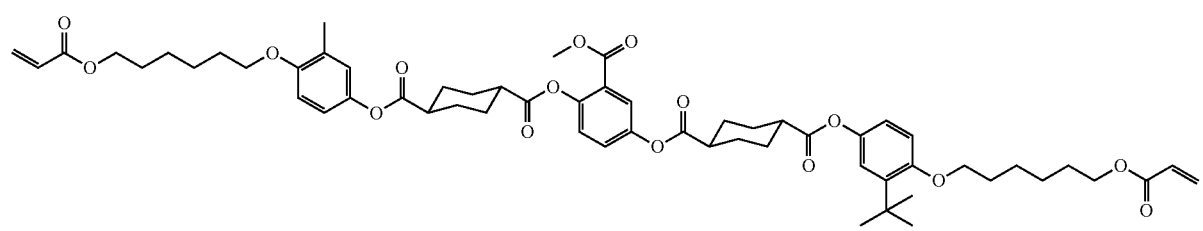
20
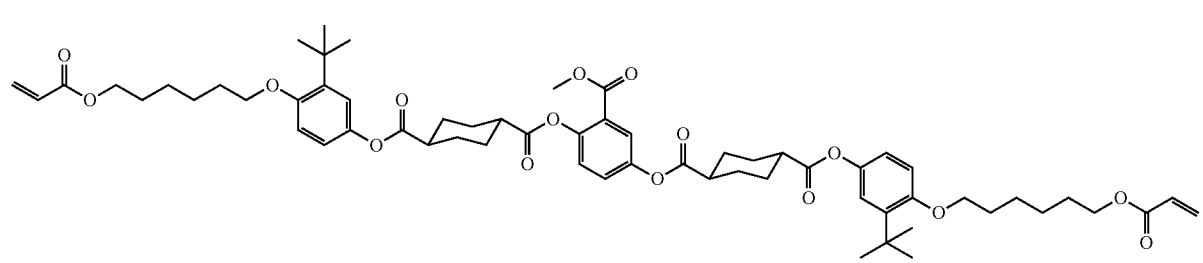

-continued
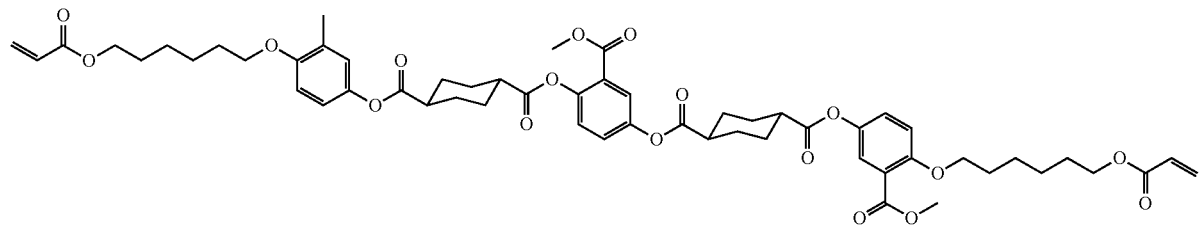
21
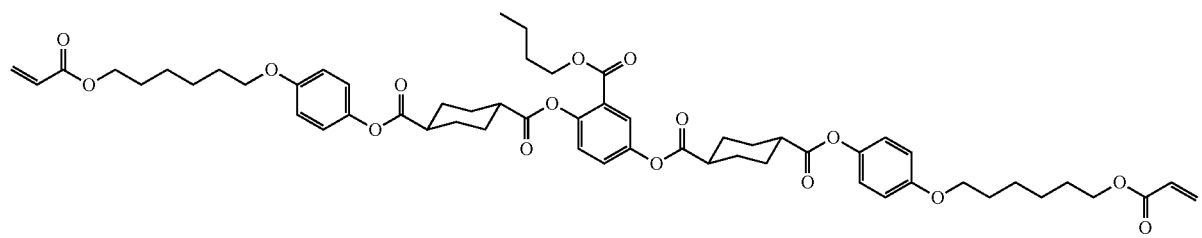
22
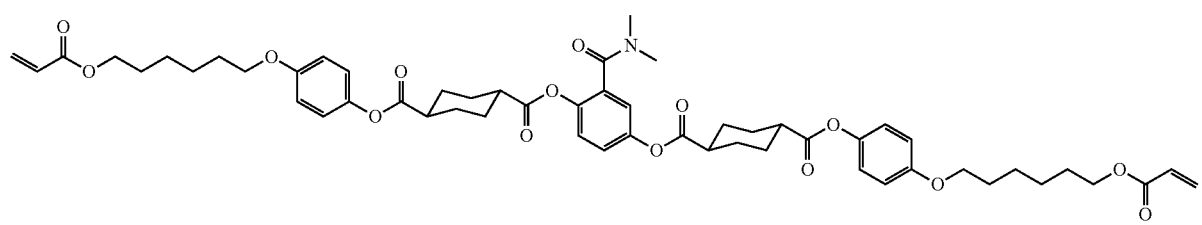
23
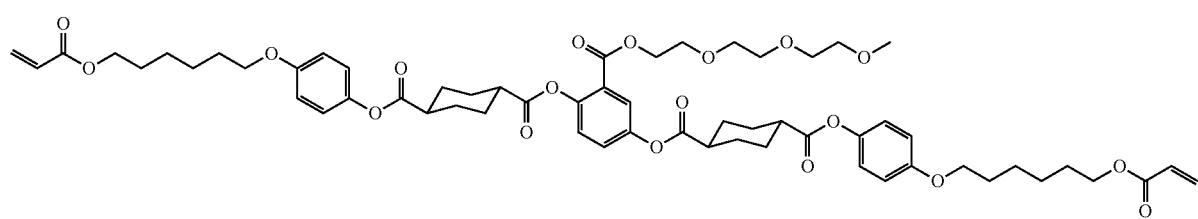
24
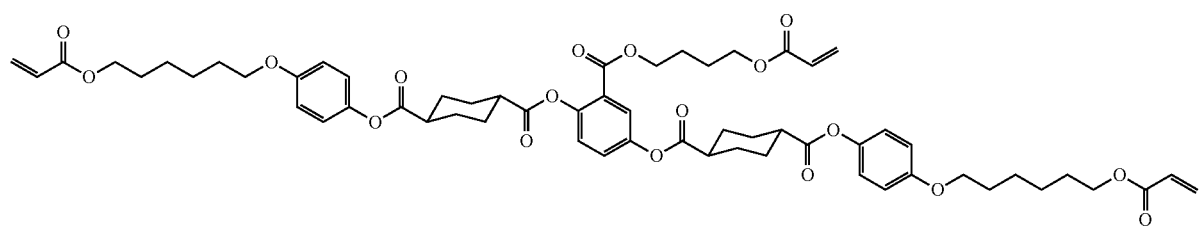
25
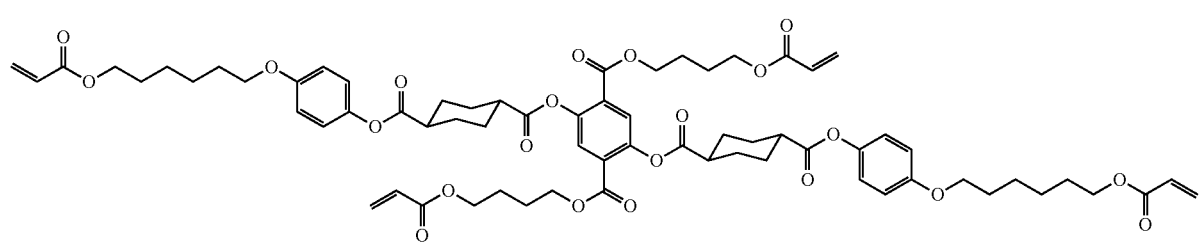
26

-continued
27
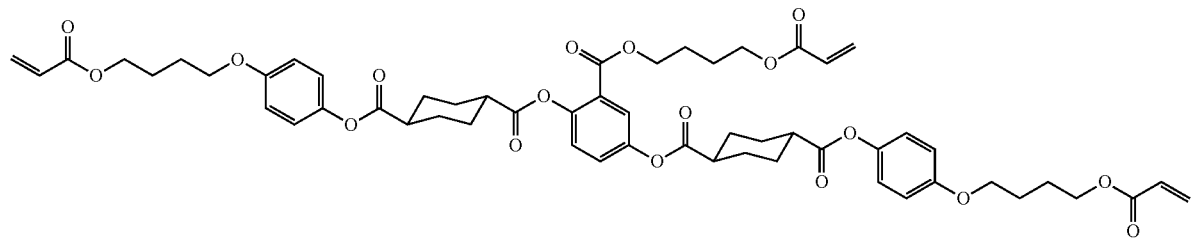
28
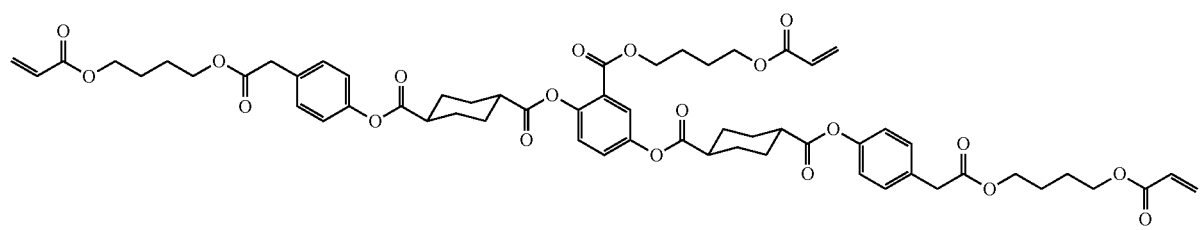
29
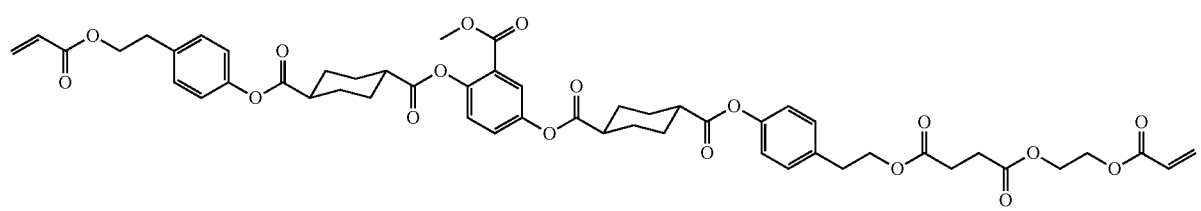
30
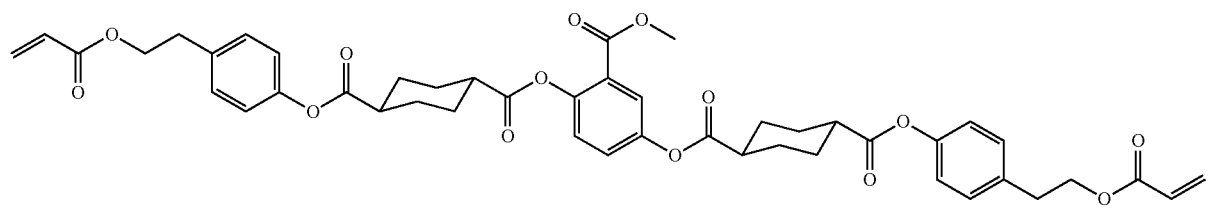
31
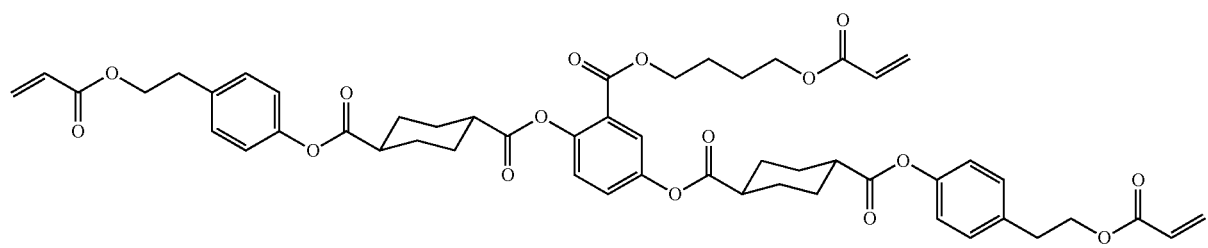
32
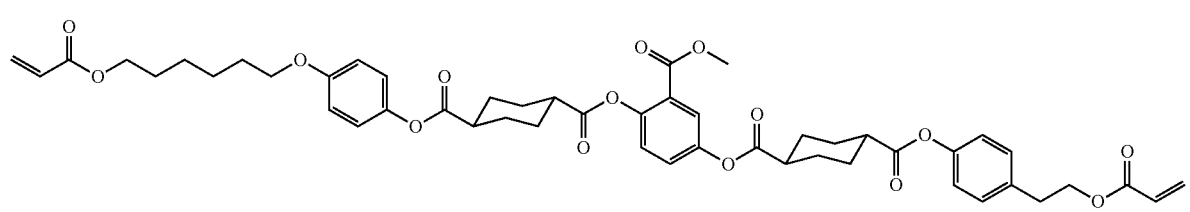

33
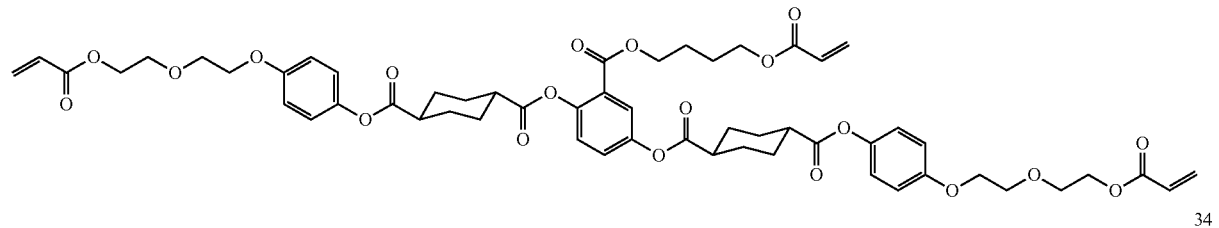
34
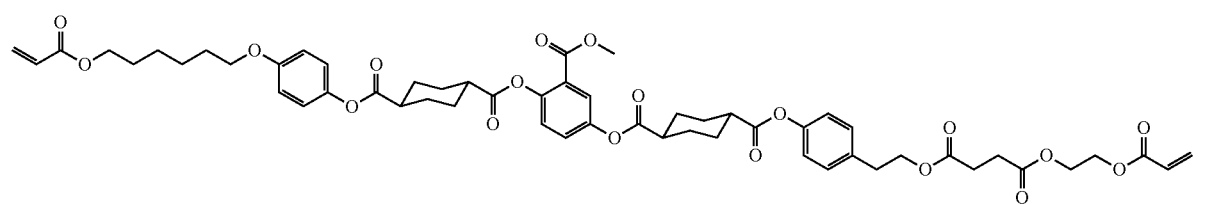
35
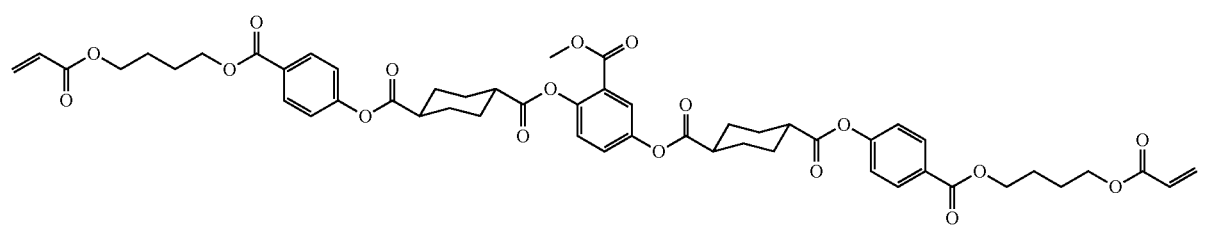
36
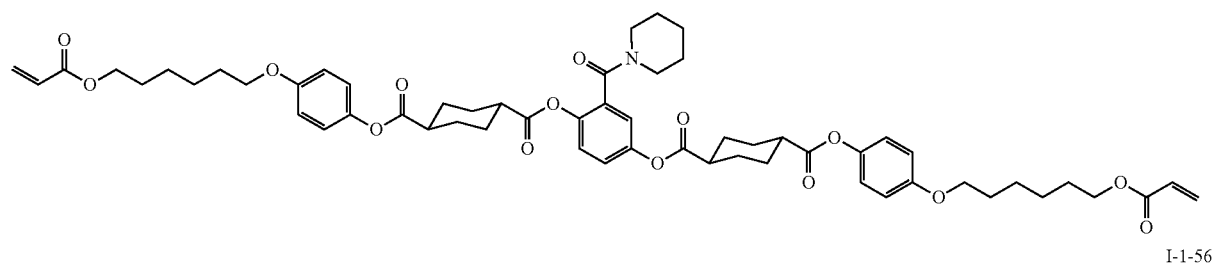
I-1-56
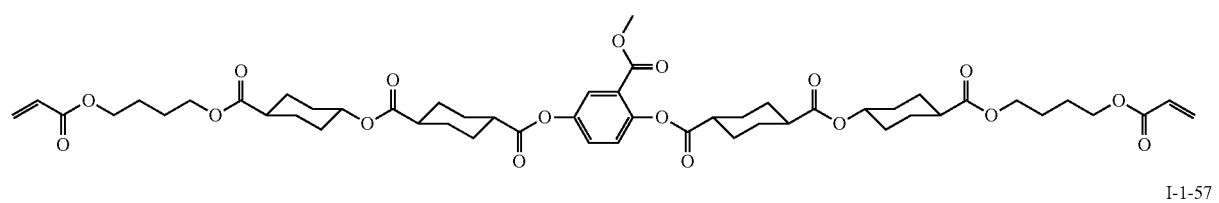
I-1-57
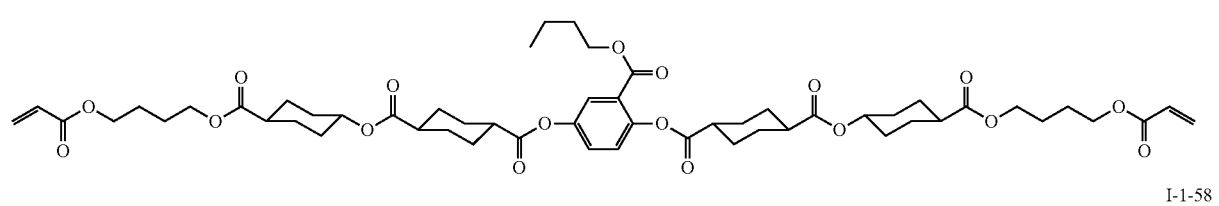
I-1-58
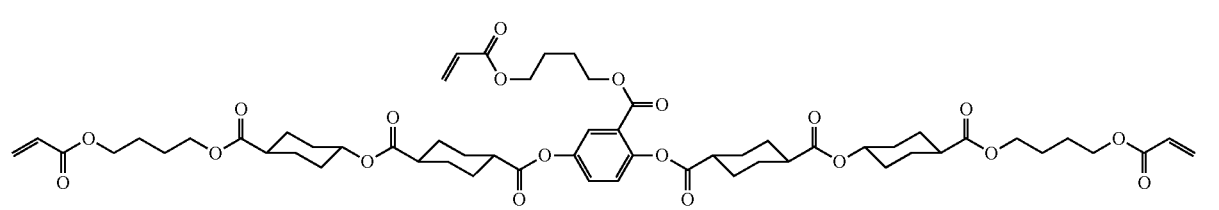

I-1-59

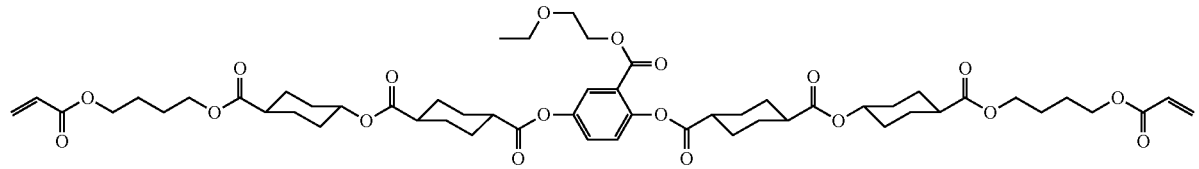

Two or more liquid crystal compounds may be used in combination. For example, two or more liquid crystal compounds represented by Formula (I) may be used in combination.

Among these, it is preferable to use a liquid crystal compound which is a liquid crystal compound represented by Formula (I) and satisfies $0.1<mc<0.3$, together with the liquid crystal compound which is a liquid crystal compound represented by Formula (I) and satisfies $0.4\leq mc\leq 0.8$.

The following compounds are exemplified as the liquid crystal compound which is a liquid crystal compound represented by Formula (I) and satisfies $0.1<mc<0.3$.

2-1

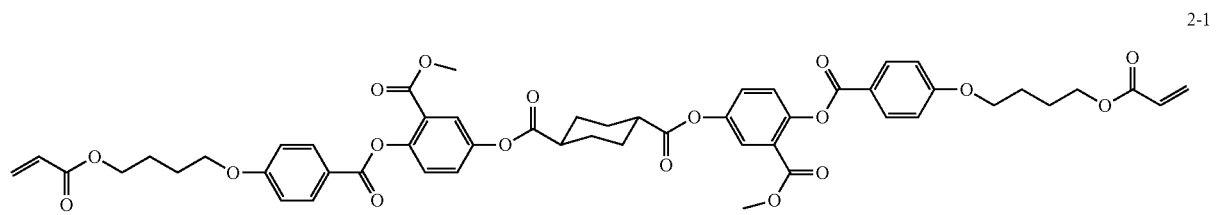

2-2

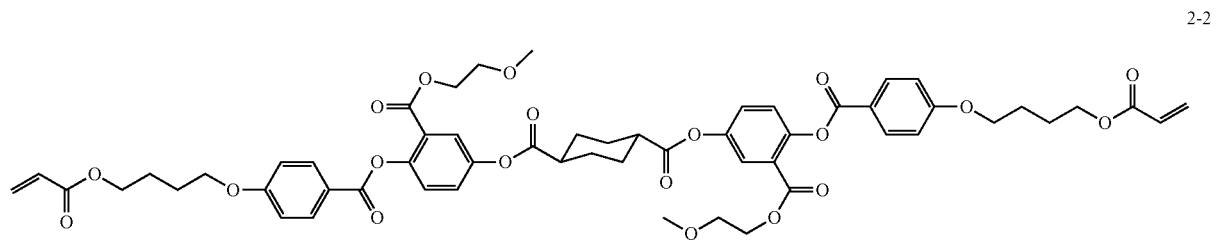

2-3

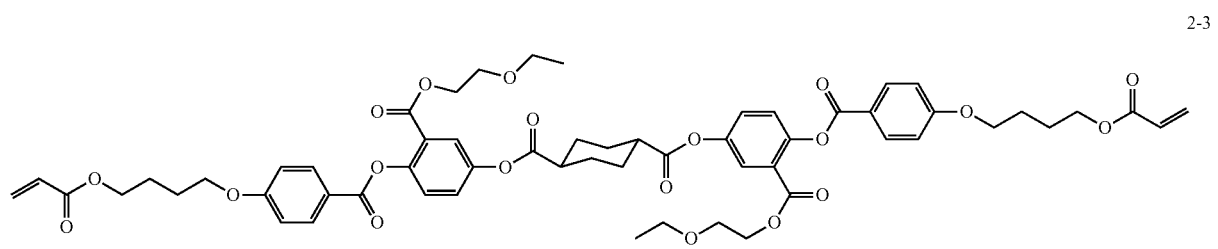

2-4

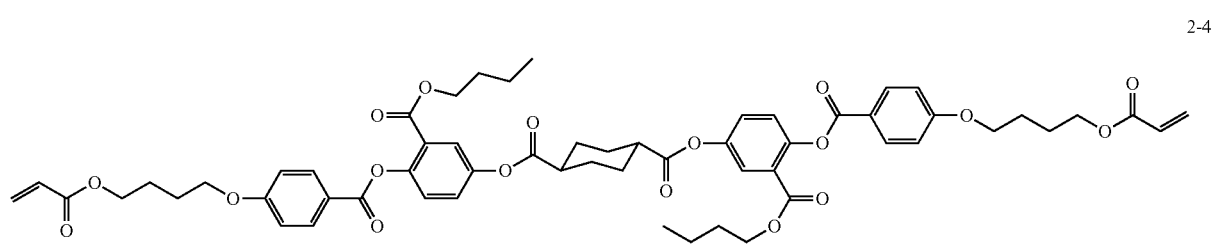

2-5

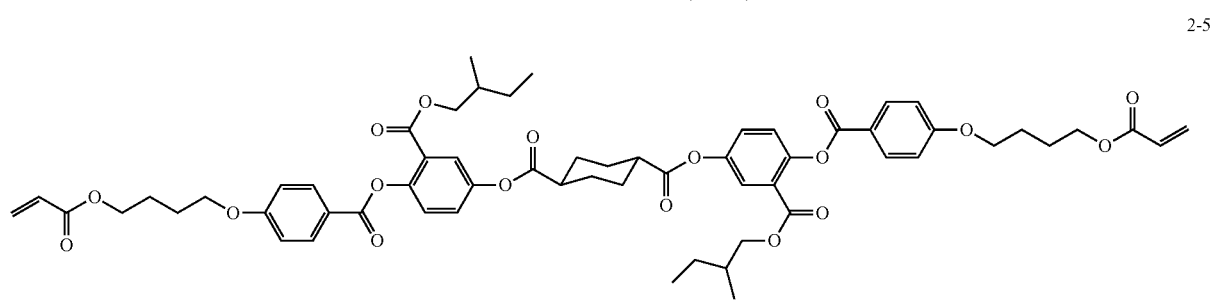

2-6
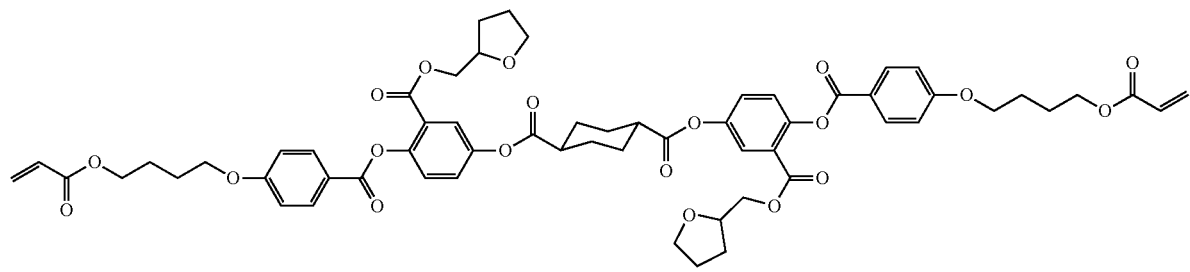
2-7
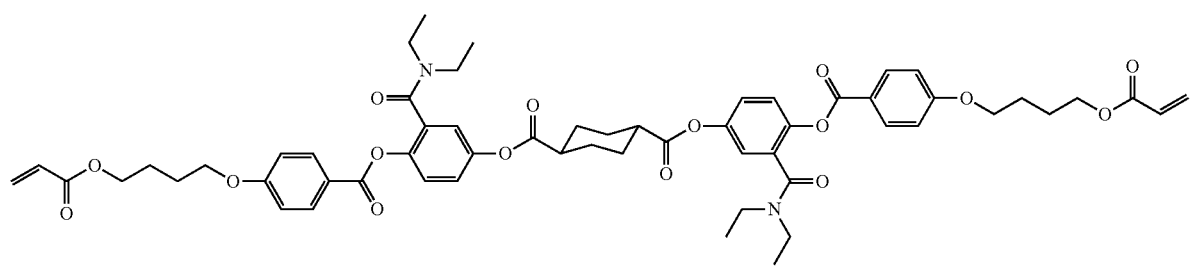
2-8
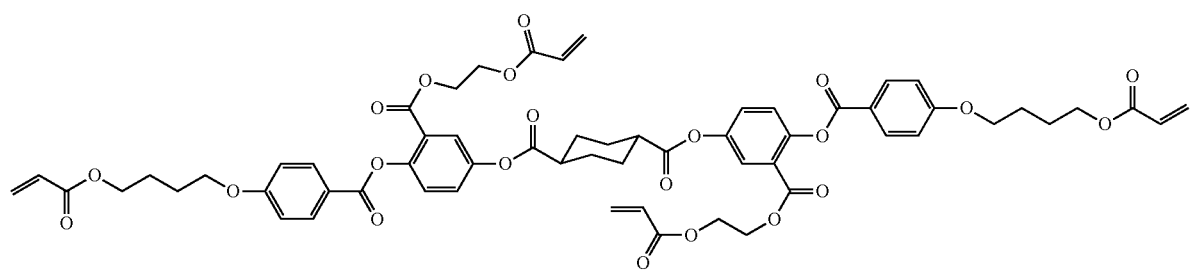
2-9
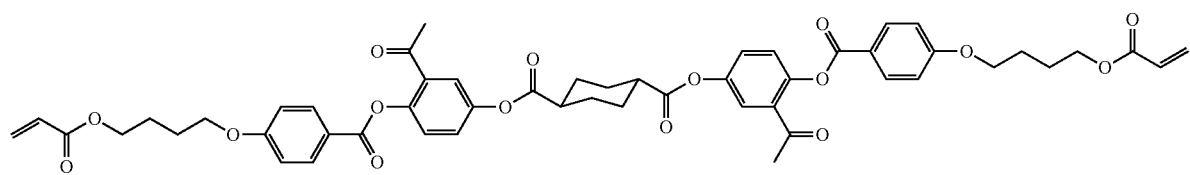
2-10
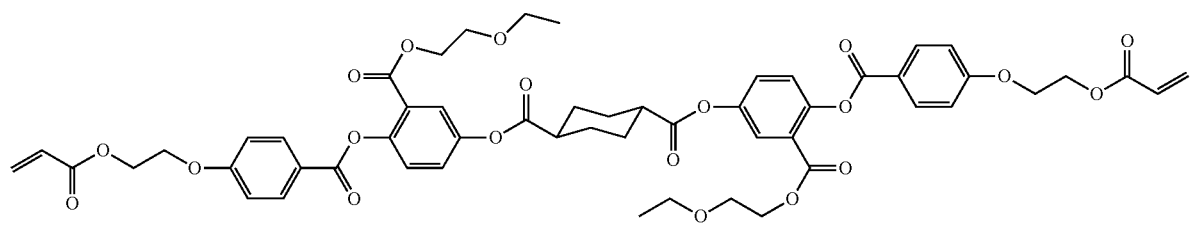
2-11
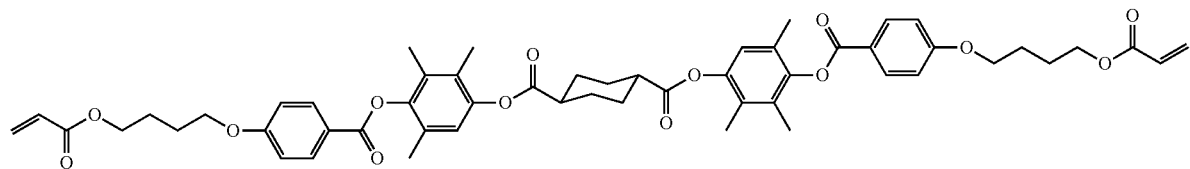

-continued
2-12
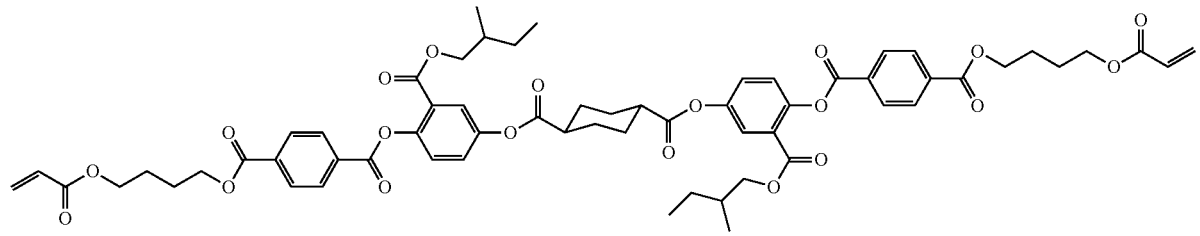
2-13
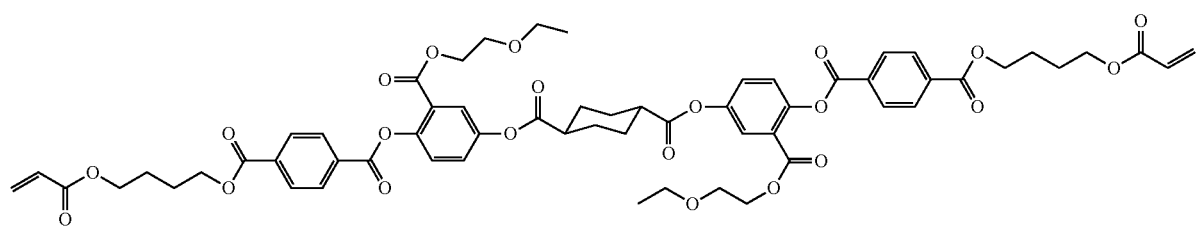
2-14
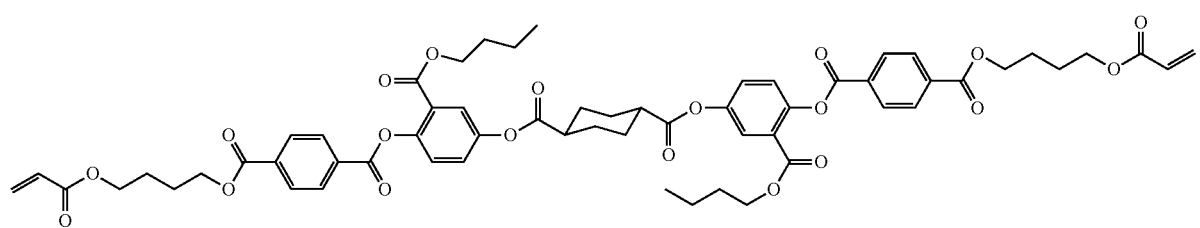
2-15
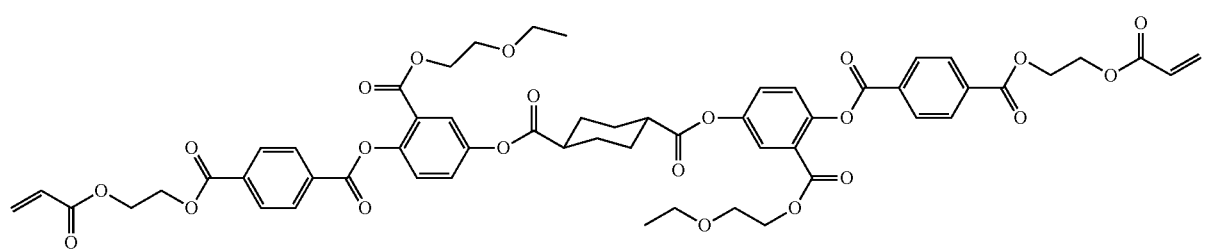
2-16
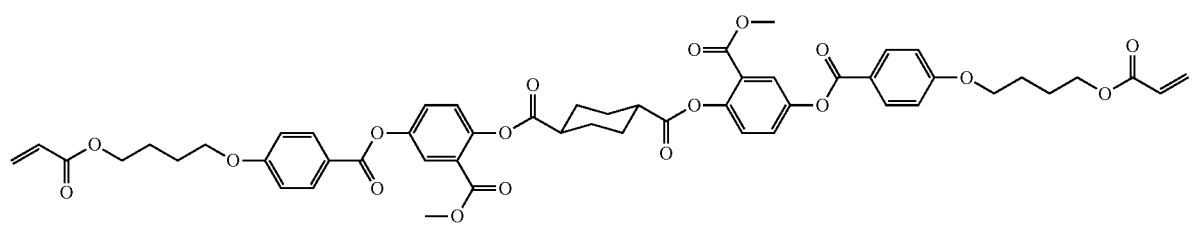
2-17
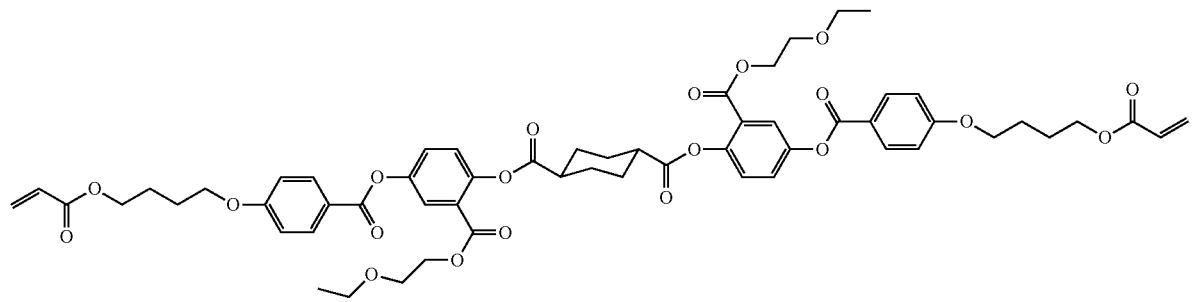

-continued
2-18
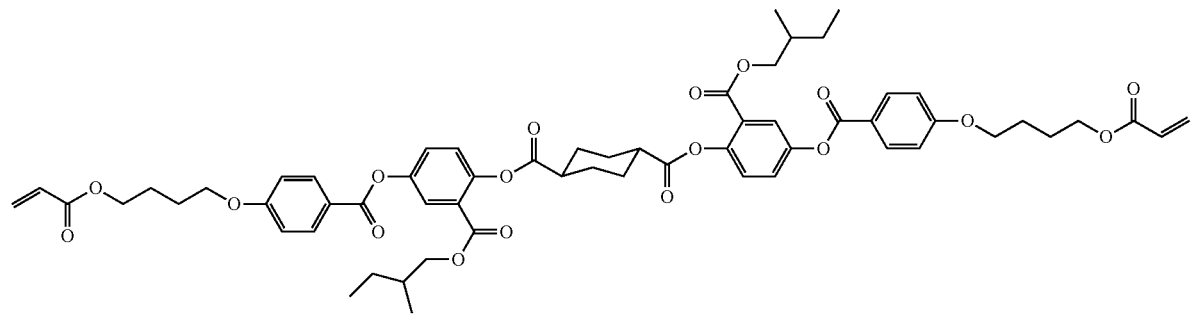
2-19
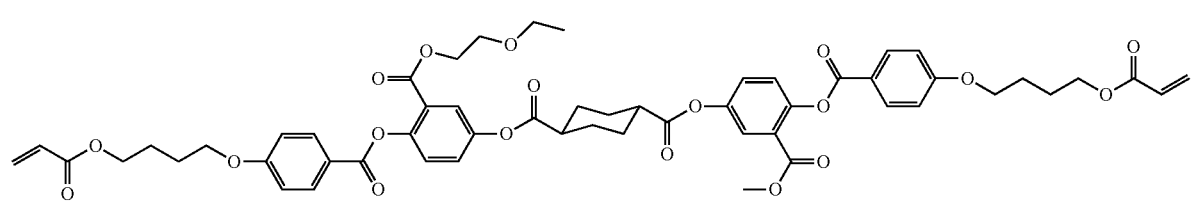
2-20
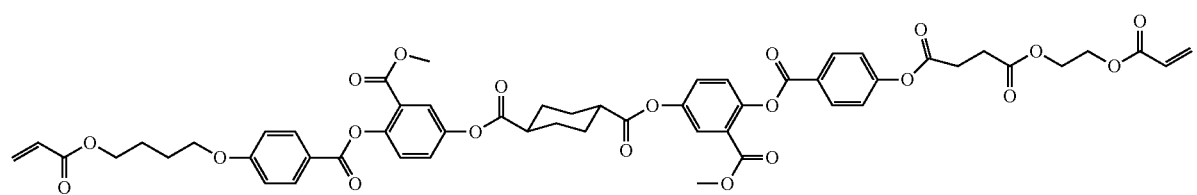
2-21
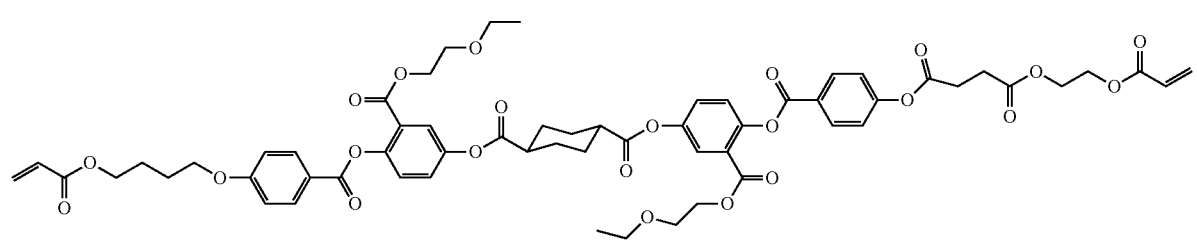
2-22
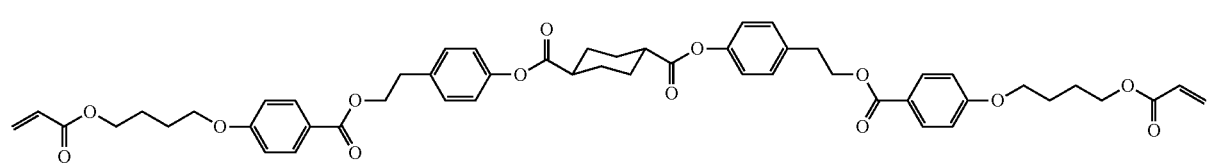
2-23
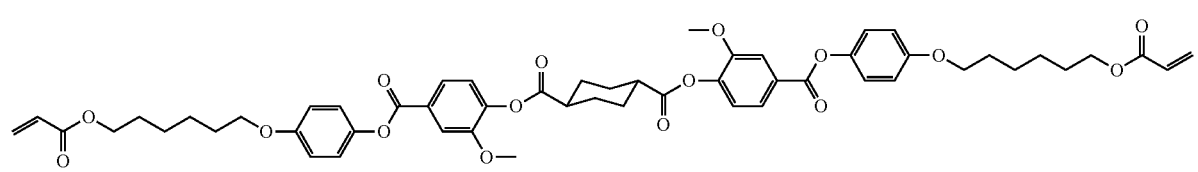
2-24
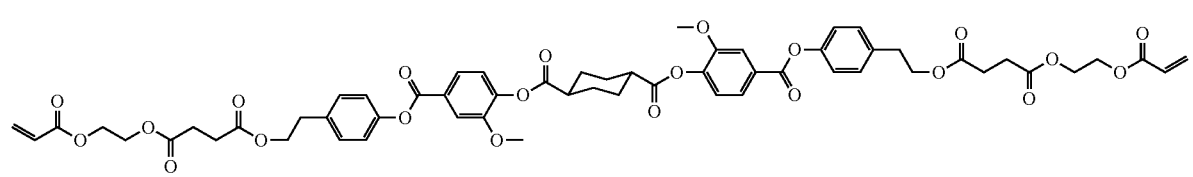

2-28
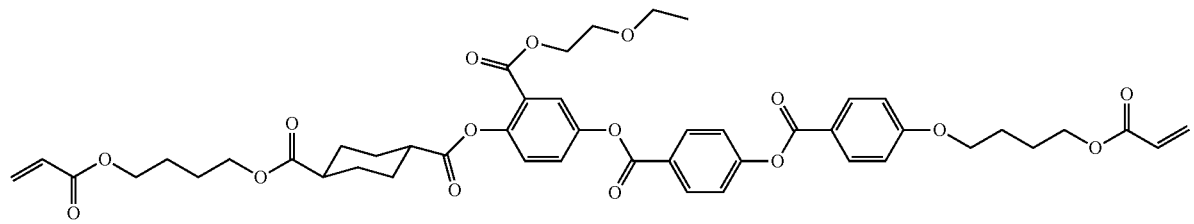
2-29
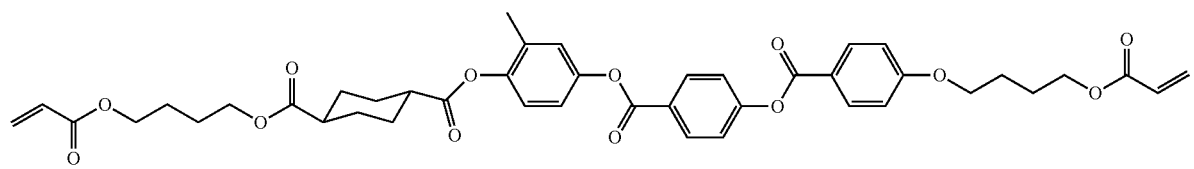
2-30
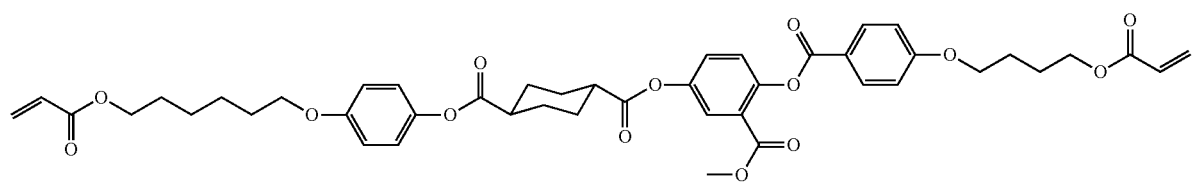
2-31
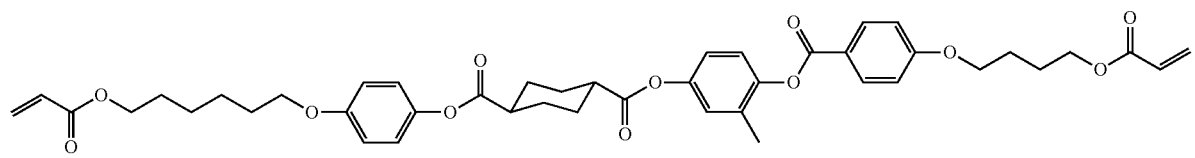
2-32
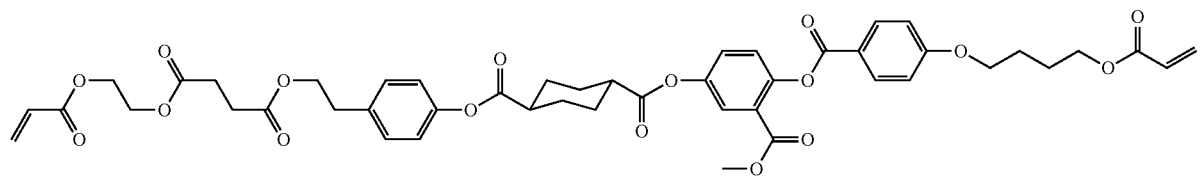
2-33
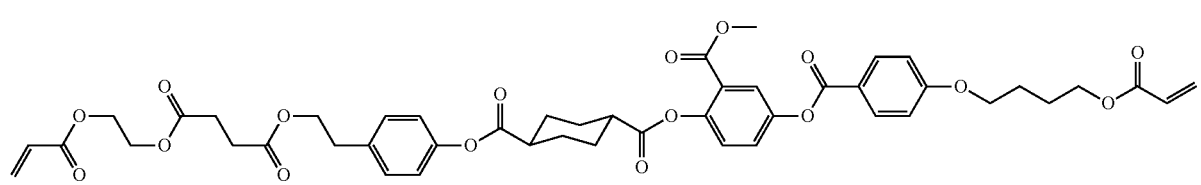
As the liquid crystal compound for use in the present invention, a compound represented by Formula (IV) and described in JP2014-198814A, in particular, a polymerizable liquid crystal compound having one (meth)acrylate group represented by Formula (IV) is also suitably used.
Formula (IV)
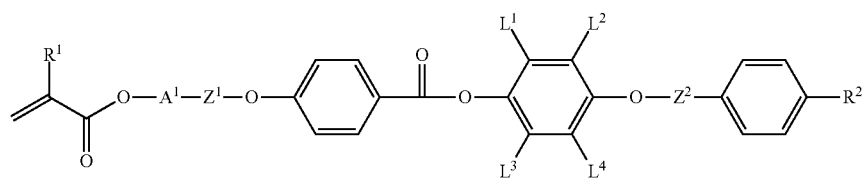

In Formula (IV), $A^1$ represents an alkylene group having 2 to 18 carbon atoms, in which one $CH_2$ in the alkylene group or two or more non-adjacent $CH_2$ may be substituted with —O—;

$Z^1$ represents —C(=O)—, —O—C(=O)—, or a single bond;

$Z^2$ represents —C(=O)— or C(=O)—CH=CH—;

$R^1$ represents a hydrogen atom or a methyl group;

$R^2$ represents a hydrogen atom, a halogen atom, a linear alkyl group having 1 to 4 carbon atoms, a methoxy group, an ethoxy group, a phenyl group which may have a substituent, a vinyl group, a formyl group, a nitro group, a cyano group, an acetyl group, an acetoxy group, an N-acetylamide group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (IV-2); and $L^1$, $L^2$, $L^3$, and $L^4$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^1$, $L^2$, $L^3$, or $L^4$ represents a group other than a hydrogen atom.

—$Z^5$—T—Sp—P    Formula (IV-2)

In Formula (IV-2), P represents an acryloyl group, a methacryl group, or a hydrogen atom, and $Z^5$ represents a single bond, C(=O)O—, —OC(=O)—, —C(=O)NR$^1$— (where $R^1$ represents a hydrogen atom or a methyl group), —NR$^1$C(=O)—, —C(=O)S—, or —SC(=O)—, T represents 1,4-phenylene, and Sp represents a divalent aliphatic group having 1 to 12 carbon atoms which may have a substituent, in which one $CH_2$ in the aliphatic group or two or more non-adjacent $CH_2$ may be substituted with —O—, —S—, —OC(=O)—, —C(=O)O—, or OC(=O)O—.

The compound represented by Formula (IV) is preferably a compound represented by Formula (V).

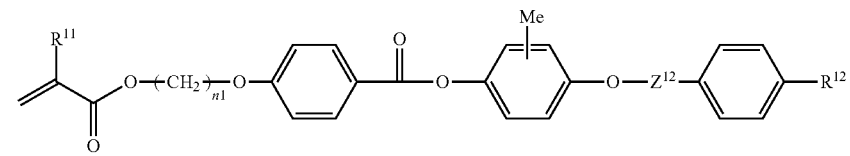

Formula (V)

In Formula (V), n1 represents an integer of 3 to 6;

$R^{11}$ represents a hydrogen atom or a methyl group;

$Z^{12}$ represents —C(=O)— or C(=O)—CH=CH—; and $R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

—$Z^{51}$—T—Sp—P    Formula (IV-3)

In Formula (IV-3), P represents an acryloyl group or a methacryl group;

$Z^{51}$ represents —C(=O)O— or —OC(=O)—; T represents 1,4-phenylene; and

Sp represents a divalent aliphatic group having 2 to 6 carbon atoms which may have a substituent. One $CH_2$ in this aliphatic group or two or more non-adjacent $CH_2$ may be substituted with —O—, —OC(=O)—, —C(=O)O—, or OC(=O)O—.

n1 represents an integer of 3 to 6, preferably 3 or 4.

$Z^{12}$ represents —C(=O)— or C(=O)—CH=CH— and preferably represents —C(=O)—.

$R^{12}$ is a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3), preferably represents a methyl group, an ethyl group, a propyl group, a methoxy group, an ethoxy group, a phenyl group, an acryloylamino group, a methacryloylamino group, or a group represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

Specific examples of the compound represented by Formula (IV) are shown below. However, in the present invention, the compound represented by Formula (IV) is not limited thereto.

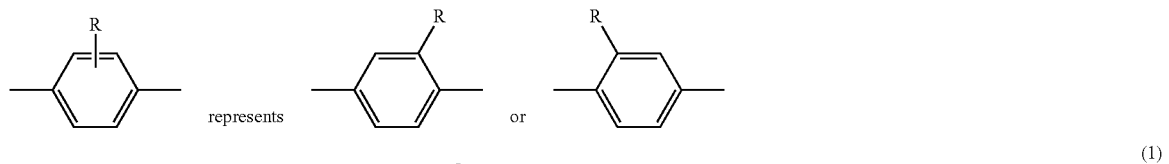
(1)
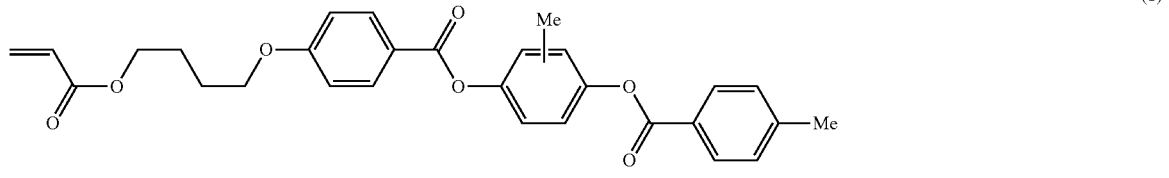
(2)
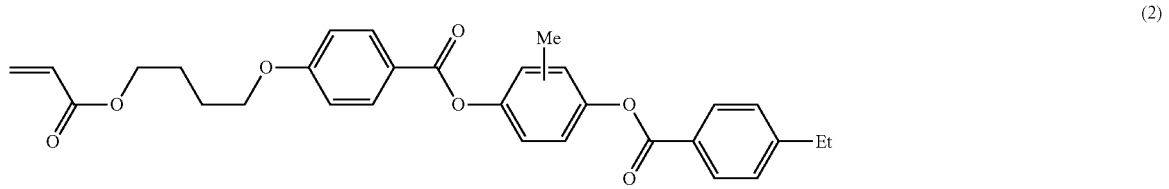
(3)
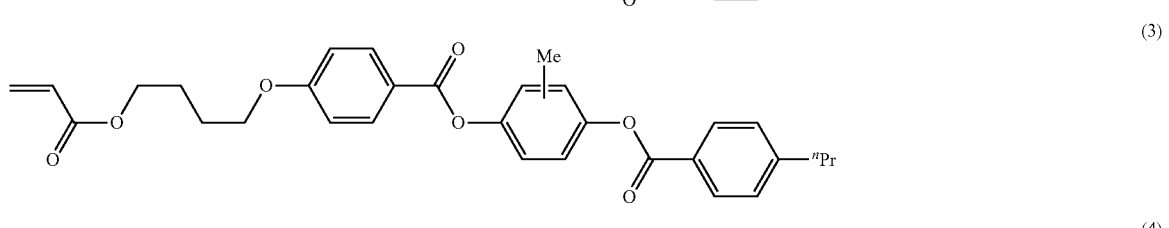
(4)
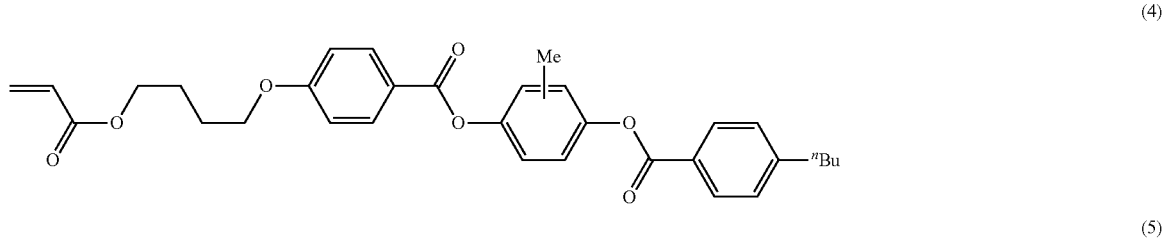
(5)
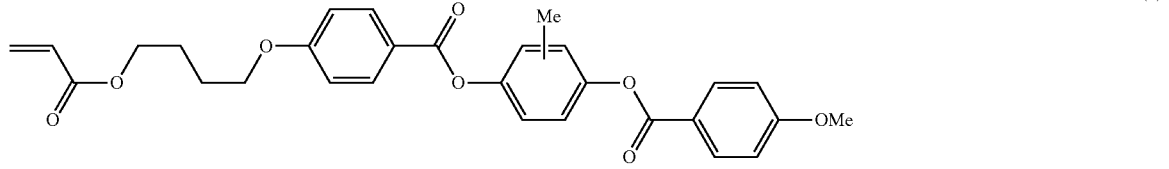
(6)
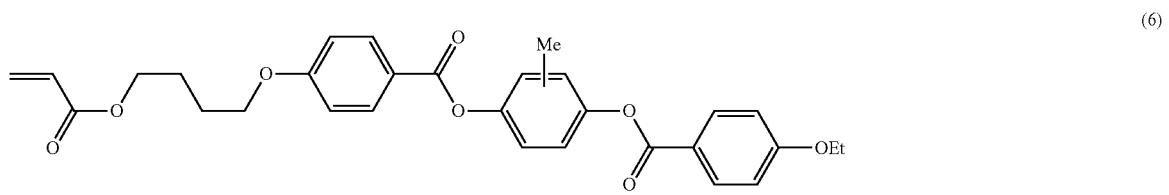
(7)
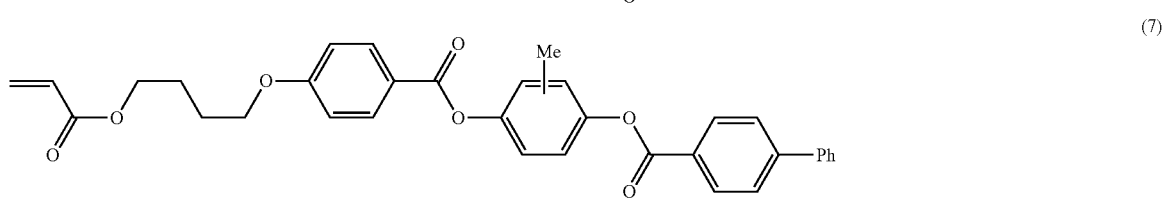
(8)
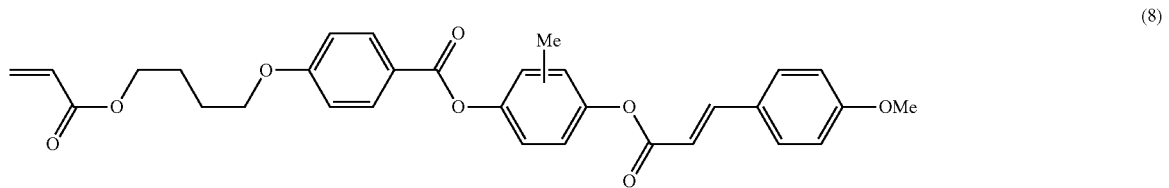

-continued
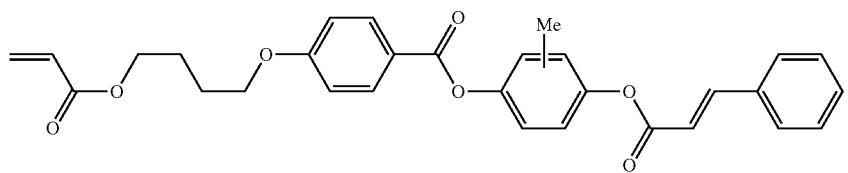
(9)
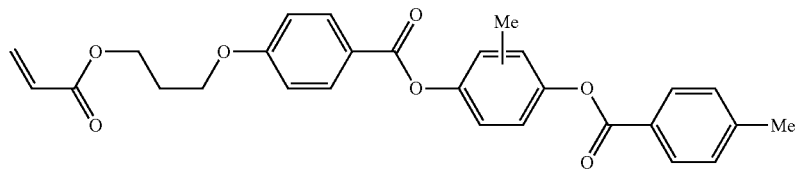
(1A)
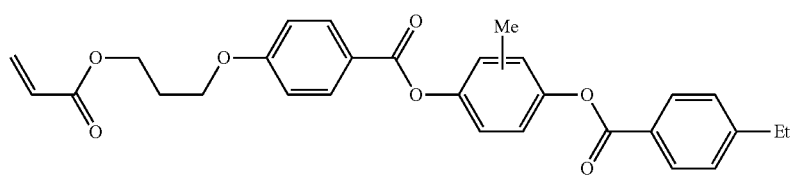
(2A)
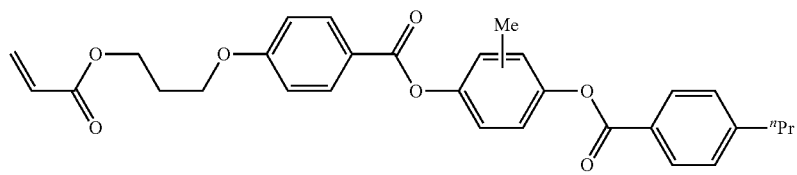
(3A)
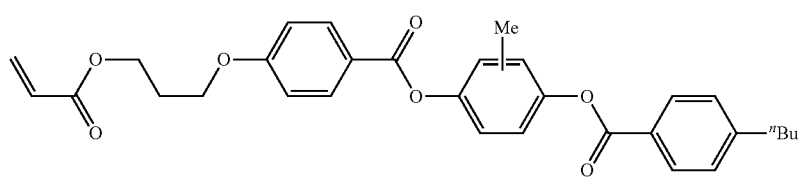
(4A)
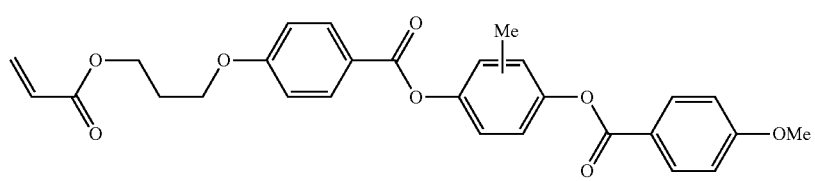
(5A)
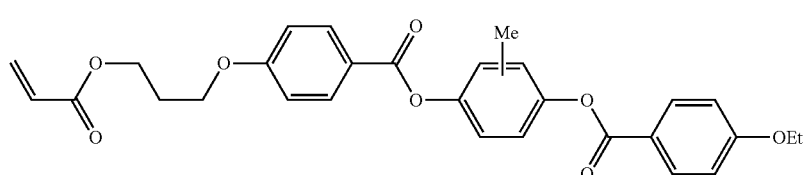
(6A)
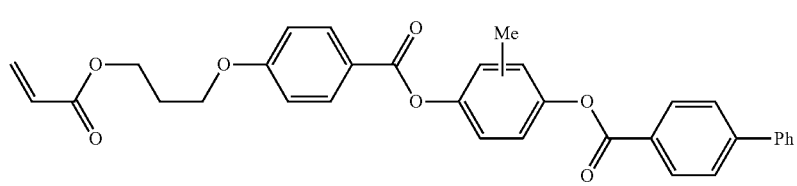
(7A)

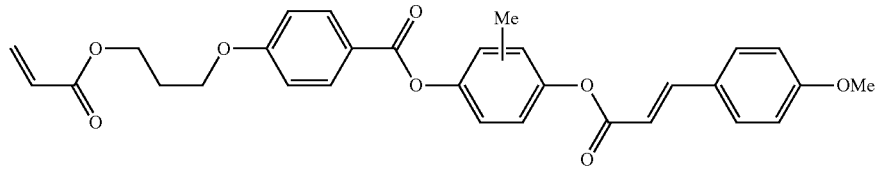
(8A)
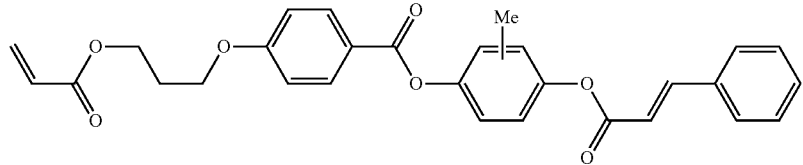
(9A)
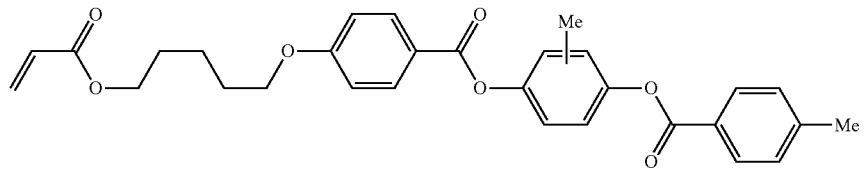
(1B)
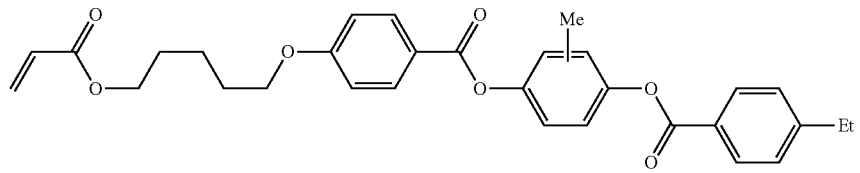
(2B)
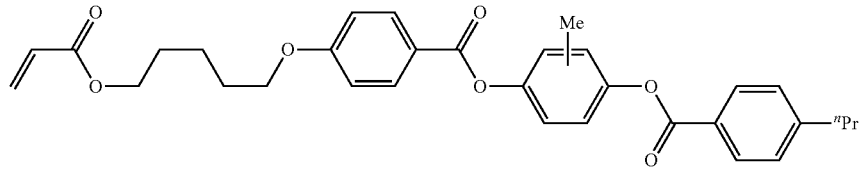
(3B)
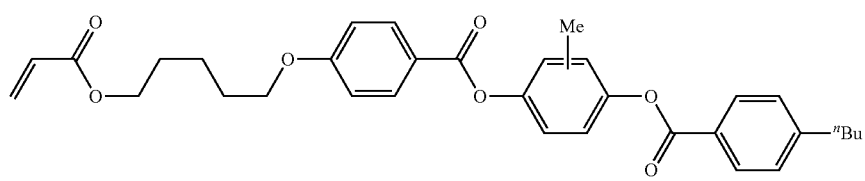
(4B)
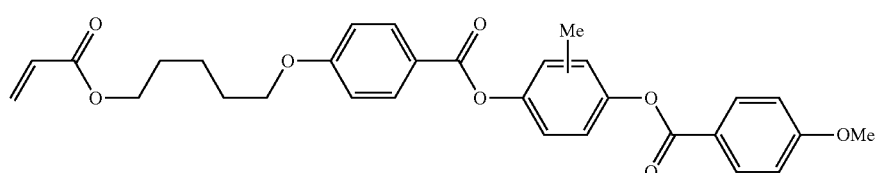
(5B)
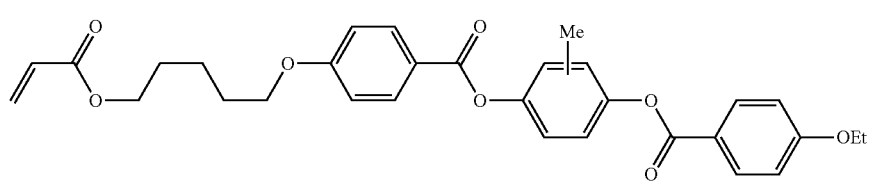
(6B)

-continued
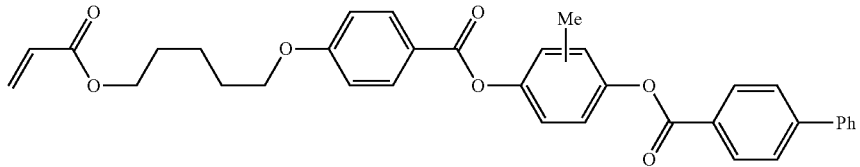
(7B)
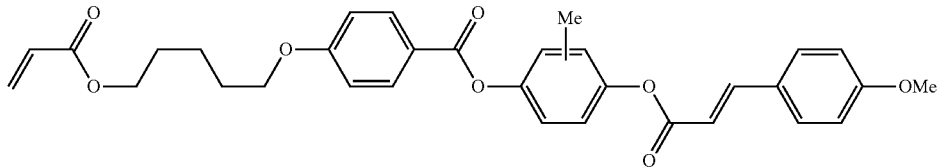
(8B)
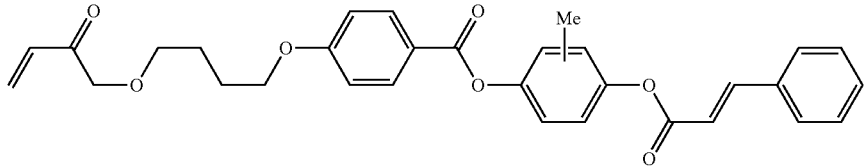
(9B)
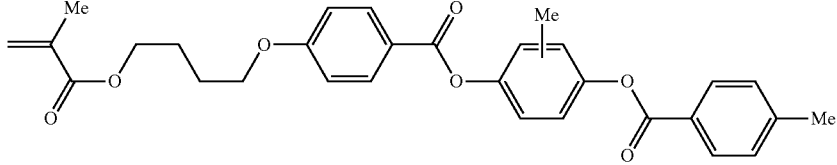
(1C)
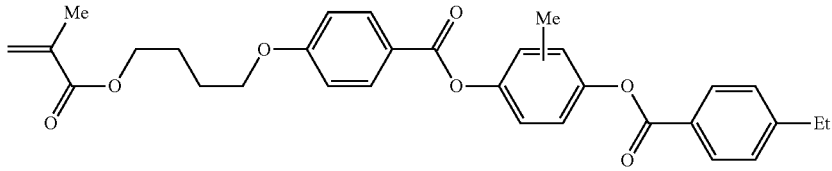
(2C)
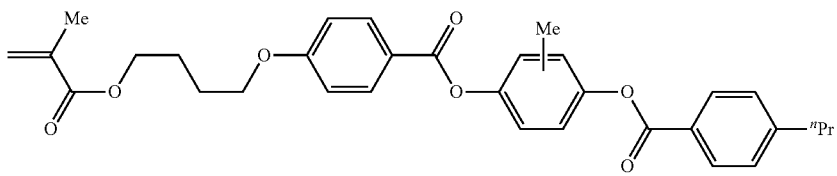
(3C)
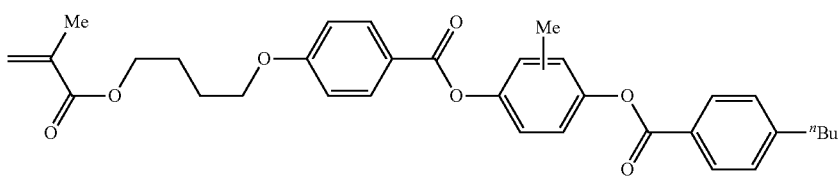
(4C)
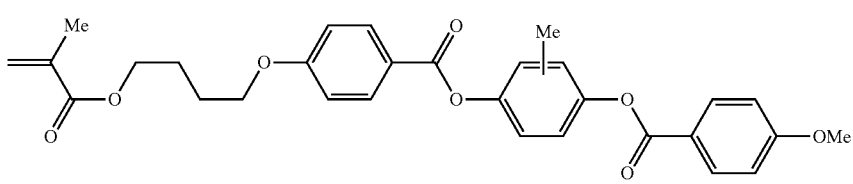
(5C)

-continued
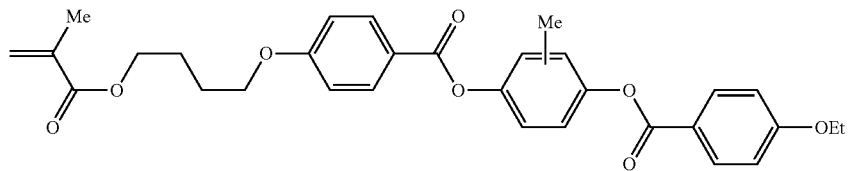
(6C)
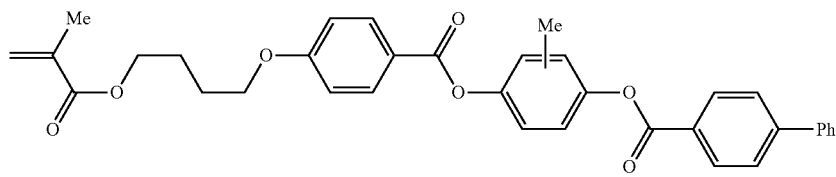
(7C)
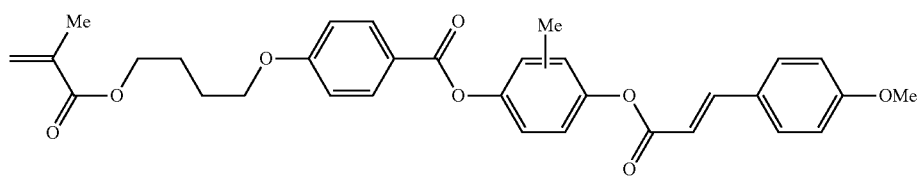
(8C)
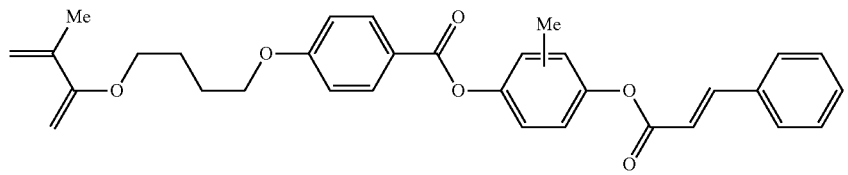
(9C)
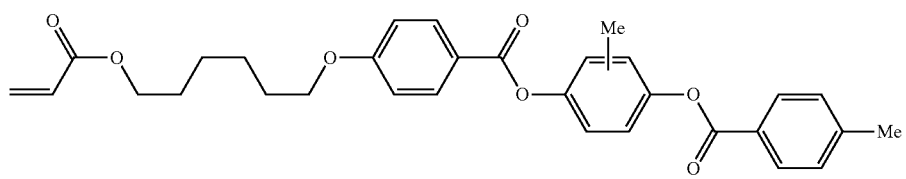
(1D)
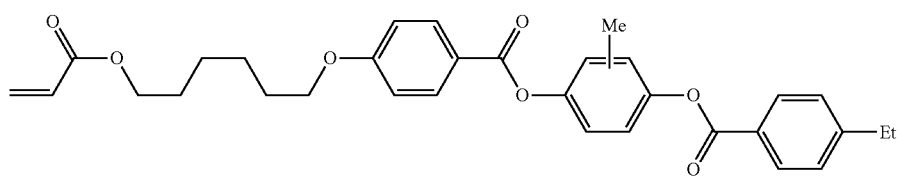
(2D)
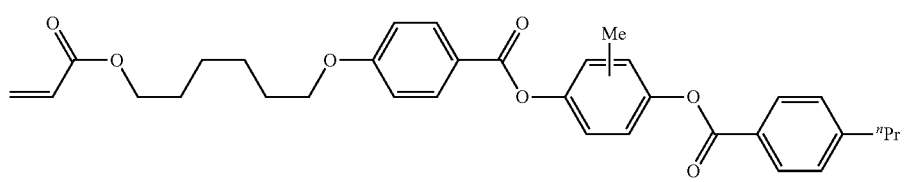
(3D)
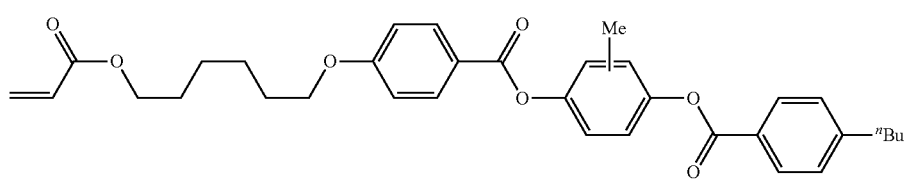
(4D)

-continued
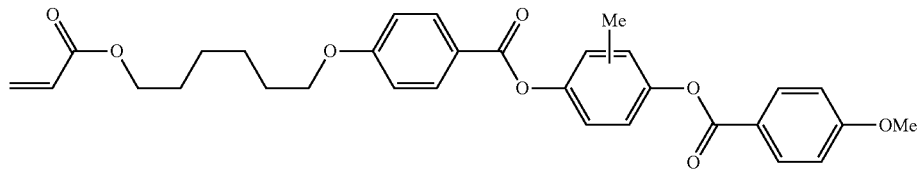
(5D)
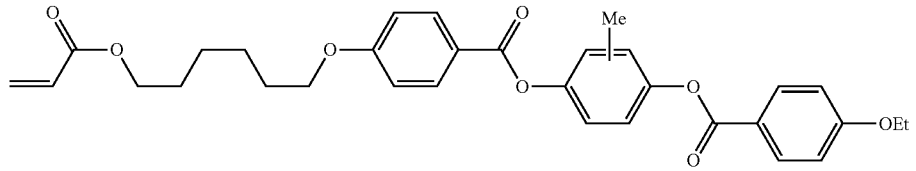
(6D)
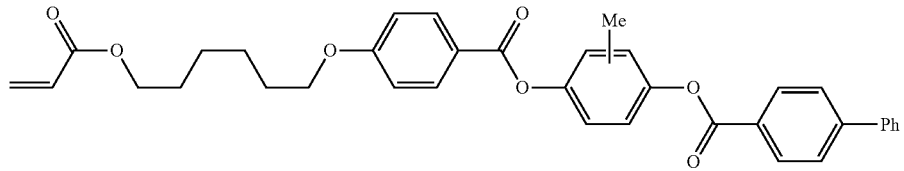
(7D)
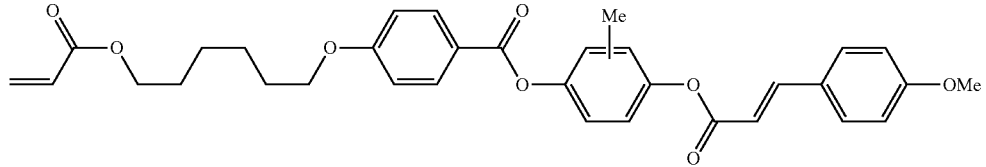
(8D)
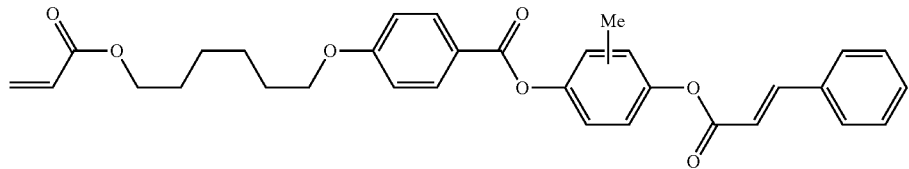
(9D)
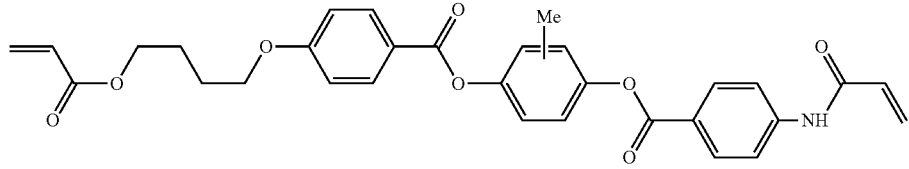
(1L)
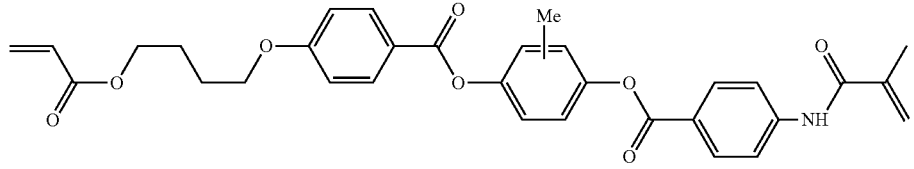
(2L)
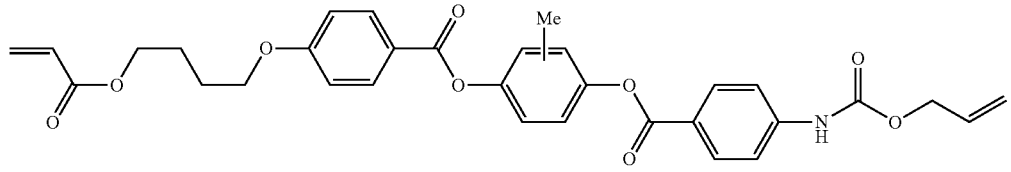
(3L)
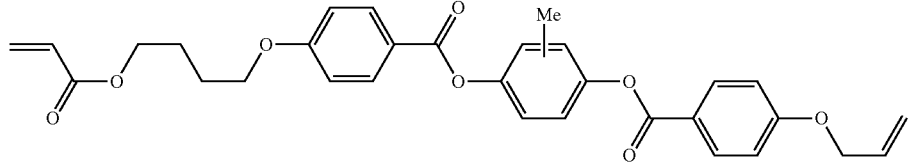
(4L)

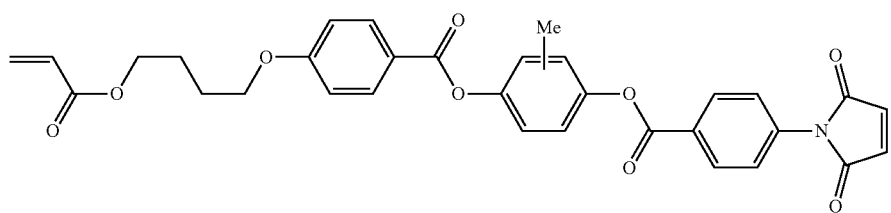
(5L)
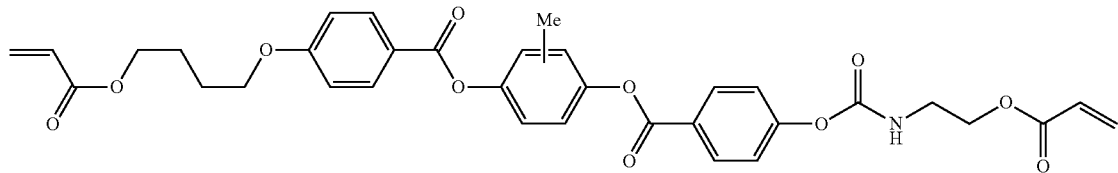
(6L)
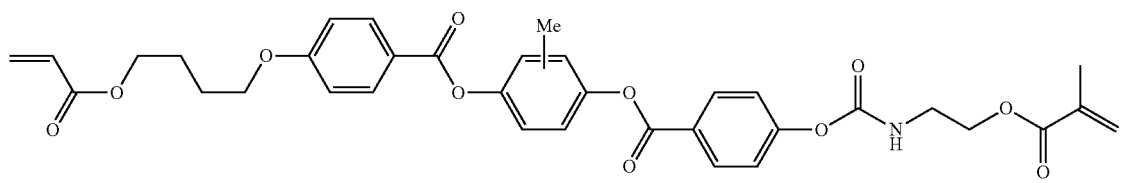
(7L)
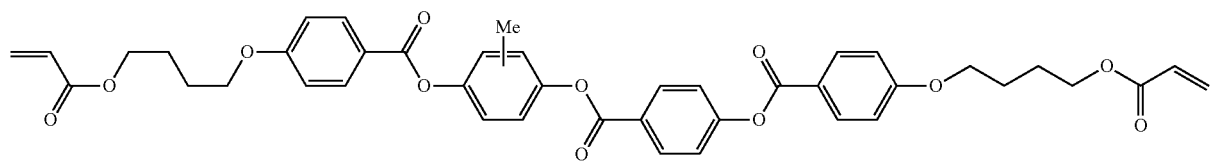
(8L)
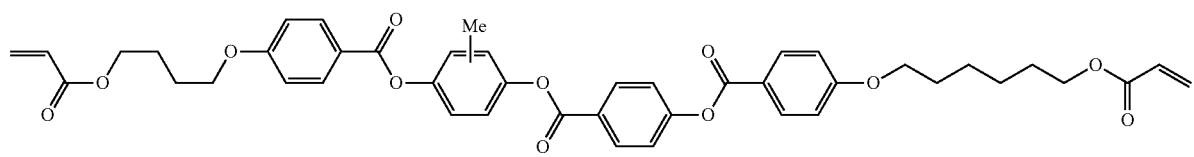
(9L)
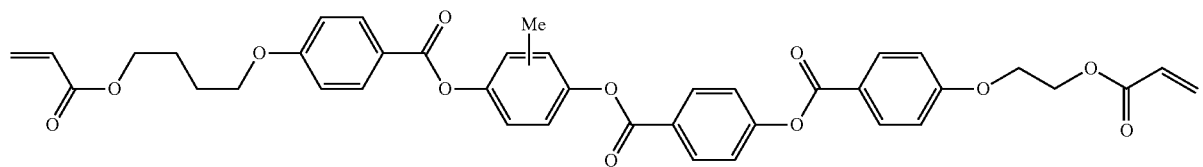
(10L)
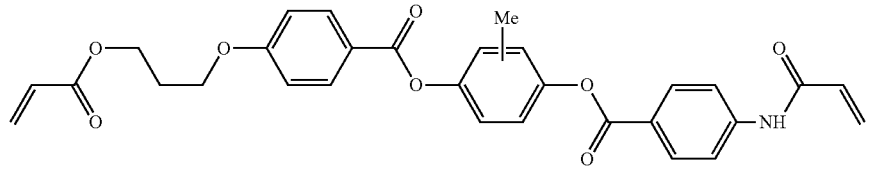
(1M)
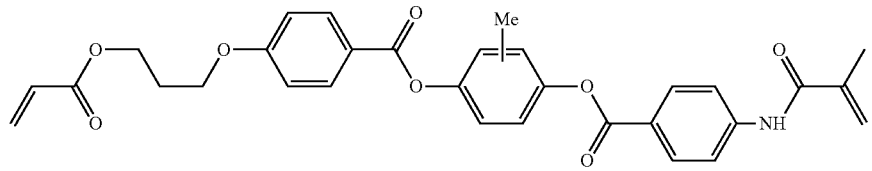
(2M)

(3M)
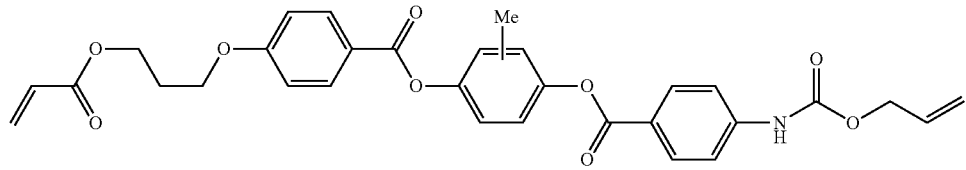
(4M)
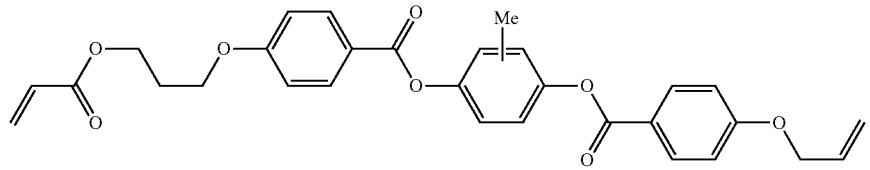
(5M)
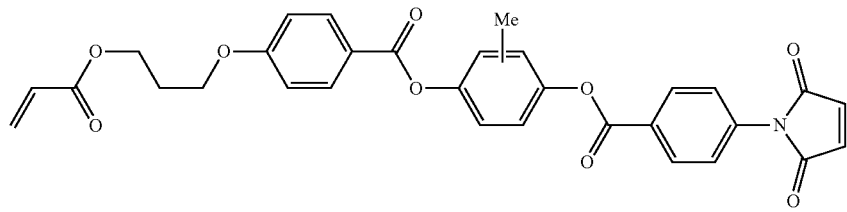
(6M)
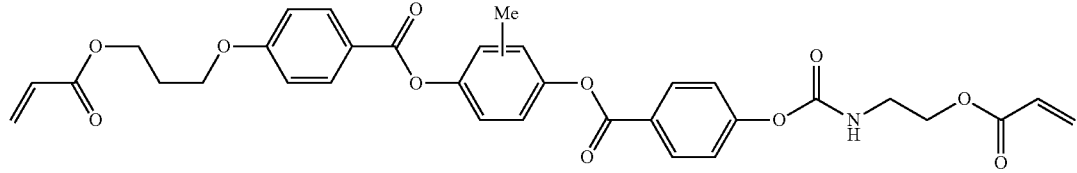
(7M)
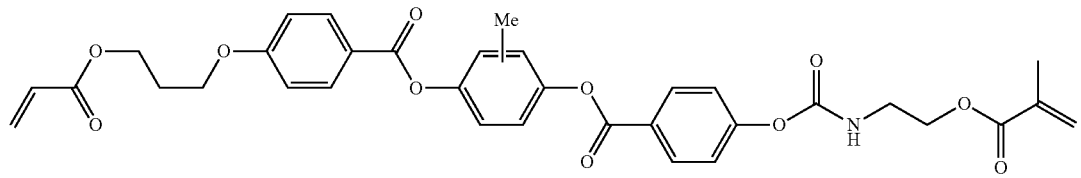
(8M)
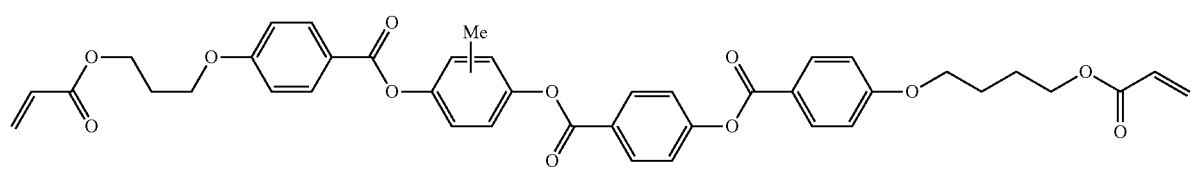
(9M)
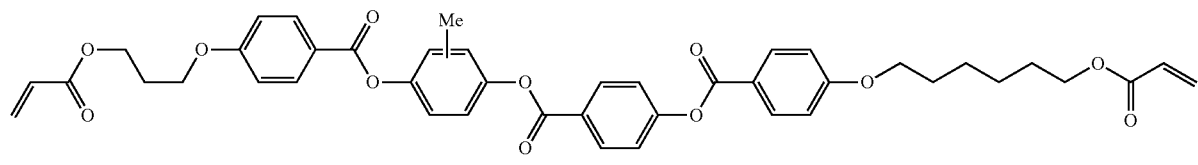
(10M)
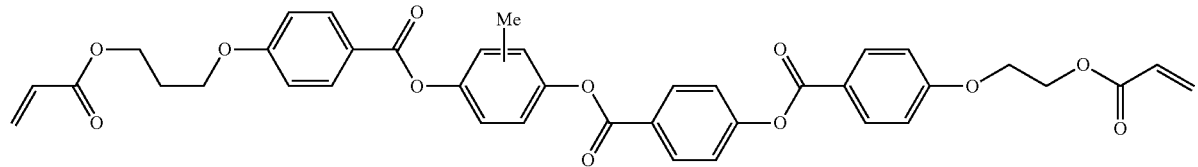

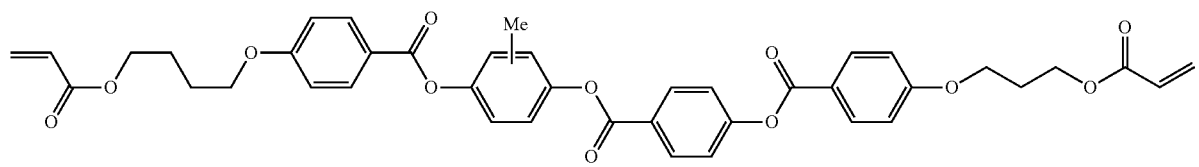
(1N)
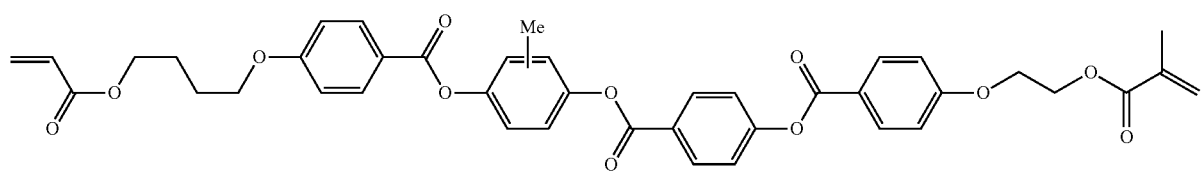
(2N)
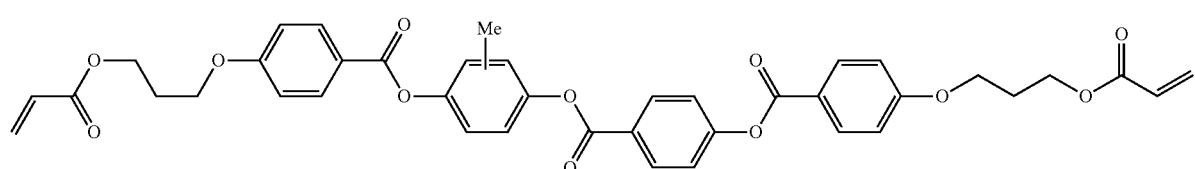
(3N)
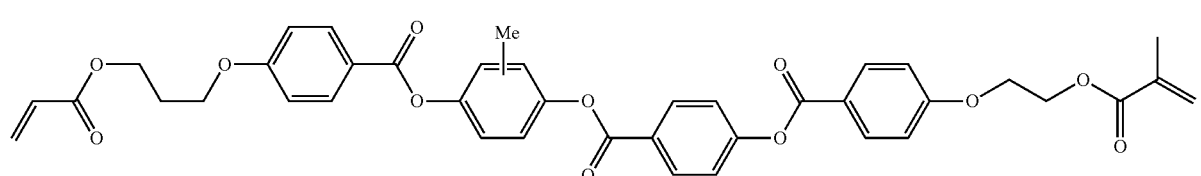
(4N)
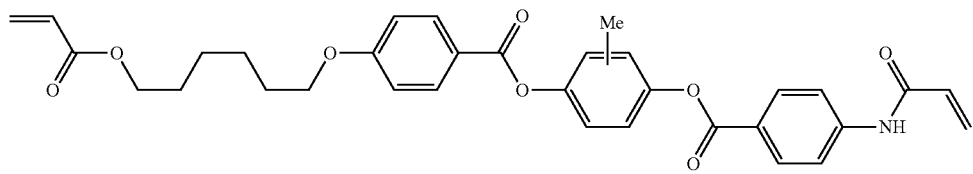
(5N)
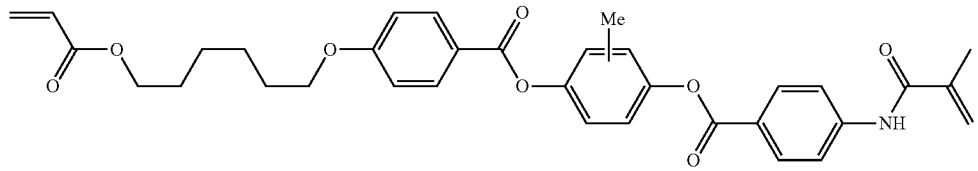
(6N)
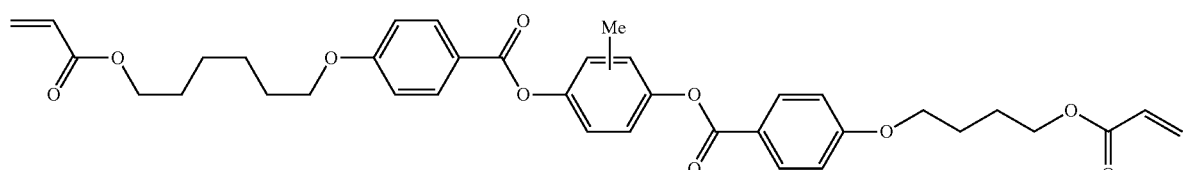
(7N)
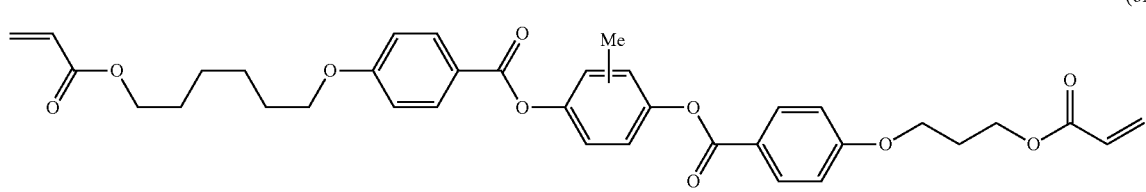
(8N)

(9N)

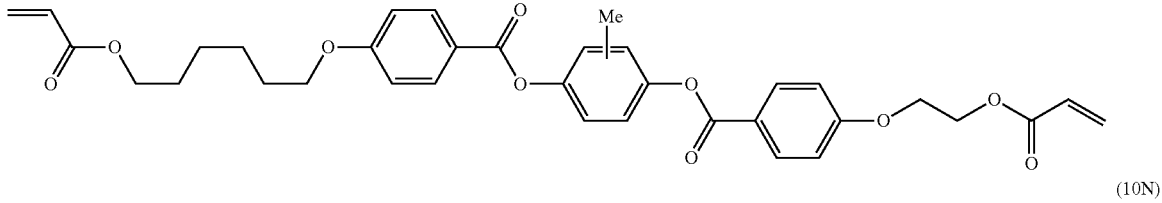

(10N)

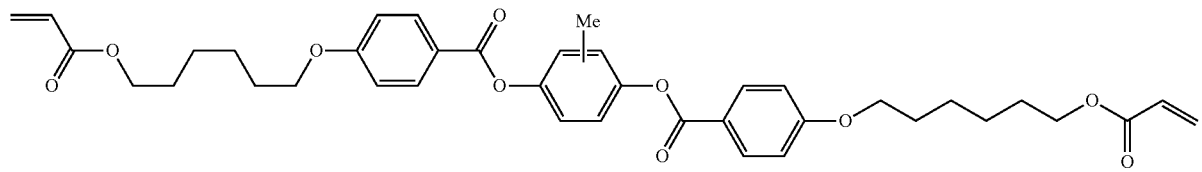

As the liquid crystal compound for use in the present invention, a compound represented by Formula (VI) and described in JP2014-198814A, in particular, a liquid crystal compound having no (meth)acrylate group represented by Formula (VI) is also suitably used.

Formula (VI)

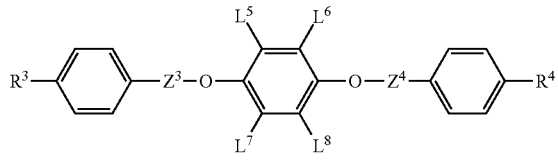

In Formula (VI), $Z^3$ represents —C(=O)— or —CH=CH—C(=O)—;

$Z^4$ represents —C(=O)— or C(=O)—CH=CH—;

$R^3$ and $R^4$ each independently represent a hydrogen atom, a halogen atom, a linear alkyl group having 1 to 4 carbon atoms, a methoxy group, an ethoxy group, an aromatic ring which may have a substituent, a cyclohexyl group, a vinyl group, a formyl group, a nitro group, a cyano group, an acetyl group, an acetoxy group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (VI-2); and $L^5$, $L^6$, $L^7$, and $L^8$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^5$, $L^6$, $L^7$, or $L^8$ represents a group other than a hydrogen atom.

—$Z^5$—T—Sp—P   Formula (VI-2)

In Formula (VI-2), P represents an acryloyl group, a methacryl group, or a hydrogen atom, $Z^5$ represents —C(=O)O—, —OC(=O)—, —C(=O)NR$^1$— (where R$^1$ represents a hydrogen atom or a methyl group), —NR$^1$C(=O)—, —C(=O)S—, or —SC(=O)—, T represents 1,4-phenylene, and Sp represents a divalent aliphatic group having 1 to 12 carbon atoms which may have a substituent. However, one CH$_2$ in this aliphatic group or two or more non-adjacent CH$_2$ may be substituted with —O—, —S—, —OC(=O)—, —C(=O)O—, or —OC(=O)O—.

The compound represented by Formula (VI) is preferably a compound represented by Formula (VII).

Formula (VII)

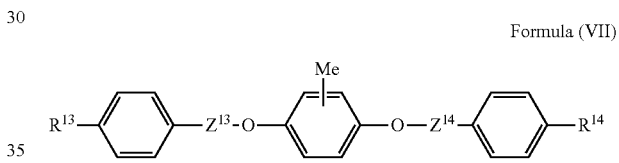

In Formula (VII), $Z^{13}$ represents —C(=O)— or C(=O)—CH=CH—;

$Z^{14}$ represents —C(=O)— or —CH=CH—C(=O)—; and $R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

$Z^{13}$ represents —C(=O)— or C(=O)—CH=CH— and is preferably —C(=O)—.

$R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3), preferably represents a methyl group, an ethyl group, a propyl group, a methoxy group, an ethoxy group, a phenyl group, an acryloylamino group, a methacryloylamino group, or a structure represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

Specific examples of the compound represented by Formula (VI) are shown below. However, in the present invention, the compound represented by Formula (VI) is not limited thereto.

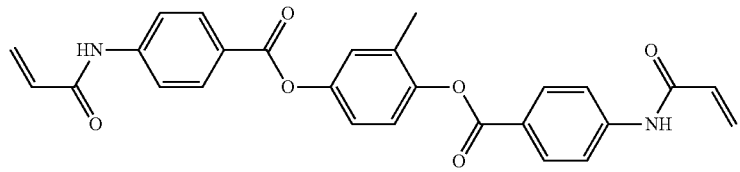
(11L)
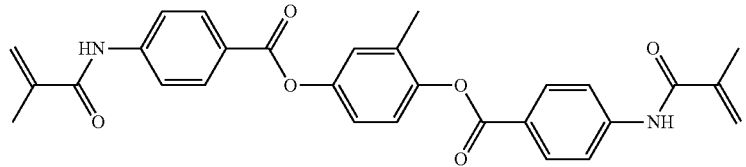
(12L)
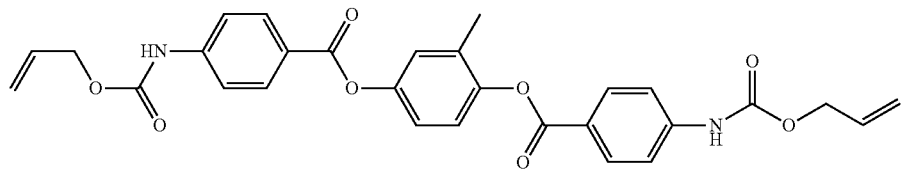
(13L)
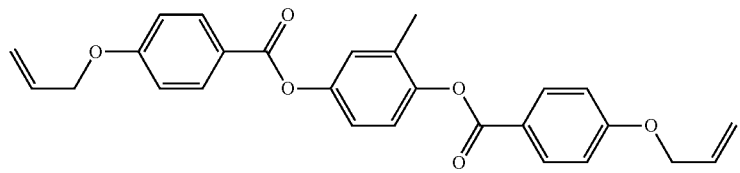
(14L)
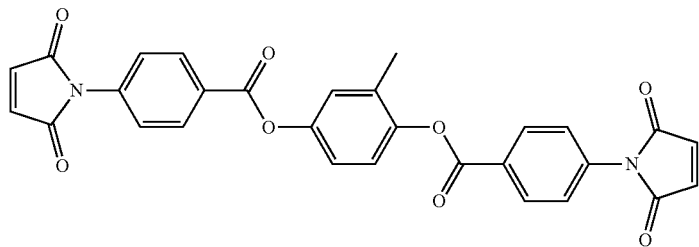
(15L)
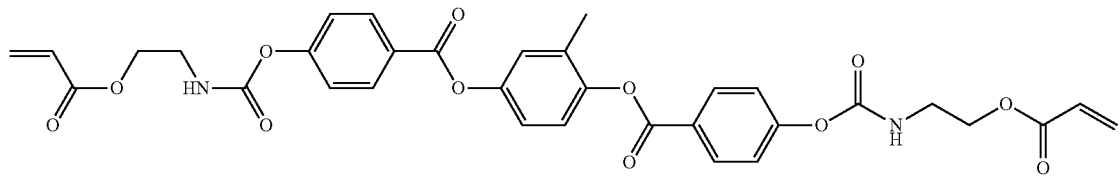
(16L)
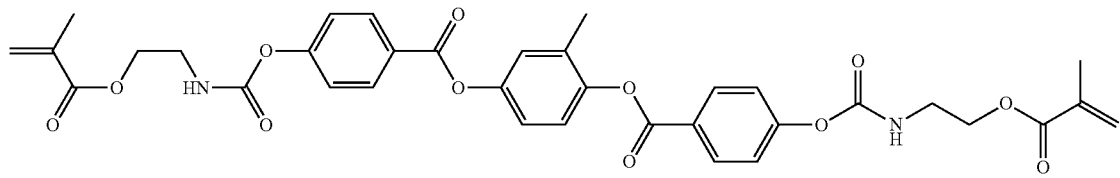
(17L)
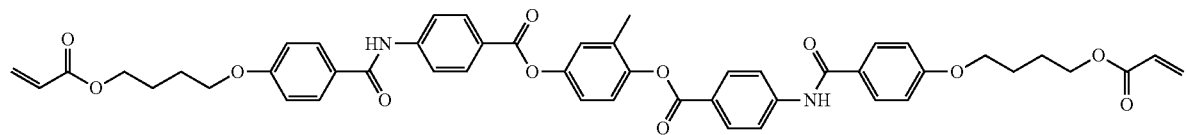
(18L)

-continued
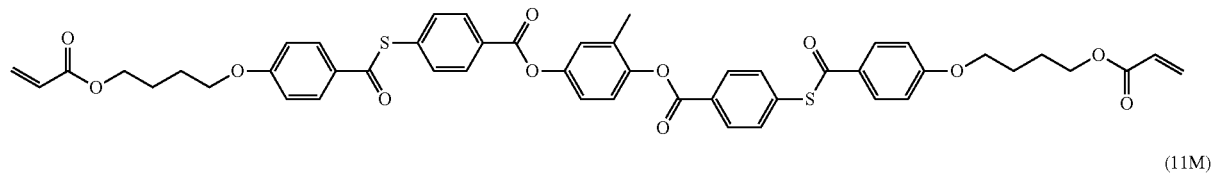
(19L)
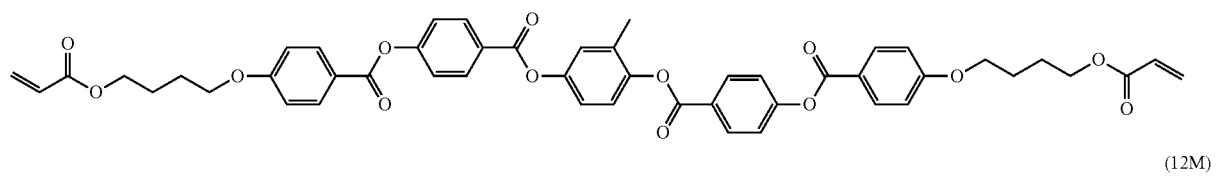
(11M)
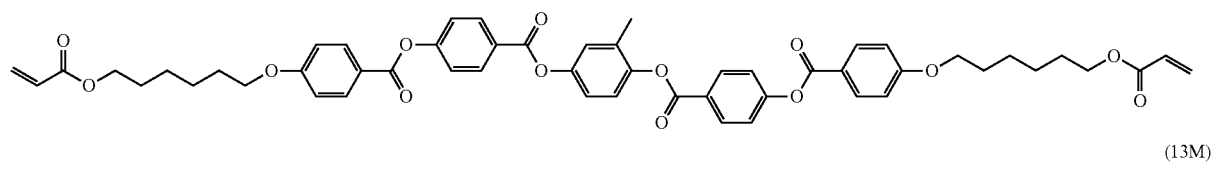
(12M)
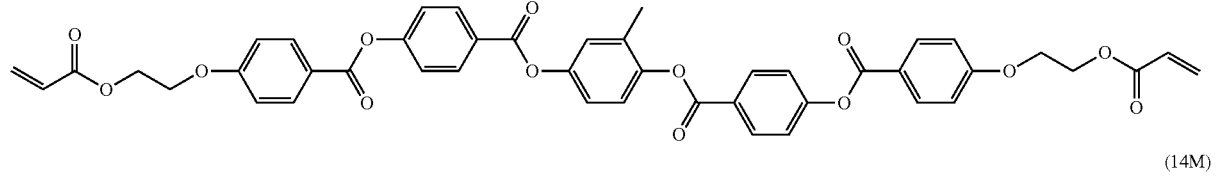
(13M)
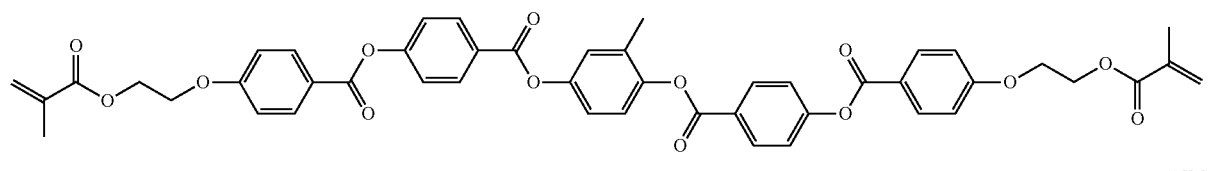
(14M)
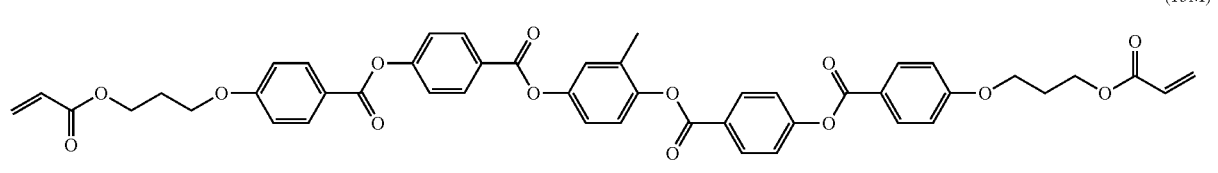
(15M)
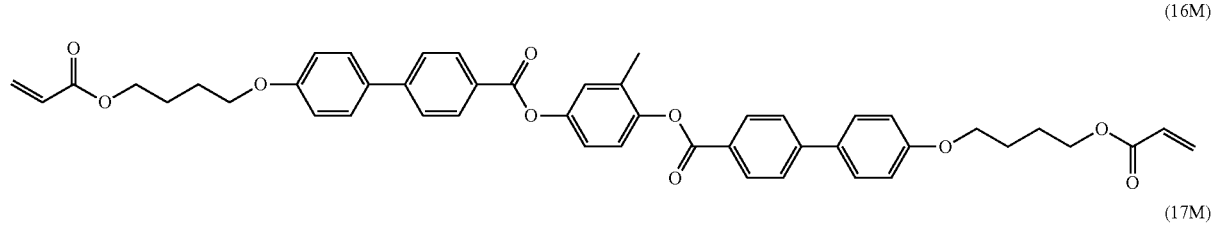
(16M)
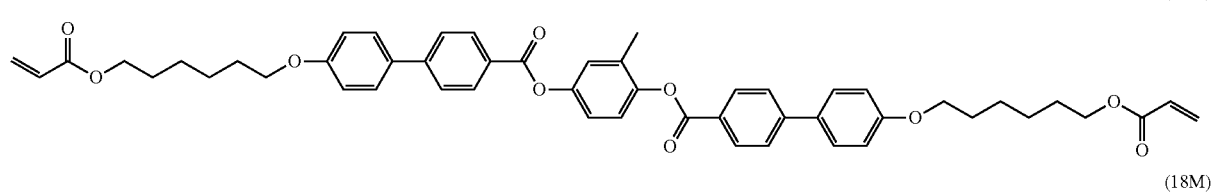
(17M)
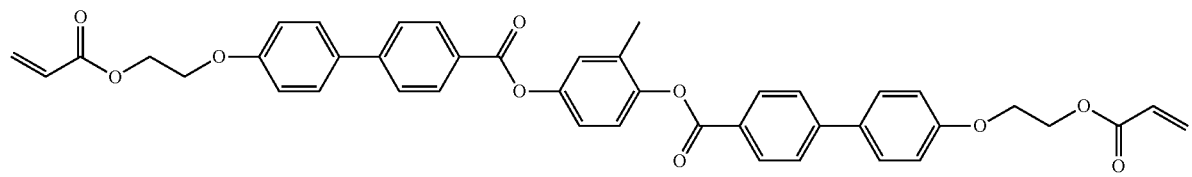
(18M)

-continued

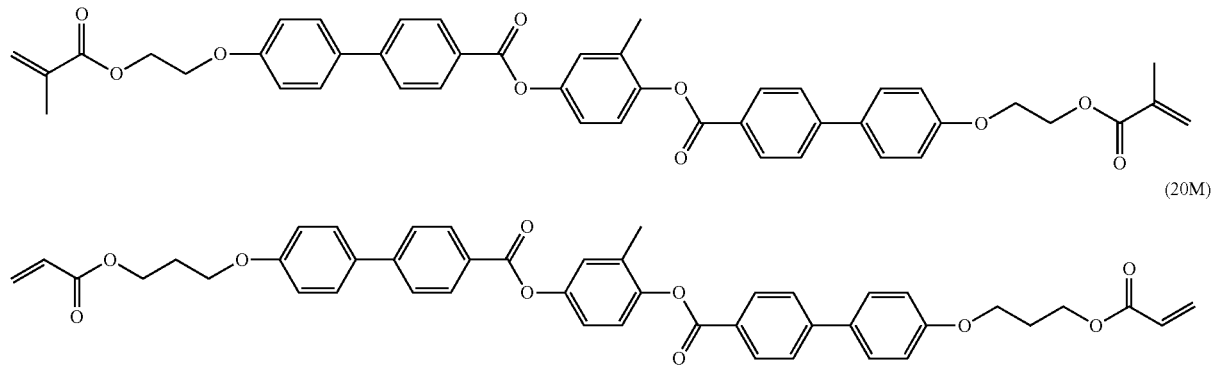

As the liquid crystal compound for use in the present invention, a compound represented by Formula (VIII) and described in JP2014-198814A, in particular, a polymerizable liquid crystal compound having two (meth)acrylate groups represented by Formula (VIII) is also suitably used.

Formula (VIII)

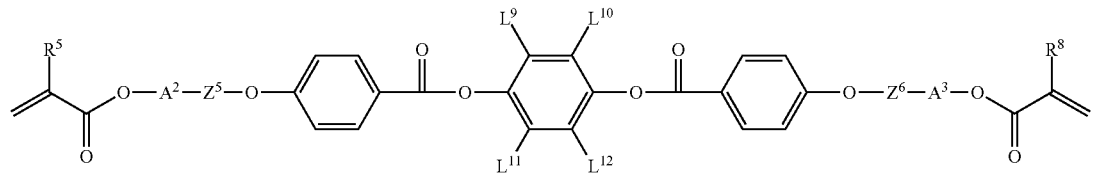

In Formula (VIII), $A^2$ and $A^3$ each independently represent an alkylene group having 2 to 18 carbon atoms, and one $CH_2$ in the alkylene group or two or more non-adjacent $CH_2$ may be substituted with —O—;

$Z^5$ represents —C(=O)—, —OC(=O)—, or a single bond;

$Z^6$ represents —C(=O)—, —C(=O)O—, or a single bond;

$R^5$ and $R^6$ each independently represent a hydrogen atom or a methyl group; and $L^9$, $L^{10}$, $L^{11}$, and $L^{12}$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^9$, $L^{10}$, $L^{11}$, or $L^{12}$ represents a group other than a hydrogen atom.

The compound represented by Formula (VIII) is preferably a compound represented by Formula (IX).

Formula (IX)

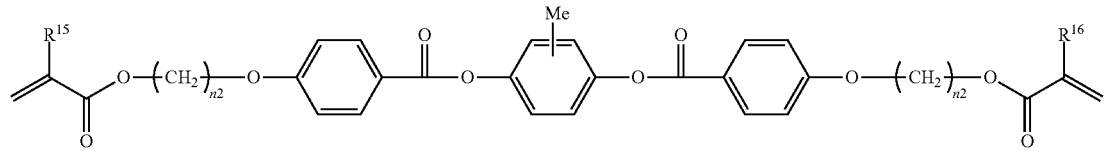

In Formula (IX), n2 and n3 each independently represent an integer of 3 to 6; and
$R^{15}$ and $R^{16}$ each independently represent a hydrogen atom or a methyl group.

In Formula (IX), it is preferred that n2 and n3 each independently represent an integer of 3 to 6, and n2 and n3 are 4.

In Formula (IX), it is preferred that $R^{15}$ and $R^{16}$ each independently represent a hydrogen atom or a methyl group, and $R^{15}$ and $R^{16}$ each represent a hydrogen atom.

Specific examples of the compound represented by Formula (VIII) are shown below. However, in the present invention, the compound represented by Formula (VIII) is not limited thereto.

(I-1)
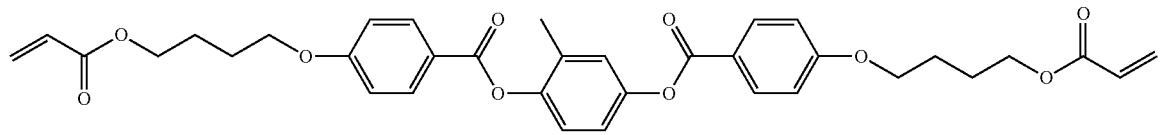

(I-2)
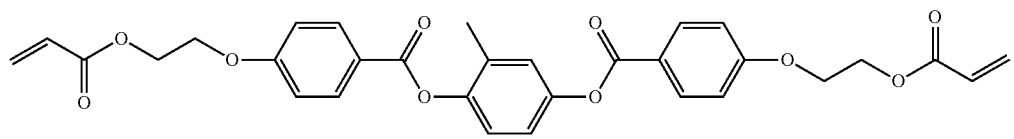

(I-3)
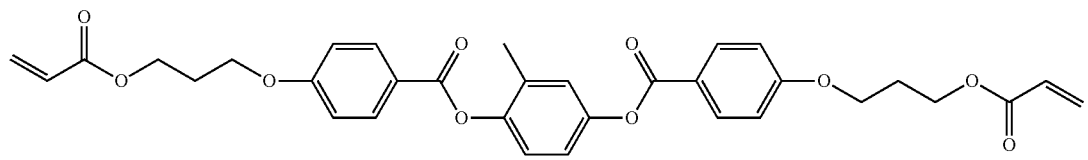

(I-4)
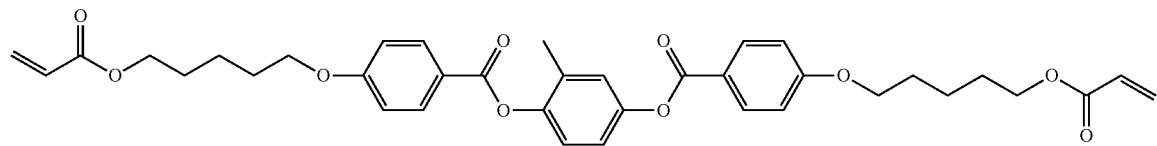

(I-5)
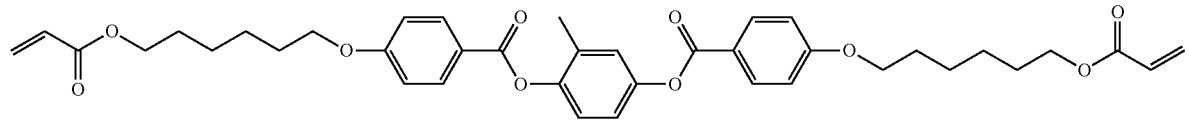

(I-6)
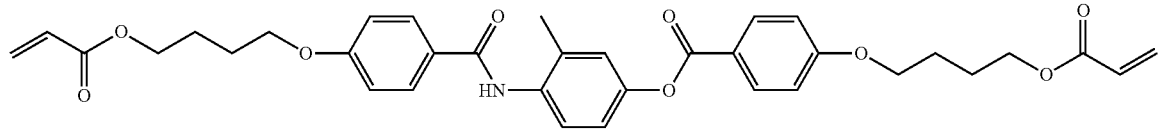

(I-7)
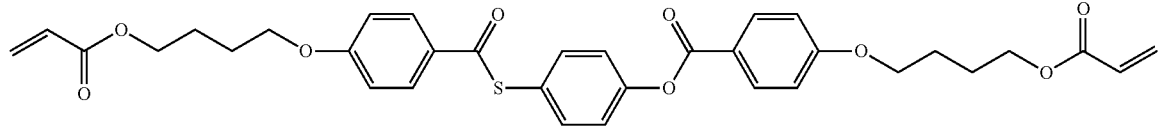

(I-8)
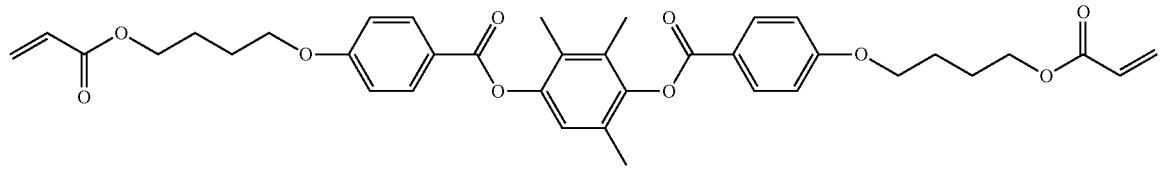

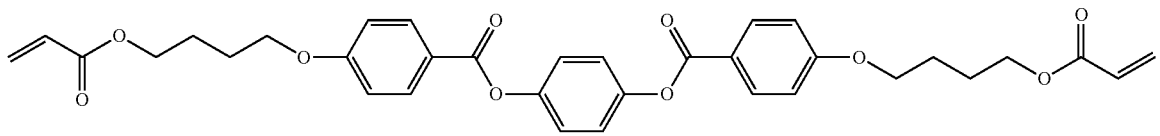

(I-9)

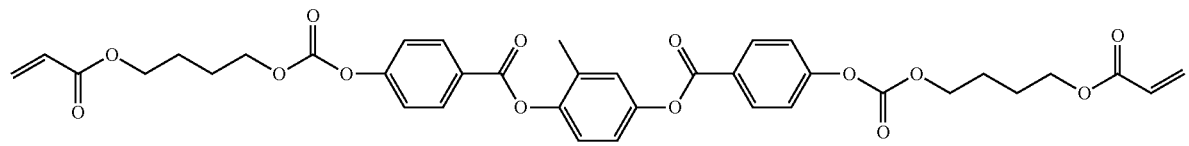

(I-10)

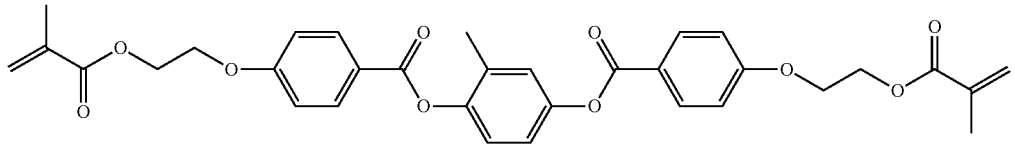

(I-11)

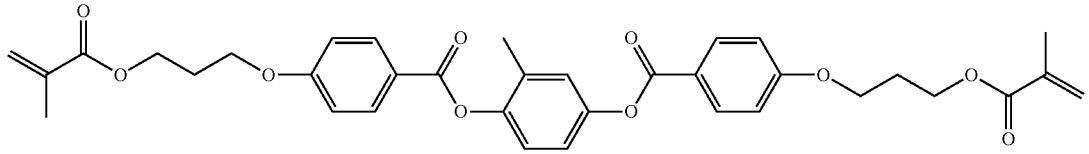

(I-12)

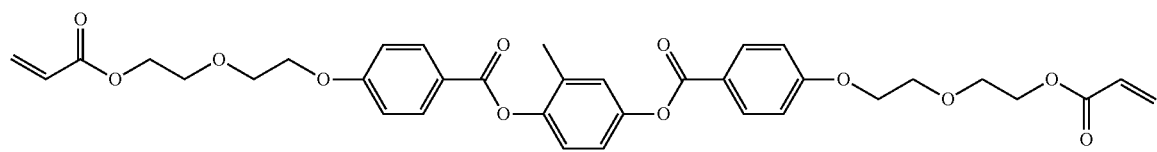

(I-13)

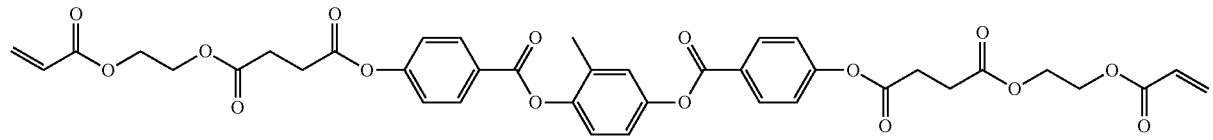

(I-14)

Such liquid crystal compounds can be produced by a known method.

<<Chiral Agent A whose Helical Twisting Power is Changed upon Light Irradiation>>

The chiral agent A is a compound that induces a helix of a liquid crystal compound, and is not particularly limited as long as it is a chiral agent whose helical twisting power (HTP) is changed upon light irradiation.

The chiral agent A may be liquid crystalline or non-liquid crystalline. The chiral agent A generally contains an asymmetric carbon atom; however, an axial asymmetric compound or planar asymmetric compound not containing an asymmetric carbon atom may also be used as the chiral agent A. The chiral agent A may have a polymerizable group.

The chiral agent whose HTP is changed upon light irradiation may be, for example, a so-called photoreactive chiral agent. The photoreactive chiral agent is a compound which has a chiral moiety and a photoreactive moiety that undergoes a structural change upon light irradiation, and greatly changes the twisting power of the liquid crystal compound in accordance with the irradiation light quantity, for example.

Examples of the photoreactive moiety that undergoes a structural change upon light irradiation include photochromic compounds (written by Kingo Uchida and Masahiro Irie, Chemical Industry, Vol. 64, p. 640, 1999, and written by Kingo Uchida and Masahiro Irie, Fine Chemical, Vol. 28(9), p. 15, 1999). The structural change means decomposition, addition, isomerization, dimerization, or the like caused upon light irradiation to the photoreactive moiety, and the structural change may be irreversible. Furthermore, the chiral moiety corresponds to an asymmetric carbon described in Chemistry of Liquid Crystal, No. 22, Hiroyuki Nohira, Chemistry Review, p.73, 1994.

Examples of the photoreactive chiral agent include photoreactive chiral agents described in paragraphs [0044] to [0047] of JP2001-159709A, optically active compounds described in paragraphs [0019] to [0043] of JP2002-179669A, optically active compounds described in paragraphs [0020] to [0044] of JP2002-179633A, optically active compounds described in paragraphs [0016] to [0040] of JP2002-179670A, optically active compounds described in paragraphs [0017] to [0050] of JP2002-179668A, optically active compounds described in paragraphs [0018] to [0044] of JP2002-180051A, optically active compounds described in paragraphs [0016] to [0055] of JP2002-338575A, and optically active compounds in paragraphs [0020] to [0049] of JP2002-179682A.

Above all, a compound having at least one photoisomerization moiety is preferable as the chiral agent A. From the viewpoint that absorption of visible light is small, photoisomerization easily occurs, and the HTP difference before and after light irradiation is large, the photoisomerization moiety is preferably a cinnamoyl moiety, a chalcone moiety, an azobenzene moiety, a stilbene moiety, or a coumarin moiety, and more preferably a cinnamoyl moiety or a chalcone moiety. In addition, the photoisomerization moiety corresponds to the above-mentioned photoreactive moiety that undergoes a structural change upon light irradiation.

In addition, from the viewpoint that the HTP difference before and after light irradiation is large, the chiral agent A is preferably an isosorbide-based optically active compound, an isomannide-based optically active compound, or a binaphthol-based optically active compound. That is, the chiral agent A preferably has an isosorbide skeleton, an isomannide skeleton, or a binaphthol skeleton as the chiral moiety. Above all, from the viewpoint of a larger HTP difference before and after light irradiation, the chiral agent A is more preferably an isosorbide-based optically active compound or a binaphthol-based optically active compound, and still more preferably an isosorbide-based optically active compound.

As described above, the helical pitch of the cholesteric liquid crystalline phase largely depends on the type of chiral agent A, which is a photosensitive chiral agent, and the addition concentration thereof. Therefore, a desired pitch can be obtained by adjusting these factors.

The chiral agent A is preferably selected under the condition that the percentage change of the helical pitch before and after the light irradiation obtained by the following measurement method A or the following measurement method B is 5% or more in that the reflection wavelength range of the selective reflection wavelength can be made wider. In other words, the chiral agent A is preferably used in a type and an addition concentration at which the percentage change of the helical pitch before and after the light irradiation obtained by the following measurement method A or the following measurement method B is 5% or more.

Above all, the chiral agent A is preferably used in a type and an addition concentration at which the percentage change of the helical pitch before and after the light irradiation obtained by the following measurement method A or the following measurement method B is preferably 10% or more, more preferably 20% or more, and still more preferably 30 or more. The upper limit of the percentage change of the helical pitch is not particularly limited, but is usually 200% or less.

The measurement method A is a method of measuring the percentage change of the helical pitch in a case where the step 2 is carried out following the step 1, and is specifically as follows.

Each of central reflection wavelengths (nm) before and after irradiation of the composition layer formed by carrying out the step 2 following the step 1 with light having a wavelength of 365 nm at an irradiation intensity of 10 mW/cm² for 1 minute is measured and the percentage change of the helical pitch before and after the light irradiation is obtained in accordance with Expression (1).

Percentage change of helical pitch before and after light irradiation=[{|central reflection wavelength before light irradiation−central reflection wavelength after light irradiation|}/(central reflection wavelength before light irradiation)]×100(%)     Expression (1)

The measurement method B is a method of measuring the percentage change of the helical pitch in a case where the step 2 is carried out following the step 1 and the step 4, and is specifically as follows.

Each of central reflection wavelengths (nm) of a composition layer A formed by carrying out the step 2 following the step 1 and a composition layer B formed by irradiation with light having a wavelength of 365 nm at an irradiation intensity of 10 mW/cm² for 1 minute following the step 1, and further carrying out the step 2 is measured, and the percentage change of the helical pitch before and after the light irradiation is obtained in accordance with Expression (2).

Percentage change of helical pitch before and after light irradiation=[{|central reflection wavelength of composition layer A−central reflection wavelength of composition layer B|}/(central reflection wavelength of composition layer A)]×100(%)     Expression (2)

That is, in a case where the step 2 is carried out following the step 1, the composition layer formed in the step 2 has a percentage change of the helical pitch before and after the light irradiation obtained by the measurement method A of preferably 5% or more, more preferably 10% or more, still more preferably 20% or more, and particularly preferably 30% or more. The upper limit of the percentage change of the helical pitch is not particularly limited, but is usually 200% or less. In a case where the percentage change of the helical pitch before and after the light irradiation obtained by the measurement method A is within the above numerical range, a reflective layer having a wider reflection wavelength range can be obtained.

In addition, in a case where the step 2 is carried out following the step 1 and the step 4, the composition layer formed in the step 1 has a percentage change of the helical pitch before and after the light irradiation obtained by the measurement method B of preferably 5% or more, more preferably 10% or more, still more preferably 20% or more, and particularly preferably 30% or more. The upper limit of the percentage change of the helical pitch is not particularly limited, but is usually 200% or less. In a case where the percentage change of the helical pitch before and after the light irradiation obtained by the measurement method B is within the above numerical range, a reflective layer having a wider reflection wavelength range can be obtained.

The content of the chiral agent A in the composition X is preferably 2.0% by mass or more and more preferably 3.0% by mass or more with respect to the total mass of the liquid crystal compound. In addition, the upper limit of the content of the chiral agent A in the composition X is preferably 10% by mass or less and more preferably 5.0% by mass or less with respect to the total mass of the liquid crystal compound, from the viewpoint of suppressing haze of the reflective layer.

In addition, the chiral agent A may be used alone or in combination of two or more thereof. In a case where two or more types of the chiral agent A are used in combination, the total content thereof is preferably in the above range.

<<Chiral Agent B whose Helical Twisting Power is Increased upon Cooling or Heating>>

The chiral agent B is a compound that induces a helix of a liquid crystal compound, and is not particularly limited as long as it is a chiral agent whose helical twisting power is increased upon cooling or heating. Here, the phrase "cooling or heating" refers to cooling or heating carried out in the step 3. In addition, the upper limit of the cooling or heating temperature is usually about ±70° C. (in other words, a chiral agent whose helical twisting power is increased upon cooling or heating within ±70° C. is preferable). Above all, a chiral agent whose helical twisting power is increased upon cooling is preferable.

The chiral agent B may be liquid crystalline or non-liquid crystalline. The chiral agent may be selected from a variety of known chiral agents (for example, as described in Liquid Crystal Device Handbook, Chap. 3, Item 4-3, Chiral Agents for Twisted Nematic (TN) and Super Twisted Nematic (STN), p. 199, edited by the $142^{nd}$ Committee of the Japan Society for the Promotion of Science, 1989). The chiral agent B generally contains an asymmetric carbon atom; however, an axial asymmetric compound or planar asymmetric compound not containing an asymmetric carbon atom may also be used as the chiral agent B. Examples of the axial asymmetric compound or the planar asymmetric compound include binaphthyl, helicene, paracyclophane, and derivatives thereof. The chiral agent B may have a polymerizable group.

The chiral agent B has an increase rate of the helical twisting power (HTP) upon cooling or heating of preferably 1% or more, more preferably 2% or more, still more preferably 5% or more, and particularly preferably 10% or more. The upper limit of the increase rate of the HTP is not particularly limited, but is usually 100% or less.

In particular, the chiral agent B is preferably an isosorbide-based optically active compound, an isomannide-based optically active compound, or a binaphthol-based optically active compound, and more preferably a binaphthol-based optically active compound from the viewpoint of excellent formation of a wave-like structure in the step 3.

In addition, the HTP of the chiral agent B before cooling or heating (before the helical twisting power is changed) is preferably 10 to 100 $\mu m^{-1}$, more preferably 10 to 80 $\mu m^{-1}$, and still more preferably 50 to 80 $\mu m^{-1}$. In addition, the HTP of the chiral agent B after cooling or heating (after the helical twisting power is changed) is preferably 20 to 120 $\mu m^{-1}$ and more preferably 50 to 100 $\mu m^{-1}$.

The content of the chiral agent B in the composition X is preferably 2.0% by mass or more and more preferably 3.0% by mass or more with respect to the total mass of the liquid crystal compound. In addition, the upper limit of the content of the chiral agent B in the composition X is preferably 10% by mass or less and more preferably 6.0% by mass or less with respect to the total mass of the liquid crystal compound, from the viewpoint of suppressing haze of the reflective layer.

A smaller amount of the chiral agent B is preferred because it tends not to affect the liquid crystallinity. Accordingly, the chiral agent B is preferably a compound having a strong twisting power in order that the compound could achieve twisted alignment of a desired helical pitch even in a case where the amount thereof used is small.

In addition, the chiral agent B may be used alone or in combination of two or more thereof. In a case where two or more types of the chiral agent B are used in combination, the total content thereof is preferably in the above range.

<<Optional Components>>

The composition X may contain components other than the liquid crystal compound, the chiral agent A, and the chiral agent B.

Polymerization Initiator

The composition X may contain a polymerization initiator. In particular, in a case where the liquid crystal compound has a polymerizable group, the composition X preferably contains a polymerization initiator.

The polymerization initiator is preferably a photopolymerization initiator capable of initiating a polymerization reaction upon irradiation with ultraviolet rays. Examples of the photopolymerization initiator include α-carbonyl compounds (as described in U.S. Pat. Nos. 2,367,661A 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. Nos. 3,046,127A 2,951,758A), combinations of triarylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

The content of the polymerization initiator in the composition X is not particularly limited, but it is preferably 0.1% to 20% by mass and more preferably 1.0% to 8.0% by mass, with respect to the total mass of the liquid crystal compound.

Alignment Control Agent (Alignment Agent)

The composition X may contain an alignment control agent. The inclusion of the alignment control agent in the composition X makes it possible to achieve stable or rapid formation of a cholesteric liquid crystalline phase.

Examples of the alignment control agent include fluorine-containing (meth)acrylate-based polymers, compounds represented by General Formulae (X1) to (X3) described in WO2011/162291A, compounds described in paragraphs [0007] to [0029] of JP2012-211306A, compounds described in paragraphs [0020] to [0031] of JP2013-047204A, compounds described in paragraphs [0165] to [0170] of WO2016/009648A, the compounds described in paragraphs [0077] to [0081] of WO2016/092844, and General Formulae (Cy201) to (Cy211) described in JP4592225B. The composition may contain two or more selected from these compounds. These compounds can reduce the tilt angle of the molecules of the liquid crystal compound at the air interface of the layer, or align the molecules substantially horizontally. In the present specification, the term "horizontal alignment" refers to that the long axis of the liquid crystal molecule is parallel to the film surface, but does not require strict parallelism. In the present specification, the "horizontal alignment" means an alignment in which the tilt angle to the horizontal plane is less than 20°.

The alignment control agents may be used alone or in combination of two or more thereof.

The content of the alignment control agent in the composition X is not particularly limited, but it is preferably 0.01% to 10% by mass, more preferably 0.01% to 5.0% by mass, and still more preferably 0.01% to 1.0% by mass, with respect to the total mass of the liquid crystal compound.

Solvent

The composition X may contain a solvent.

The solvent may be, for example, water or an organic solvent. Examples of the organic solvent include amides such as N,N-dimethylformamide; sulfoxides such as dimethylsulfoxide; heterocyclic compounds such as pyridine; hydrocarbons such as benzene and hexane; alkyl halides such as chloroform and dichloromethane; esters such as methyl acetate, butyl acetate, and propylene glycol monoethyl ether acetate; ketones such as acetone, methyl ethyl ketone, cyclohexanone, and cyclopentanone; ethers such as tetrahydrofuran and 1,2-dimethoxyethane; and 1,4-butanediol acetate. These solvents may be used alone or in combination of two or more thereof.

Other Additives

The composition X may contain one or two or more other additives such as an antioxidant, an ultraviolet absorber, a sensitizer, a stabilizer, a plasticizer, a chain transfer agent, a polymerization inhibitor, an antifoaming agent, a leveling agent, a thickener, a flame retardant, a surface-active substance, a dispersant, and a color material such as a dye and a pigment.

It is preferred that one or more of the compounds constituting the composition X are a compound having a plurality of polymerizable groups (a polyfunctional compound). Further, in the composition X, the total content of the compound having a plurality of polymerizable groups is preferably 80% by mass or more with respect to the total solid content in the composition X. The solid content is a component for forming the reflective layer, and does not include a solvent.

By making 80% by mass or more of the total solid content in the composition X into a compound having a plurality of polymerizable groups, in a case of forming the wave-like structure of the bright portions 14 and the dark portions 16 of the cholesteric liquid crystalline phase, it is preferable from the viewpoint that the wave-like structure of the reflective layer 30 (cholesteric liquid crystalline phase) can be firmly immobilized to impart durability.

In addition, the compound having a plurality of polymerizable groups is a compound having two or more immobilizable groups in one molecule. In the present invention, the polyfunctional compound contained in the composition X may have liquid crystallinity or may not have liquid crystallinity.

(Composition Y)

The composition Y contains a liquid crystal compound and a chiral agent C whose helical twisting power is changed upon light irradiation and whose helical twisting power is increased upon cooling or heating. The composition Y differs from the composition X only in that it contains the chiral agent C in place of the chiral agent A and the chiral agent B contained in the composition X.

Hereinafter, only the chiral agent C of the composition Y will be described. Other components and blending amounts are the same as those of the composition X whose description is omitted.

<<Chiral Agent C whose Helical Twisting Power is Changed upon Light Irradiation and whose Helical Twisting Power is Increased upon Cooling or Heating>>

The chiral agent C is a chiral agent whose helical twisting power is changed upon light irradiation and whose helical twisting power is increased upon cooling or heating, that is, the chiral agent C corresponds to a compound having the functions of the chiral agent A and the chiral agent B described above.

The chiral agent C is a compound that induces a helix of a liquid crystal compound, and is not particularly limited as long as it is a chiral agent whose helical twisting power (HTP) is changed upon light irradiation and whose helical twisting power is increased upon cooling or heating.

In addition, the chiral agent C may be liquid crystalline or non-liquid crystalline. The chiral agent C generally contains an asymmetric carbon atom; however, an axial asymmetric compound or planar asymmetric compound not containing an asymmetric carbon atom may also be used as the chiral agent C. The chiral agent C may have a polymerizable group.

The chiral agent C may be selected from a variety of known chiral agents (for example, as described in Liquid Crystal Device Handbook, Chap. 3, Item 4-3, Chiral Agents for TN and STN, p. 199, edited by the 142$^{nd}$ Committee of the Japan Society for the Promotion of Science, 1989).

The chiral agent C is preferably selected under the condition that the percentage change of the helical pitch before and after the light irradiation obtained by the measurement method A or the measurement method B described above is 5% or more in that the reflection wavelength range of the selective reflection wavelength can be made wider. In other words, the chiral agent C is preferably used in a type and an addition concentration at which the percentage change of the helical pitch before and after the light irradiation obtained by the measurement method A or the measurement method B described above is 5% or more.

Above all, the chiral agent C is preferably used in a type and an addition concentration at which the percentage change of the helical pitch before and after the light irradiation obtained by the measurement method A or the measurement method B described above is preferably 10% or more, more preferably 20% or more, and still more preferably 30 or more. The upper limit of the percentage change of the helical pitch is not particularly limited, but is usually 200% or less. In a case where the percentage change of the helical pitch before and after the light irradiation obtained by the measurement method A or the measurement method B described above is within the above numerical range, a reflective layer having a wider reflection wavelength range can be obtained.

In addition, the chiral agent C has an increase rate of the helical twisting power (HTP) upon cooling or heating of preferably 1% or more, more preferably 2% or more, still more preferably 5% or more, and particularly preferably 10% or more. Here, the phrase "cooling or heating" refers to cooling or heating carried out in the step 3. In addition, the upper limit of the cooling or heating temperature is usually about ±70° C. (in other words, a chiral agent whose helical twisting power is increased upon cooling or heating within ±70° C. is preferable). Above all, a chiral agent whose helical twisting power is increased upon cooling is preferable. The upper limit of the increase rate of the HTP is not particularly limited, but is usually 100% or less.

In addition, the HTP of the chiral agent C before the light irradiation treatment in the step 4 and before the cooling or heating treatment in the step 3 (before the helical twisting power is changed) is preferably 10 to 100 $\mu m^{-1}$ and more preferably 10 to 80 $\mu m^{-1}$. Further, the HTP of the chiral agent C after the cooling or heating treatment in the step 3 (after the helical twisting power is changed) is preferably 20 to 120 $\mu m^{-1}$ and more preferably 50 to 100 $\mu m^{-1}$.

In particular, the chiral agent C is preferably an isosorbide-based optically active compound, an isomannide-based optically active compound, or a binaphthol-based optically active compound, and more preferably a binaphthol-based optically active compound from the viewpoint of excellent formation of a wave-like structure in the step 3.

The content of the chiral agent C in the composition Y is preferably 1.0% by mass or more and more preferably 2.0% by mass or more with respect to the total mass of the liquid crystal compound. In addition, the upper limit of the content of the chiral agent C in the composition Y is preferably 15% by mass or less and more preferably 10% by mass or less with respect to the total mass of the liquid crystal compound, from the viewpoint of suppressing haze of the reflective layer.

A smaller amount of the chiral agent C is preferred because it tends not to affect the liquid crystallinity. Accordingly, the chiral agent C is preferably a compound having a strong twisting power in order that the compound could achieve twisted alignment of a desired helical pitch even in a case where the amount thereof used is small.

In addition, the chiral agent C may be used alone or in combination of two or more thereof. In a case where two or more types of the chiral agent C are used in combination, the total content thereof is preferably in the above range.

(Procedure of Step 1)

In the step 1, the composition X or the composition Y described above is first applied onto a substrate. The application method is not particularly limited, and examples thereof include a wire bar coating method, an extrusion coating method, a direct gravure coating method, a reverse gravure coating method, and a die-coating method. Prior to application of the composition X or the composition Y, a known rubbing treatment may be applied to the substrate.

If necessary, a treatment for drying the composition layer applied onto the substrate may be carried out after application of the composition X or the composition Y. By carrying out the drying treatment, the solvent can be removed from the applied composition layer.

The film thickness of the composition layer applied onto the substrate is not particularly limited, but is preferably 0.1 to 20 μm, more preferably 0.2 to 15 and still more preferably 0.5 to 10 μm from the viewpoint of superior diffuse reflectivity of the reflective layer.

<Step 2>

The step 2 is a step in which the composition layer applied onto the substrate is heated to align the liquid crystal compound in the composition into a cholesteric liquid crystalline phase state.

The liquid crystalline phase transition temperature of the composition is preferably in the range of 10° C. to 250° C. and more preferably in the range of 10° C. to 150° C. from the viewpoint of manufacturing suitability.

As preferable heating conditions, it is preferable to heat the composition layer at 40° C. to 100° C. (preferably 60° C. to 100° C.) for 0.5 to 5 minutes (preferably 0.5 to 2 minutes).

In a case of heating the composition layer, it is preferable not to heat the composition layer to a temperature at which the liquid crystal compound becomes an isotropic phase (Iso). In a case where the composition layer is heated above the temperature at which the liquid crystal compound becomes an isotropic phase, defects of the cholesteric liquid crystalline phase increase, which is not preferable.

<Step 4>

The step 4 is a step of irradiating at least a partial region of the composition layer with light to change the helical twisting power of the chiral agent A or the chiral agent C contained in the composition layer in the light irradiation region and to change the helical pitch.

The light irradiation region may be an entire region or partial region of the composition layer. In a case where the light irradiation region is a partial region, as described above, a reflective layer having regions with helical pitches different from each other (in other words, regions with selective reflection wavelengths different from each other) in the plane as shown in FIG. 2 can be formed. In addition, regions having helical pitches different from each other can be formed by adjusting the irradiation light quantity in the light irradiation region.

The irradiation intensity of light irradiation in the step 4 is not particularly limited, but generally it is preferably about 0.1 to 200 mW/cm$^2$. The time for light irradiation is not particularly limited, but may be appropriately detemined from the viewpoints of both sufficient strength and productivity of the layer to be obtained.

In addition, the temperature of the composition layer at the time of light irradiation is, for example, 0° C. to 100° C., and preferably 10° C. to 60° C.

The light used for the light irradiation is not particularly limited as long as it is an actinic ray or radiation that changes the helical twisting power of the chiral agent A and the chiral agent C, which refers to, for example, an emission line spectrum of a mercury lamp, far ultraviolet rays represented by an excimer laser, extreme ultraviolet rays (EUV light), X-rays, ultraviolet rays, and electron beams (EB). Of these, ultraviolet rays are preferable.

<Step 3>

The step 3 is a step of cooling or heating the composition layer in a cholesteric liquid crystalline phase state such that the helical pitch is reduced. As described above, by carrying out the present step, the twist of the liquid crystal compound is further increased, and as a result, the alignment of the cholesteric liquid crystalline phase (inclination of the helical axis) is changed, whereby the bright portions 14 and the dark portions 16 parallel to the substrate 10 are changed, resulting in the formation of a reflective layer (a layer 12c of a composition in a cholesteric liquid crystalline phase state) having the bright portions 14 and the dark portions 16 having a wave-like structure (uneven structure) as shown in FIG. 3.

The phrase "helical pitch of the cholesteric liquid crystalline phase is reduced" is intended to mean that the percentage change Z expressed by Expression (9) is larger than zero in a case where the central reflection wavelength of the cholesteric liquid crystalline phase before cooling or heating the composition layer is X (nm), and the central reflection wavelength of the cholesteric liquid crystalline phase after cooling or heating the composition layer is Y (nm)

Expression (9): Percentage change Z (%)={(X-Y)/X}×100

From the viewpoint that the wave-like structure of the bright portions and the dark portions of the reflective layer can be suitably formed and diffuse reflectivity is more prominent, the percentage change Z of the helical pitch of the cholesteric liquid crystalline phase is preferably 1% or more, more preferably 5% or more, still more preferably 10% or more, and particularly preferably 20% or more. The upper limit of the percentage change Z is not particularly limited, but is often 50% or less.

In the present step, as described above, the composition layer is cooled or heated such that the helical pitch of the cholesteric liquid crystalline phase is reduced. In particular, it is preferable to cool the composition layer.

In a case where the composition layer is cooled, it is preferable to cool the composition layer such that the temperature of the composition layer drops by 30° C. or more, from the viewpoint of superior diffuse reflectivity of the reflective layer. Among them, from the viewpoint of superior effects, it is preferable to cool the composition layer so as to lower by 40° C. or more, and it is more preferable to cool the composition layer so as to lower by 50° C. or more. The upper limit value of the reduction temperature width of the cooling treatment is not particularly limited, but it is usually about 70° C.

In other words, the cooling treatment is intended to cool the composition layer such that the temperature of the composition layer is T-30° C. or less in a case where the temperature of the composition layer in the cholesteric liquid crystalline phase state before cooling is T° C.

The method of cooling is not particularly limited and may be, for example, a method of leaving the substrate on which the composition layer is placed in an atmosphere at a predetermined temperature.

The cooling rate in the cooling treatment is not limited, but in order to suitably form the wave-like structure of the bright portions 14 and the dark portions 16 of the cholesteric liquid crystalline phase, it is preferable to set the cooling rate to a certain degree of speed.

Specifically, the cooling rate in the cooling treatment is preferably such that the maximum value thereof is 1° C. per second or more, more preferably 2° C. per second or more, and still more preferably 3° C. per second or more. The upper limit of the cooling rate is not particularly limited, but it is often 10° C. per second or less.

Here, in the method for producing a reflective layer according to the embodiment of the present invention, in a case where the composition layer (reflective layer) is exposed to wind, unevenness may occur in the surface state of the surface of the reflective layer to be formed. Considering this point, in the method for producing a reflective layer according to the embodiment of the present invention, it is preferred that the wind speed of the environment in which the composition layer (liquid crystal layer) is exposed is low in all steps of applying, heating, and cooling the composition X or the composition Y. Specifically, in the method for producing a reflective layer according to the embodiment of the present invention, the wind speed of the environment in which the composition layer is exposed in all steps of applying, heating, and cooling the composition X or the composition Y is preferably 1 m/s or less.

In addition, in a case of heating the composition layer, the upper limit of the increased temperature range of the heating treatment is not particularly limited, but is usually about 70° C.

<Curing Treatment>

In addition, in a case where the liquid crystal compound has a polymerizable group, it is preferable to subject the composition layer to a curing treatment. Examples of the procedure for subjecting the composition layer to the curing treatment include the following (1) and (2).

(1): In a case where the step 4 is carried out between the step 1 and the step 2 or between the step 2 and the step 3, the method for producing a reflective layer according to the embodiment of the present invention further includes a step 5 in which, (1-1) during the step 3, the composition layer is subjected to a curing treatment and the cholesteric liquid crystalline phase is immobilized to form a reflective layer (that is, the curing treatment is carried out simultaneously with the step 3), or (1-2) after the step 3, the composition layer is subjected to a curing treatment and the cholesteric liquid crystalline phase is immobilized to form a reflective layer.

(2): In a case where the step 4 is carried out after the step 3, the method for producing a reflective layer according to the embodiment of the present invention further includes a step 5 in which after the step 4, the composition layer is subjected to a curing treatment and the cholesteric liquid crystalline phase is immobilized to form a reflective layer.

The reflective layer obtained by carrying out the curing treatment corresponds to a layer obtained by immobilizing the cholesteric liquid crystalline phase.

Here, as the state where the cholesteric liquid crystalline phase is "immobilized", the most typical and preferred aspect is a state in which the alignment of the liquid crystal compound brought into a cholesteric liquid crystalline phase is retained. The state where the liquid crystalline phase is "immobilized" is not limited thereto, and specifically, it refers to a state in which, in a temperature range of usually 0° C. to 50° C. and in a temperature range of −30° C. to 70° C. under more severe conditions, this layer has no fluidity and can keep an immobilized alignment state stably without causing changes in alignment state due to external field or external force. In the present invention, as will be described later, it is preferable to immobilize the alignment state of a cholesteric liquid crystalline phase by a curing reaction proceeding upon irradiation with ultraviolet rays.

In the layer obtained by immobilizing a cholesteric liquid crystalline phase, it is sufficient that the optical properties of the cholesteric liquid crystalline phase are retained in the layer, and finally the composition in the layer no longer needs to show liquid crystallinity.

In addition, the immobilization of the cholesteric liquid crystalline phase is preferably to immobilize the structure (alignment state) of the cholesteric liquid crystalline phase after the cooling treatment.

The method of the curing treatment is not particularly limited, and examples thereof include a photo curing treatment and a thermal curing treatment. Among them, a light irradiation treatment is preferable, and an ultraviolet irradiation treatment is more preferable. Further, as described above, the liquid crystal compound is preferably a liquid crystal compound having a polymerizable group. In a case where the liquid crystal compound has a polymerizable group, the curing treatment is preferably a polymerization reaction upon light irradiation (particularly ultraviolet irradiation), and more preferably a radical polymerization reaction upon light irradiation (particularly ultraviolet irradiation).

For ultraviolet irradiation, a light source such as an ultraviolet lamp is used.

The irradiation energy quantity of ultraviolet rays is not particularly limited, but it is generally preferably about 0.1 to 0.8 J/cm$^2$. The irradiation time of the ultraviolet rays is not particularly limited, but it may be determined as appropriate from the viewpoint of both sufficient strength and productivity of the obtained layer.

<Reflective Layer>

The reflective layer according to the embodiment of the present invention is a reflective layer obtained by immobilizing a cholesteric liquid crystalline phase, and the reflective layer has a wave-like structure in which bright portions and dark portions derived from a cholesteric liquid crystalline phase observed in a cross section with a scanning electron microscope are wave-like; and has a plurality of regions having helical pitches different from each other in a plane, with the period of the wave-like structure in each region being the same.

The reflective layer is easily obtained by carrying out each step in the order of step 1→step 2→step 4→step 3 in the above-described method for producing a reflective layer.

The reflective layer is a layer which has a cholesteric liquid crystal structure and a structure in which the angle formed between the helical axis and the surface of the reflective layer periodically changes. In other words, the reflective layer is a reflective layer which has a cholesteric liquid crystal structure, in which the cholesteric liquid crystal structure gives a stripe pattern of bright portions and dark portions in a cross-sectional view of the reflective layer observed by a scanning electron microscope, and therefore the angle formed between the normal of the line formed by at least one dark portion and the surface of the reflective layer periodically changes. Therefore, the reflective layer according to the embodiment of the present invention is capable of diffusing and reflecting light in a substantially any direction, not in a limited direction.

The reflective layer has a plurality of regions having helical pitches different from each other in a plane, in which the period of the wave-like structure in each region is the same even in a case where the regions are different from each other. Therefore, the reflective layer according to the embodiment of the present invention has a small viewing angle dependency of tint.

At least two of the regions in the reflective layer have helical pitches different from each other by preferably 10% or more, more preferably 20% or more, and still more preferably 30% or more, from the viewpoint that the reflection wavelength range is excellent. The upper limit of the helical pitch difference is not particularly limited, but is usually 200% or less.

The phrase "~ have helical pitches different from each other by 10% or more" is intended to refer to that, in the reflective layer, in a case where the helical pitch with a smaller helical pitch is X and the helical pitch with a larger helical pitch is Y, the value represented by $\{(Y-X)/X\} \times 100$ (%) is 10% or more.

In addition, it is preferable that regions having helical pitches different from each other by 10% or more (preferably 20% or more, and more preferably 30% or more) are present within a radius of 1 mm at any position in the plane of the reflective layer. The upper limit of the helical pitch difference is not particularly limited, but is usually 200% or less.

It is also preferable that the regions having different helical pitches formed in the plane of the reflective layer are made into a dot shape by pattern-wise exposure, for example, as shown in FIG. 4. In addition, in a case where each region is made into a dot shape, there is an advantage that the tint can be easily adjusted by adjusting the size of the dots.

In addition, in a case where each of the regions formed in the plane of the reflective layer is made into a region having an apparent center wavelength of selective reflection in the red light wavelength range, a region having an apparent center wavelength of selective reflection in the green light wavelength range, and a region having an apparent center wavelength of selective reflection in the blue light wavelength range, a projected image display member capable of displaying a full-color projected image can be produced. The apparent center wavelength of selective reflection is as described above. The resulting reflective layer has a wide reflection wavelength range, and has excellent transparency because it is not necessary to laminate a plurality of layers having selective reflection wavelengths different from each other.

<Uses>

The reflective layer is a layer having a cholesteric liquid crystalline phase (cholesteric liquid crystal structure) having a predetermined wave-like structure (hereinafter, the reflective layer is also referred to as "cholesteric liquid crystal layer"), and is preferably a layer obtained by immobilizing this cholesteric liquid crystalline phase.

The cholesteric liquid crystal layer is a layer showing selective reflection properties with respect to light in a predetermined wavelength range. The cholesteric liquid crystal layer functions as a circularly polarized selective reflective layer that selectively reflects either the dextrorotatory circularly polarized light or the levorotatory circularly polarized light in the selective reflection wavelength range and transmits the other sense circularly polarized light. A film including one or two or more cholesteric liquid crystal layers can be used for various purposes. In a film including two or more layers of a cholesteric liquid crystal layer, the senses of circularly polarized light reflected by the cholesteric liquid crystal layers may be the same or opposite to each other depending on the application. In addition, the center wavelengths of selective reflection of the cholesteric liquid crystal layers, which will be described later, may be the same as or different from each other depending on the application.

In the present specification, the term "sense" for circularly polarized light means dextrorotatory circularly polarized light or levorotatory circularly polarized light. The sense of circularly polarized light is defined such that, in a case where light is viewed as it proceeds toward an observer and in a case where the distal end of the electric field vector rotates clockwise as time increases, the sense is dextrorotatory circularly polarized light, and in a case where it rotates counterclockwise, the sense is levorotatory circularly polarized light. In the present specification, the term "sense" may be used for the twist direction of the helix of the cholesteric liquid crystal. Selective reflection by the cholesteric liquid crystal reflects dextrorotatory circularly polarized light and transmits levorotatory circularly polarized light in a case where the twist direction (sense) of the helix of the cholesteric liquid crystal is right-handed, whereas it reflects levorotatory circularly polarized light and transmits dextrorotatory circularly polarized light in a case where the sense is left-handed.

For example, a film including a cholesteric liquid crystal layer exhibiting selective reflection properties in the visible light wavelength range (wavelength of 400 to 750 nm) can be used as a screen for projected image display and a half mirror. Further, by controlling the reflection wavelength range, such a film can be used as a filter that improves the color purity of display light of a color filter or a display (for example, see JP2003-294948A).

In addition, the reflective layer can be used for various purposes such as a polarizing element, a reflective film, an anti-reflection film, a viewing angle compensating film, holography, and an alignment film, which are constituent elements of an optical element.

Hereinafter, the application as a projected image display member which is a particularly preferable application will be described.

By the above-mentioned function of the cholesteric liquid crystal layer, a projected image can be formed by reflecting circularly polarized light of either sense at the wavelength showing selective reflection among the projected light. The projected image may be visually recognized as such by being displayed on the surface of the projected image display member or may be a virtual image which appears to float above the projected image display member as viewed from an observer.

The center wavelength $\lambda$ of the selective reflection depends on the pitch P of the helical structure (=the period of the helix) in a cholesteric liquid crystalline phase and follows the relationship of the average refractive index n of the cholesteric liquid crystal layer and $\lambda = n \times P$. Here, the center wavelength $\lambda$ of the selective reflection of the cholesteric liquid crystal layer refers to a wavelength at the center of gravity of the reflection peak of the circularly polarized reflection spectrum measured from the normal direction of the cholesteric liquid crystal layer. As can be seen from the above Expression, the center wavelength of the selective reflection can be adjusted by adjusting the pitch of the helical structure. Since the pitch of the cholesteric liquid crystalline phase depends on the type of the chiral agent A and the chiral agent C or the addition concentration thereof, a desired pitch can be obtained by adjusting these factors. As a method for measuring sense or pitch of helix, methods described in "Easy Steps in Liquid Crystal Chemistry Experiment" p 46, edited by The Japanese Liquid Crystal Society, Sigma Publishing, published in 2007, and "Liquid Crystal Handbook" p 196, Editorial Committee of Liquid Crystal Handbook, Maruzen can be used.

In addition, a projected image display member capable of displaying full color projected images can be produced by preparing and laminating cholesteric liquid crystal layers having an apparent center wavelength of the selective reflection in the red light wavelength range, the green light wavelength range, and the blue light wavelength range, respectively.

By adjusting the center wavelength of the selective reflection of each cholesteric liquid crystal layer according to the emission wavelength range of the light source used for projection and the mode of use of the projected image display member, a clear projected image can be displayed with high efficiency of light utilization. In particular, by adjusting the center wavelengths of the selective reflection of the cholesteric liquid crystal layer respectively according to the light emission wavelength range of the light source used for projection or the like, a clear color projected image can be displayed with high efficiency of light utilization.

In addition, for example, in a case where the projected image display member is configured to be transmissive to light in the visible light region, a half mirror that can be used as a combiner for a head-up display can be obtained. The projected image display half mirror can display the image projected from the projector so as to be visible, and in a case where the projected image display half mirror is observed from the same surface side where the image is displayed, the information or scenery on the opposite surface side can be observed at the same time.

EXAMPLES

Hereinafter, the present invention will be described in more detail with reference to Examples. The materials, the used amount, the ratio, the contents of a treatment, and the procedures of a treatment described in Examples below may be suitably modified without departing from the spirit of the present invention. Accordingly, the scope of the present invention should not be limitatively interpreted by Examples described below.

[Synthesis and Evaluation of Chiral Agents]
<Synthesis of Compound CD-1 (Corresponding to Chiral Agent B)>

Compound CD-1 was synthesized according to the following scheme.

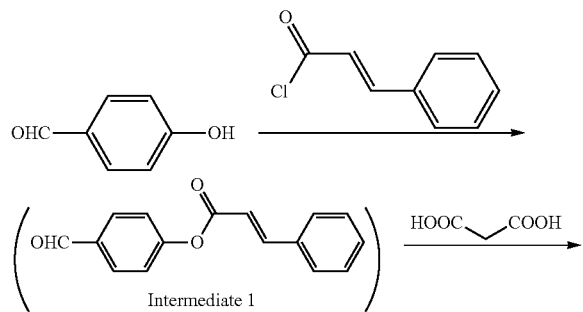

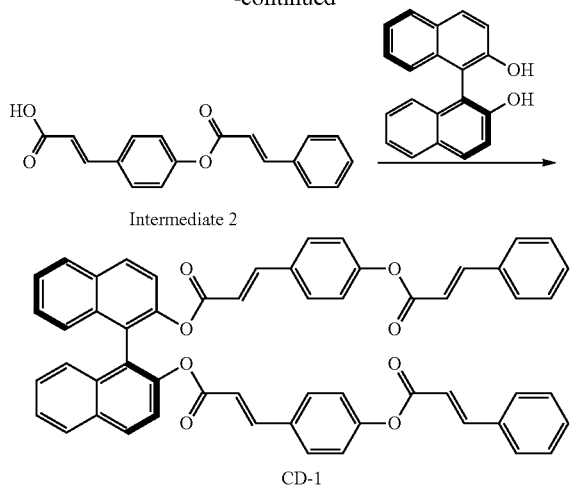

(Synthesis of Intermediate 2)

53.31 g of parahydroxybenzaldehyde (manufactured by Wako Pure Chemical Industries, Ltd.), 153 mL of N-methyl-2-pyrrolidone (NMP, manufactured by Wako Pure Chemical Industries, Ltd.), and 72.40 g of potassium carbonate (manufactured by Wako Pure Chemical Industries, Ltd.) were placed in a 2 L three-neck flask. Thereafter, 80.00 g of cinnamoyl chloride (manufactured by Tokyo Chemical Industry Co., Ltd.) was further added to the three-neck flask, and the reaction liquid was reacted at 40° C. for 2 hours. Subsequently, 500 mL of ethyl acetate (manufactured by Wako Pure Chemical Industries, Ltd.) and 300 mL of water were added to the reaction liquid, and the resulting reaction liquid was stirred at 40° C. for 15 minutes, and then the water phase was removed to obtain an ethyl acetate solution of Intermediate 1.

Subsequently, 68.1 g of malonic acid (manufactured by Wako Pure Chemical Industries, Ltd.) and 17.6 mL of pyridine (manufactured by Wako Pure Chemical Industries, Ltd.) were added to the ethyl acetate solution of Intermediate 1 which was then reacted for 3 hours while distilling off ethyl acetate at 100° C. under a nitrogen stream. Next, 60 mL of methanol (manufactured by Wako Pure Chemical Industries, Ltd.) and 400 mL of water were added to the obtained product, and the resulting solid was collected by filtration and blast dried at 40° C. for 12 hours to obtain Intermediate 2 (123 g, yield: 96%).

(Synthesis of Compound CD-1)

100 g of Intermediate 2, 600 mL of acetonitrile (manufactured by Wako Pure Chemical Industries, Ltd.), and 400 mL of dimethylacetamide (manufactured by Wako Pure Chemical Industries, Ltd.) were placed in a 2 L three-neck flask, and 42.23 g of thionyl chloride (manufactured by Wako Pure Chemical Industries, Ltd.) was further added to the three-neck flask. The reaction liquid was reacted at 60° C. for 1 hour. Subsequently, the reaction liquid was cooled to 5° C., 47.7 g of (S)-binaphthol (manufactured by Kanto Chemical Co., Inc.) and 134.1 g of pyridine (manufactured by Wako Pure Chemical Industries, Ltd.) were added to the reaction liquid which was then reacted at 40° C. for 5 hours. Next, 600 mL of methanol (manufactured by Wako Pure Chemical Industries, Ltd.) and 1000 mL of water were added to the reaction liquid, and the resulting solid was collected by filtration and blast dried at 40° C. for 12 hours to obtain Compound CD-1 (100 g, yield: 72%).

<Synthesis of Compound CD-2 (Corresponding to Chiral Agent A)>

Compound CD-2 was synthesized by the method described in Examples 1 and 2 of JP2002-338575A.

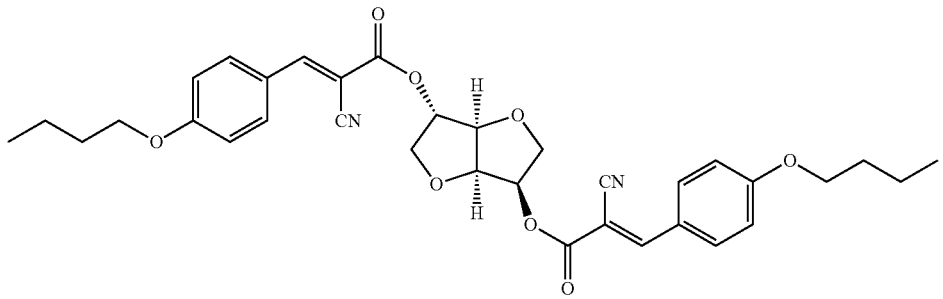

CD-2

<Compound CD-3 (Corresponding to Chiral Agent B)>

The exemplary compound (5) described in JP4287599B was used as the compound CD-3.

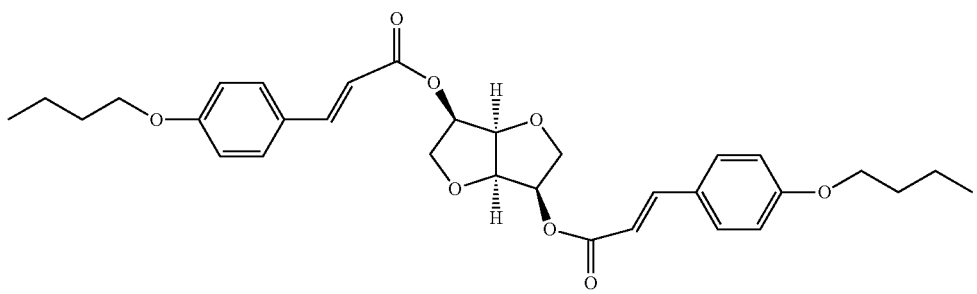 [SMILES: CCCCOc1ccc(/C=C/C(=O)O[C@@H]2CO[C@H]3[C@@H]2OC[C@H]3OC(=O)/C=C/c2ccc(OCCCC)cc2)cc1]

<Compound CD-4 (Corresponding to Chiral Agent A)>

The enantiomer of chiral agent 1 described in Example 1 of JP2016-508817 was prepared as CD-4.

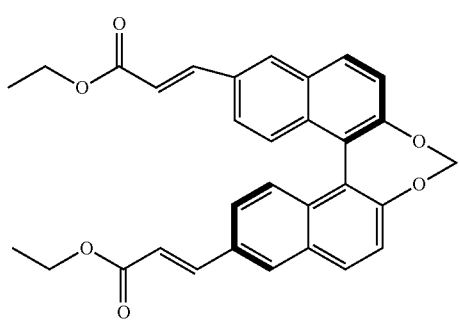

CD-4

<Evaluation of Helical Twisting Power (HTP), Temperature-Dependent Percentage Change of HTP (Temperature-Dependent HTP Percentage Change), and Light Irradiation-Dependent Percentage Change of HTP (Light-Dependent HTP Percentage Change)>

HTP of each chiral agent (HTP here is intended to refer to HTP in a liquid crystal layer (cholesteric liquid crystalline phase state) obtained by planar alignment of a liquid crystal compound by heating (90° C.)), HTP percentage change in a case where the liquid crystal layer in which the liquid crystal compound was planar aligned was quenched (temperature-dependent HTP percentage change), and HTP percentage change in a case where the liquid crystal layer in which the liquid crystal compound was planar aligned was subjected to light irradiation (light-dependent HTP percentage change) were respectively evaluated in accordance with the following method.

For the evaluation, a liquid crystal compound LC-1 described later was used.

(Evaluation of HTP, Temperature-Dependent HTP Percentage Change, and Light-Dependent HTP Percentage Change of Compound CD-1)

<<Preparation of Sample Solution>>

The liquid crystalline compound LC-1 represented by the following structure and Compound CD-1 were mixed, and then a solvent was added to the resulting mixture to prepare a sample solution having the following composition.

| | |
|---|---|
| Liquid crystalline compound LC-1 represented by the following structure: | 100 parts by mass |
| Compound CD-1 | 5 parts by mass |
| Solvent an amount that makes the solute concentration (methyl ethyl ketone (MEK)/cyclohexanone = 90/10 (mass ratio)) | 30% by mass |

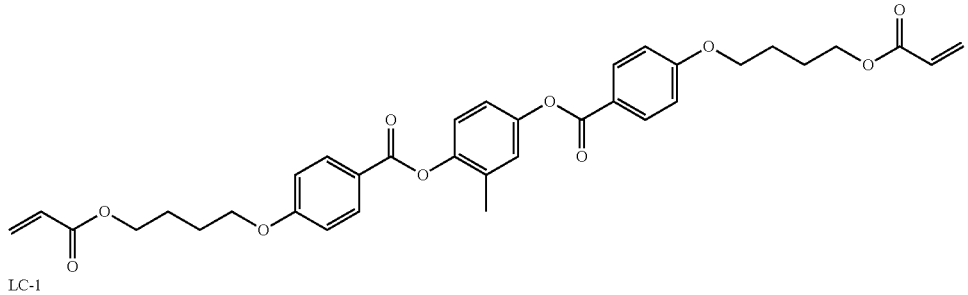

LC-1

<<Production of Liquid Crystal Layer 1-1>>

Next, a polyimide alignment film forming composition SE-130 (manufactured by Nissan Chemical Industries, Ltd.) was applied onto a cleaned glass substrate to form a coating film. The resulting coating film was baked and then rubbed to produce a substrate with an alignment film. 30 μL of the sample solution was spin-coated on the rubbing-treated surface of this alignment film under the conditions of a rotation speed of 1000 rpm for 10 seconds, followed by aging at 90° C. for 1 minute to form a liquid crystal layer 1-1.

<<Calculation of Light-Dependent HTP Percentage Change>>

The helical twisting power (HTP) of the obtained liquid crystal layer 1-1 was measured. Specifically, the central reflection wavelength of the liquid crystal layer was measured using a spectrophotometer (UV-3100, manufactured by Shimadzu Corporation), and the HTP before light irradiation was calculated in accordance with Expression (4).

HTP=(average refractive index of liquid crystal compound)/{(content of chiral agent with respect to liquid crystal compound (% by mass))×(central reflection wavelength (nm))}[μm$^{-1}$]   Expression (4)

In Expression (4), the calculation was made on the assumption that the "average refractive index of liquid crystal compound" was 1.55.

The liquid crystal layer 1-1 was ultraviolet-irradiated with 365 nm light from a light source (2UV TRANSILLUMINATOR, manufactured by UVP, LLC) at an irradiation intensity of 10 mW/cm$^2$ for 1 minute. The central reflection wavelength of the liquid crystal layer after light irradiation was measured using a spectrophotometer (UV-3100, manufactured by Shimadzu Corporation), and the light-dependent HTP percentage change was calculated in accordance with Expression (5).

Light-dependent HTP percentage change=[{(HTP before 365 nm light irradiation)−(HTP after 365 nm light irradiation)}/(HTP before 365 nm light irradiation)]×100[%]   Expression (5)

The results are shown in Table 1.

<<Calculation of Temperature-Dependent HTP Percentage Change>>

The liquid crystal layer 1-1 was heated to 40° C. and 90° C. using a hot stage (FP90/FP82HT, manufactured by Mettler-Toledo, Inc.), respectively, and the central reflection wavelength thereof was measured using a microscope (ECLIPSE E600-POL, manufactured by Nikon Corporation) and a spectrophotometer (USB-4000/USB4H09800, manufactured by Ocean Optics, Inc.). HTP at 40° C. and 90° C. was calculated in accordance with Expression (4). Using the obtained values, the temperature-dependent percentage change of HTP was calculated in accordance with Expression (6).

Temperature-dependent HTP percentage change=[{(HTP at 40° C.)−(HTP at 90° C.)}/(HTP at 40° C.)]×100[%]   Expression (6)

The results are shown in Table 1.

(Evaluation of HTP, Temperature-Dependent HTP Percentage Change, and Light-Dependent HTP Percentage Change of Compounds CD-2 to 4)

Liquid crystal layers using Compounds CD-2 to 4 were evaluated in the same manner as in Compound CD-1, and the HTP, temperature-dependent HTP percentage change, and light-dependent HTP percentage change of Compounds CD-2 to 4 were evaluated.

The results are shown in Table 1.

TABLE 1

| Type of chiral compound | HTP (μm$^{-1}$) | Temperature-dependent HTP percentage change | Light-dependent HTP percentage change |
|---|---|---|---|
| CD-1 | 63 | 15% | 0% |
| CD-2 | 36 | 0% | 44% |
| CD-3 | 32 | 14% | 0% |
| CD-4 | 65 | 0% | 40% |

The HTP of Compound CD-1, which is a chiral agent, after cooling corresponds to 63×(100−15)/100=53.6 μm$^{-1}$. The HTP of Compound CD-2 after light irradiation corresponds to 36×(100−44)/100=20.2 μm$^{-1}$. The HTP of Compound CD-3 after cooling corresponds to 32×(100−14)/100=27.5 μm$^{-1}$. The HTP of Compound CD-4 after light irradiation corresponds to 65×(100−40)/100=39 μm$^{-1}$.

Compound CD-1 and Compound CD-4 are chiral agents that induce a left-handed helix, and Compound CD-2 and Compound CD-3 are chiral agents that induce a right-handed helix.

[Preparation and Evaluation of Composition]

Example 1

Composition 1 (corresponding to composition X) shown below was prepared using Compound CD-1 as the "chiral agent B" and Compound CD-2 as the "chiral agent A".

(Preparation of Composition 1)

The liquid crystal compound LC-1, Compound CD-1, Compound CD-2, an alignment agent (1) represented by the following structure, and a polymerization initiator were mixed, and then a solvent was added to the resulting mixture to prepare Composition 1 having the following composition.

| | |
|---|---|
| Liquid crystal compound LC-1 | 100 parts by mass |
| Compound CD-1 | 5.8 parts by mass |
| Compound CD-2 | 4.2 parts by mass |
| Alignment agent (1) | 0.1 parts by mass |
| Polymerization initiator (Irg-907, manufactured by BASF Corporation) | 3.0 parts by mass |
| Solvent an amount that makes the solute concentration (MEK/cyclohexanone = 90/10 (mass ratio)) | 30% by mass |

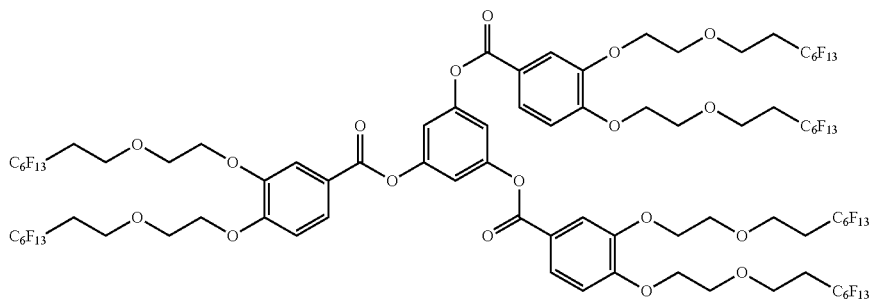

Alignment agent (1)

<Production and Evaluation of Reflective Layer>

(Production of Reflective Layer)

Next, a polyimide alignment film forming composition SE-130 (manufactured by Nissan Chemical Industries, Ltd.) was applied onto a cleaned glass substrate to form a coating film. The resulting coating film was baked and then rubbed to produce a substrate with an alignment film. 30 µL of Composition 1 was spin-coated on the rubbing-treated surface of this alignment film under the conditions of a rotation speed of 1000 rpm for 10 seconds to form a composition layer, which was then dried (aged) at 90° C. for 1 minute to align the liquid crystal compound in the composition layer (in other words, being brought into a cholesteric liquid crystalline phase state).

Next, the composition layer in which the liquid crystal compound was aligned was ultraviolet-irradiated with 365 nm light at an irradiation intensity of 0.4 mW/cm² for 1 minute, with a line screen mask with a pitch of 10 µm being placed between a light source (2UV TRANSILLUMINATOR, manufactured by UVP, LLC) and the composition layer.

Subsequently, the composition layer in which the liquid crystal compound was aligned was subjected to UV irradiation (310 nm light) at an irradiation quantity of 500 mJ/cm² in a nitrogen atmosphere at 40° C., such that the composition was cured to obtain a reflective layer.

In addition, the operation of cooling the composition layer from 90° C. to 40° C. corresponds to the step 3 mentioned above.

In the above procedure, the composition layer in which the liquid crystal compound was aligned is ultraviolet-irradiated with 365 nm light at an irradiation intensity of 0.4 mW/cm² for 1 minute, and this treatment corresponds to the step 4.

In the above procedure, a curing treatment is carried out in which UV (ultraviolet light: 310 nm light) is irradiated at an irradiation quantity of 500 mJ/cm² in a nitrogen atmosphere at 40° C. That is, the above step corresponds to an aspect in which a curing treatment for immobilizing a cholesteric liquid crystalline phase is carried out in the step 3.

The "Percentage change of helical pitch upon light irradiation" shown in Table 2 is a value obtained by the following measurement method A1. In addition, the composition used in the measurement method A1 is the same as Composition 1 used for production of the reflective layer.

(Calculation of Helical Pitch Percentage Change upon Light Irradiation)

<<Measurement method A1>>

A polyimide alignment film forming composition SE-130 (manufactured by Nissan Chemical Industries, Ltd.) was applied onto a cleaned glass substrate to form a coating film. The resulting coating film was baked and then rubbed to produce a substrate with an alignment film. 30 µL of the composition was spin-coated on the rubbing-treated surface of this alignment film under the conditions of a rotation speed of 1000 rpm for 10 seconds to form a composition layer which was then aged at 90° C. for 1 minute to form a liquid crystal layer 2-1.

The central reflection wavelength of the liquid crystal layer 2-1 was measured using a spectrophotometer (UV-3100, manufactured by Shimadzu Corporation).

Next, the liquid crystal layer 2-1 was ultraviolet-irradiated with 365 nm light from a light source (2UV TRANSILLUMINATOR, manufactured by UVP, LLC) at an irradiation intensity of 10 mW/cm² for 1 minute. The central reflection wavelength of the obtained liquid crystal layer was measured using a spectrophotometer (UV-3100, manufactured by Shimadzu Corporation).

The helical pitch percentage change was calculated in accordance with Expression (7) using the measured central reflection wavelengths before and after light irradiation.

Helical pitch percentage change upon light irradiation=[{(central reflection wavelength before 365 nm light irradiation)−(central reflection wavelength after 365 nm light irradiation)}/(central reflection wavelength before 365 nm light irradiation)]×100[%]   Expression (7)

The "Percentage change of helical pitch upon temperature change" shown in Table 2 is a value obtained by the following measurement method C. In addition, the composition used in the measurement method C is the same as Composition 1 used for production of the reflective layer.

(Calculation of Helical Pitch Percentage Change upon Temperature Change)

<<Measurement Method C>>

A polyimide alignment film forming composition SE-130 (manufactured by Nissan Chemical Industries, Ltd.) was applied onto a cleaned glass substrate to form a coating film. The resulting coating film was baked and then rubbed to produce a substrate with an alignment film. 30 µL of the composition was spin-coated on the rubbing-treated surface of this alignment film under the conditions of a rotation speed of 1000 rpm for 10 seconds to form a composition layer which was then aged at 90° C. for 1 minute to form a liquid crystal layer 2-2.

The liquid crystal layer 2-2 was heated to 40° C. and 90° C. using a hot stage (FP90/FP82HT, manufactured by Mettler-Toledo, Inc.), respectively, and the central reflection wavelength thereof was measured using a microscope (ECLIPSE E600-POL, manufactured by Nikon Corporation) and a spectrophotometer (USB-4000/USB4H09800, manufactured by Ocean Optics, Inc.). The helical pitch percentage change was calculated in accordance with Expression (8).

Helical pitch percentage change upon temperature change=[{(central reflection wavelength at 90° C.)−(central reflection wavelength at 40° C.)}/ (central reflection wavelength at 90° C.)]×100 [%]   Expression (8)

(Evaluation)

Using the obtained reflective layer, the evaluation of diffuse reflectivity (wide-angle reflectivity) and the evaluation of reflection wavelength range given below were carried out.

<<Evaluation of Diffuse Reflectivity>>

The measurement of absolute reflectivity at 0° incidence and 10° or 45° detection of the reflective layer was carried out. A reflection ratio was calculated from Expression (10) using the obtained measured values and the diffuse reflectivity was evaluated based on the following evaluation standards.

Reflection ratio=(absolute reflection Y value at 10° detection)/(absolute reflection Y value at 45° detection)   Expression (10)

<<Evaluation Standards>>

"A": The reflection ratio is less than 2.
"B": The reflection ratio is 2 or more and less than 3.
"C": The reflection ratio is 3 or more and less than 10.
"D": The reflection ratio is 10 or more.
The results are shown in Table 2.

(Evaluation of Reflection Wavelength Range)

The transmittance was measured using a spectrophotometer (USB-4000/USB4H09800, manufactured by Ocean Optics, Inc.). The wavelength range at which the transmittance is 80% or less in the wavelength range of 400 to 1000 nm was measured and the reflection wavelength range was evaluated based on the following evaluation standards.

<<Evaluation Standards>>

"A": The reflection wavelength range is 300 nm or longer.
"B": The reflection wavelength range is 200 nm or longer and shorter than 300 nm.
"C": The reflection wavelength range is 100 nm or longer and shorter than 200 nm.
"D": The reflection wavelength range is shorter than 100 nm.

The results are shown in Table 2.

Examples 2 to 5

The compositions of Examples 2 to 5 were prepared in the same manner as in Example 1, except that the content (parts by mass) of the chiral compound contained in the composition was changed to the formulation shown in Table 2. In addition, reflective layers were formed using the obtained compositions and were subjected to various evaluations in the same manner as in Example 1.

Comparative Examples 1 and 2

Compositions of Comparative Examples 1 and 2 were prepared in the same manner as in Example 1, except that the content (parts by mass) of the chiral compound contained in the composition was changed to the formulation shown in Table 2. In addition, reflective layers were formed using the obtained compositions and were subjected to various evaluations in the same manner as in Example 1.

TABLE 2

| | Chiral agent B | | Chiral agent A | | Helical pitch percentage change upon light irradiation (%) | Helical pitch percentage change upon temperature change (%) | Evaluation | |
|---|---|---|---|---|---|---|---|---|
| | Type | Addition amount (parts by mass) | Type | Addition amount (parts by mass) | | | Wide-angle reflection performance | Reflection wavelength range |
| Example 1 | CD-1 | 5.8 | CD-2 | 4.2 | 31% | 24% | A | A |
| Example 2 | CD-1 | 5.0 | CD-2 | 3.0 | 23% | 22% | A | B |
| Example 3 | CD-1 | 4.5 | CD-2 | 2.0 | 15% | 19% | B | C |
| Example 4 | CD-1 | 3.0 | CD-4 | 4.0 | 23% | 6% | C | B |
| Example 5 | CD-3 | 8.0 | CD-4 | 1.0 | 14% | 17% | B | C |
| Comparative Example 1 | CD-1 | 4.0 | CD-2 | 0.0 | 0% | 14% | B | D |
| Comparative Example 2 | CD-1 | 0.0 | CD-2 | 8.0 | 44% | 0% | D | A |

The cross-sectional SEM observations (cross-sectional SEM micrographs) of the reflective layers obtained in Examples 1 to 5 and Comparative Example 1 confirmed that the layered structure of the cholesteric liquid crystalline phase was wave-like (having an undulating structure: see FIG. 3).

In particular, the cross-sectional SEM observations (cross-sectional SEM micrographs) of the reflective layers obtained in Examples 1 to 5 confirmed that regions having different helical pitches were formed, and the period of the wave-like structure in each of regions having helical pitches different from each other was the same (see FIG. 3).

On the other hand, the cross-sectional SEM observation (cross-sectional SEM micrograph) of the reflective layer obtained in Comparative Example 2 did not confiun that the layered structure of the cholesteric liquid crystalline phase was wave-like.

As shown in Table 2, it can be seen that the reflective layers of Examples 1 to 5 and Comparative Example 1 having an undulating structure are superior in diffuse reflectivity (wide-angle reflectivity) as compared with the reflective layer of Comparative Example 2 having no undulating structure. In particular, from the comparison of Examples 1 to 5, it was confirmed that the larger the percentage change (percentage reduction) of the helical pitch of the cholesteric liquid crystalline phase in the step 3 (the percentage change (percentage reduction) is preferably 5% or more, more preferably 10% or more, and still more preferably 20% or more), the better the diffuse reflectivity (wide-angle reflectivity).

As shown in Table 2, it can be seen that the reflective layers of Examples 1 to 5 and Comparative Example 2 have a wider reflection wavelength range than the reflective layer of Comparative Example 1 that does not contain a photosensitive chiral agent. In particular, from the comparison of Examples 1 to 5, it was confirmed that the larger the percentage change (absolute value) of the helical pitch upon light irradiation obtained by the above-described measurement method A1 (preferably 10% or more, more preferably 20% or more, and still more preferably 30% or more), the wider the reflection wavelength range.

Explanation of References

10: substrate
12: composition layer
12a: composition layer in cholesteric liquid crystalline phase state
12b: composition layer obtained by carrying out step 4 (composition layer in cholesteric liquid crystalline phase state after exposure)
12c, 12c': composition layer obtained by carrying out step 3 (composition layer having wave-like structure)
A1, A2, A3, A11, A12, A13: region
14: bright portion
16: dark portion
P1, P2, P3: period of wave-like structure

What is claimed is:

1. A method for producing a reflective layer, comprising:
a step 1 of applying a composition selected from the group consisting of the following composition X and the following composition Y onto a substrate to form a composition layer;
a step 2 of heating the composition layer to align a liquid crystal compound in the composition layer into a cholesteric liquid crystalline phase state;
a step 3 of cooling or heating the composition layer in a cholesteric liquid crystalline phase state to reduce a helical pitch, wherein the step 1 is performed after the step 2, and the step 3 is performed after the step 2; and
a step 4 of irradiating at least a partial region of the composition layer with light, between the step 1 and the step 2, between the step 2 and the step 3, or after the step 3, to photosensitize a chiral agent A of the composition X or a chiral agent C of the composition Y in the composition layer,
Composition X: a composition including a liquid crystal compound, the chiral agent A whose helical twisting power is changed upon light irradiation, and a chiral agent B whose helical twisting power is increased upon cooling or heating,
Composition Y: a composition including a liquid crystal compound and the chiral agent C whose helical twisting power is changed upon light irradiation and whose helical twisting power is increased upon cooling or heating.

2. The method for producing a reflective layer according to claim 1, further comprising a measurement step performed by the following measurement method A or the following measurement method B, the measurement step is performed after the step 2, in the measurement step,
a percentage change of the helical pitch before and after the light irradiation obtained by the following measurement method A is 5% or more in a case where the step 2 is carried out following the step 1 and the step 3 and the step 4 are carried out following the step 2, or
a percentage change of the helical pitch before and after the light irradiation obtained by the following measurement method B is 5% or more in a case where the step 2 is carried out following the step 1 and the step 4 and the step 3 is carried out following the step 2,
Measurement method A:
Each central reflection wavelength (nm) before and after irradiation of the composition layer formed by carrying out the step 2 following the step 1 with light having a wavelength of 365 nm at an irradiation intensity of 10 mW/cm$^2$ for 1 minute is measured and the percentage change of the helical pitch before and after the light irradiation is obtained in accordance with Expression (1);

Percentage change of helical pitch before and after light irradiation=[{|central reflection wavelength before light irradiation−central reflection wavelength after light irradiation|}/(central reflection wavelength before light irradiation)]×100(%)   Expression (1))

Measurement method B:
Each central reflection wavelength (nm) of a composition layer A formed by carrying out the step 2 following the step 1 and a composition layer B formed by irradiation with light having a wavelength of 365 nm at an irradiation intensity of 10 mW/cm$^2$ for 1 minute following the step 1, and further carrying out the step 2 is measured, and the percentage change of the helical pitch before and after the light irradiation is obtained in accordance with Expression (2);

Percentage change of helical pitch before and after light irradiation=[{|central reflection wavelength of composition layer $A$−central reflection wavelength of composition layer $B$|}/(central reflection wavelength of composition layer $A$)]×100 (%)   Expression (2).

3. The method for producing a reflective layer according to claim 1, wherein the composition layer is cooled or heated in the step 3 such that bright portions and dark portions derived from the cholesteric liquid crystalline phase are changed to a state not parallel to the substrate, in a cross-sectional view of the composition layer formed in the step 3 and observed by a scanning electron microscope.

4. The method for producing a reflective layer according to claim 3,
wherein the composition layer is cooled or heated in the step 3 such that the bright portions and the dark portions derived from the cholesteric liquid crystalline phase are wave-like, in the cross-sectional view of the composition layer formed in the step 3 and observed by the scanning electron microscope.

5. The method for producing a reflective layer according to claim 1,
wherein the composition layer is cooled or heated in the step 3 such that the helical pitch is reduced by 20% or more.

6. The method for producing a reflective layer according to claim 1,
wherein the composition layer is cooled in the step 3 such that a temperature of the composition layer is lowered by 30° C. or more.

7. The method for producing a reflective layer according to claim 1,
wherein the liquid crystal compound is a liquid crystal compound having a polymerizable group; and
in a case where the step 4 is carried out before the step 2 or between the step 2 and the step 3, the method further comprises a step 5 of subjecting:
during the step 3, the composition layer to a curing treatment and immobilizing the cholesteric liquid crystalline phase to form a reflective layer, or
after the step 3, the composition layer to a curing treatment and immobilizing the cholesteric liquid crystalline phase to form a reflective layer; or
in a case where the step 4 is carried out after the step 3, the method further comprises a step 5 of subjecting:
after the step 4, the composition layer to a curing treatment and immobilizing the cholesteric liquid crystalline phase to form a reflective layer.

8. The method for producing a reflective layer according to claim 7,
wherein the curing treatment is carried out by a polymerization reaction with light irradiation.

9. The method for producing a reflective layer according to claim 8,
wherein the polymerization reaction with light irradiation is a radical polymerization reaction.

10. The method for producing a reflective layer according to claim 1,
wherein the step 4 is carried out between the step 2 and the step 3.

11. The method for producing a reflective layer according to claim 1,
wherein the light irradiation in the step 4 is a step of exposing the composition layer in a pattern-wise manner.

* * * * *